(12) United States Patent
Volin

(10) Patent No.: US 9,943,063 B1
(45) Date of Patent: Apr. 17, 2018

(54) MULTI-STACKED-HINGE-DOOR PET CRATE, HAVING RIDGED SLANTED URINE-STORING BED SYSTEM, PLATFORM-LOCKING SHOCK-ABSORBING GUSSET SYSTEMS, DIKED GROOMING PLATFORM, AND TRIPLE-ROD-FRONT-LOCK SINGLE-KNOB-TOP-LOCK DOUBLE-MAGNET-FRONT-LOCK DOOR SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 0 days.

(21) Appl. No.: 15/449,474

(22) Filed: Mar. 3, 2017

(51) Int. Cl.
| | | |
|---|---|---|
| *A01K 1/03* | (2006.01) | |
| *A01K 1/02* | (2006.01) | |
| *A01K 1/035* | (2006.01) | |
| *A01K 13/00* | (2006.01) | |
| *A01K 1/01* | (2006.01) | |
| *E06B 3/48* | (2006.01) | |
| *E05C 9/06* | (2006.01) | |
| *E05B 1/00* | (2006.01) | |
| *E05C 19/16* | (2006.01) | |
| *E05C 9/20* | (2006.01) | |

(52) U.S. Cl.
CPC .......... *A01K 1/034* (2013.01); *A01K 1/0107* (2013.01); *A01K 1/0245* (2013.01); *A01K 1/0353* (2013.01); *A01K 13/00* (2013.01); *E05B 1/0053* (2013.01); *E05B 1/0092* (2013.01); *E05C 9/06* (2013.01); *E05C 9/20* (2013.01); *E05C 19/16* (2013.01); *E06B 3/48* (2013.01)

(58) Field of Classification Search
CPC ........ A01K 1/034; A01K 1/0157; A01K 1/02; A01K 1/0236; A01K 1/0245; A01K 1/0272; A01K 1/03; A01K 1/0281; A01K 1/029; A01K 1/032; A01K 1/035; A01K 1/0107; E05C 9/06
See application file for complete search history.

(56) References Cited

U.S. PATENT DOCUMENTS

| | | |
|---|---|---|
| 3,978,616 A | 9/1976 | Pennock |
| 4,216,743 A | 8/1980 | Cohen |
| 4,776,133 A | 10/1988 | Green |
| 5,071,176 A * | 12/1991 | Smith ...................... E05C 9/06 292/42 |
| 5,500,983 A | 3/1996 | Lautenschlager |
| 5,926,916 A | 7/1999 | Lee |

(Continued)

Primary Examiner — Jessica B Wong

(57) ABSTRACT

A multi-stacked-hinge-door pet crate comprises top, bottom, left, right, front, and rear panels attached to one another, multi-function slanted urine-storing bed having built-in gutters and ridges disposed on the bottom panel, a grooming platform, multi-function shock-absorbing gussets covering all the corners of the panels to lock the grooming platform and to absorb shocks and vibrations, and a multi-function door having double hinges thereon to allow door to open and fold, triple locking rods to lock the multi-function door the front panel, a palm knob with palm recesses and palm hills for an arthritic to use without the need for folding his or her fingers, a spring-loaded palm knob to lock the multi-function door against and parallel to the top panel, and double magnets attached to the multi-function door and the front panel, respectively, to stop the multi-function door from swinging.

15 Claims, 72 Drawing Sheets

(56) References Cited

U.S. PATENT DOCUMENTS

| | | |
|---|---|---|
| 6,385,909 B1 | 5/2002 | Marsh |
| 6,688,657 B2 | 2/2004 | Peacock |
| 7,120,967 B2 | 10/2006 | Johnson |
| 7,950,439 B2 | 5/2011 | Anderson |
| 9,115,523 B2 | 8/2015 | Friesen |
| 9,212,511 B2 | 12/2015 | Mortier |
| 9,297,190 B2 | 3/2016 | Lee |
| 9,357,748 B2 | 6/2016 | Cantwell |
| 9,546,511 B2 | 1/2017 | Dittmer |
| D778,510 S | 2/2017 | Addison Edmonds |
| 9,695,636 B2 * | 7/2017 | Cantwell .............. E06L 311/021 |
| 2009/0217718 A1 * | 9/2009 | Porter ................ E05L 347/0002 70/271 |
| 2010/0050951 A1 * | 3/2010 | Maguire .............. A01K 1/0107 119/165 |
| 2010/0282179 A1 | 11/2010 | Ho |
| 2011/0220033 A1 * | 9/2011 | Sangl ................... A01K 1/0245 119/455 |
| 2014/0150728 A1 * | 6/2014 | Tamiozzo ............ A01K 1/0236 119/501 |
| 2015/0351363 A1 * | 12/2015 | Nussbaum ............. A01K 1/035 119/480 |
| 2017/0122350 A1 * | 5/2017 | Link ..................... F16B 5/0004 |

\* cited by examiner

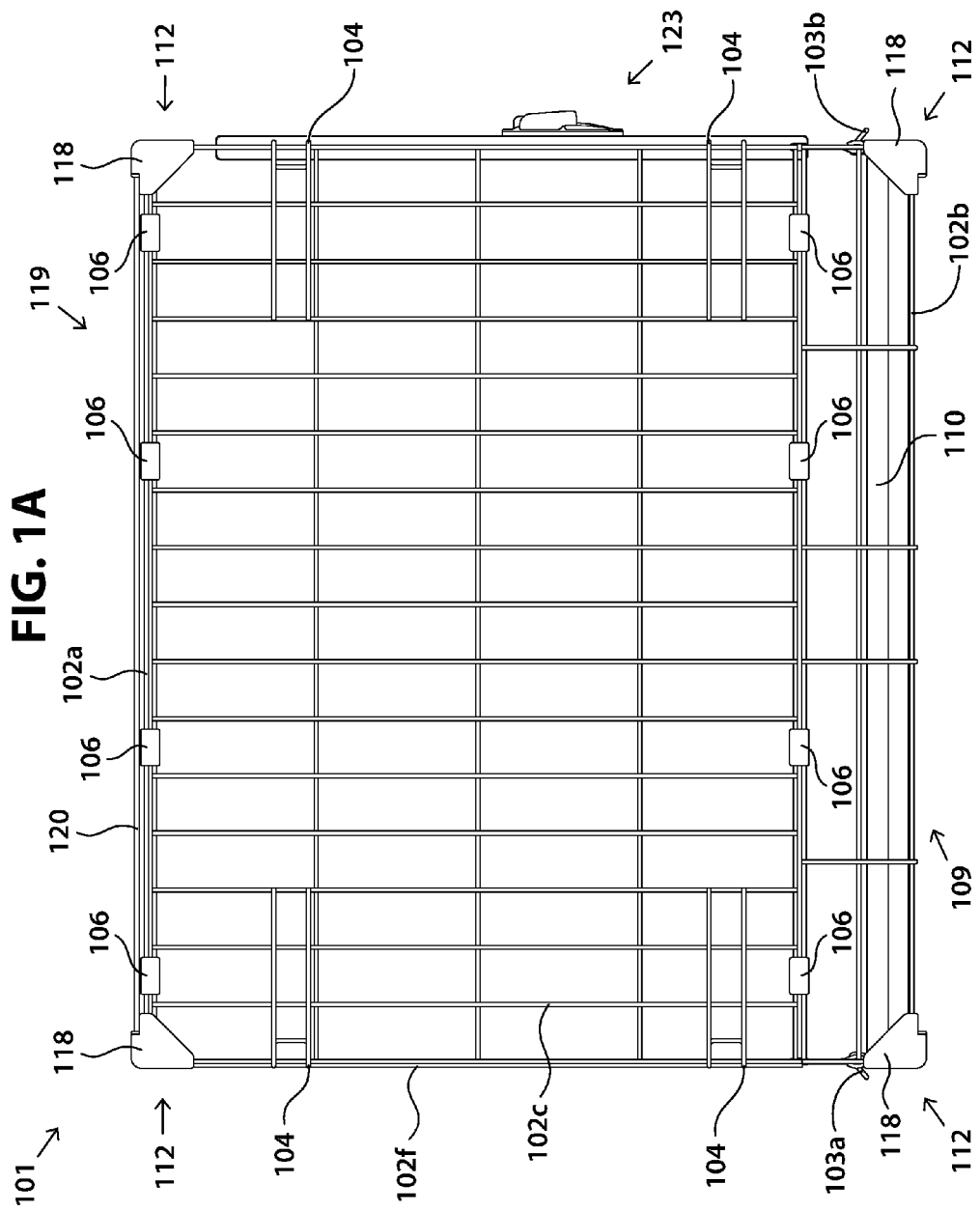

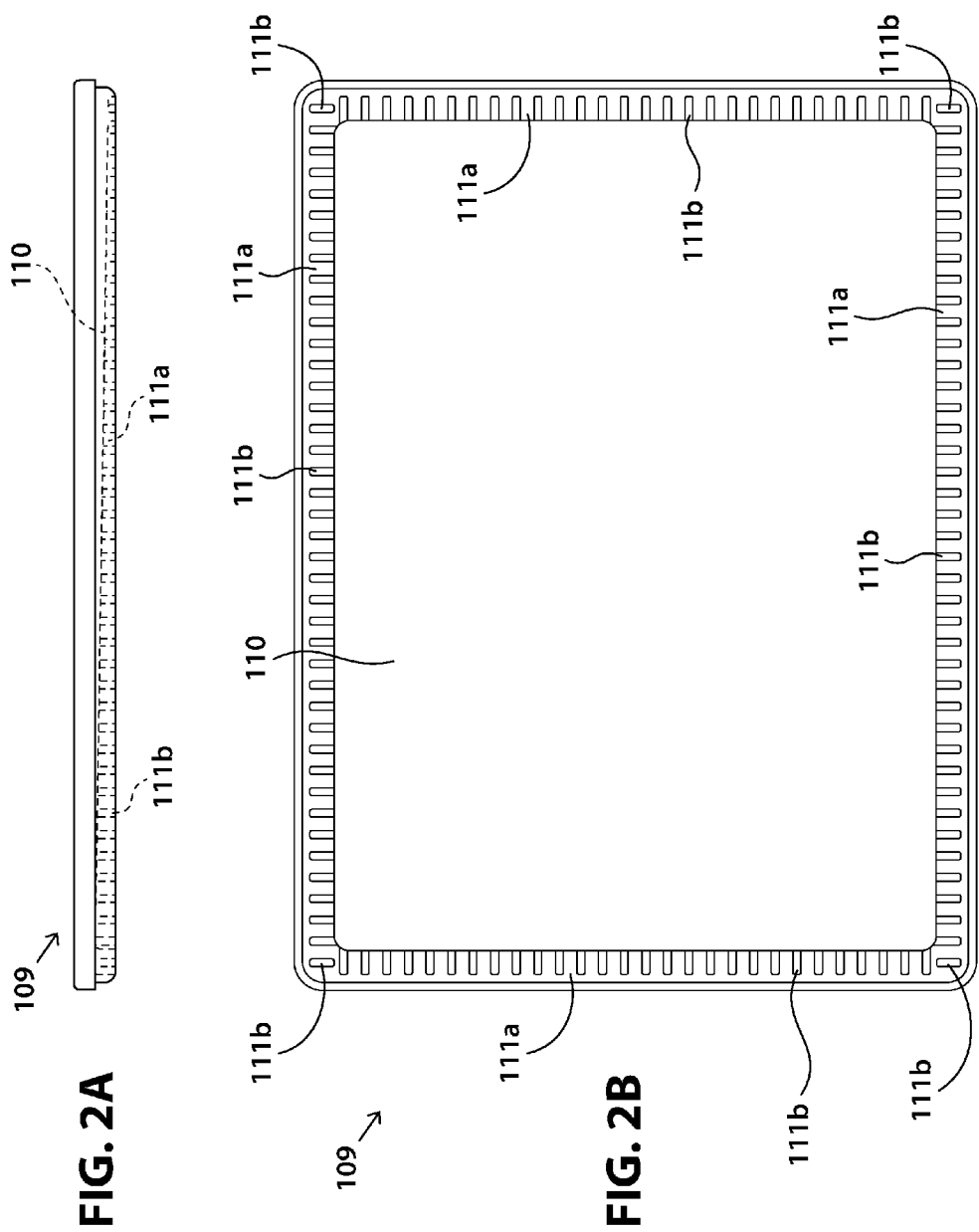

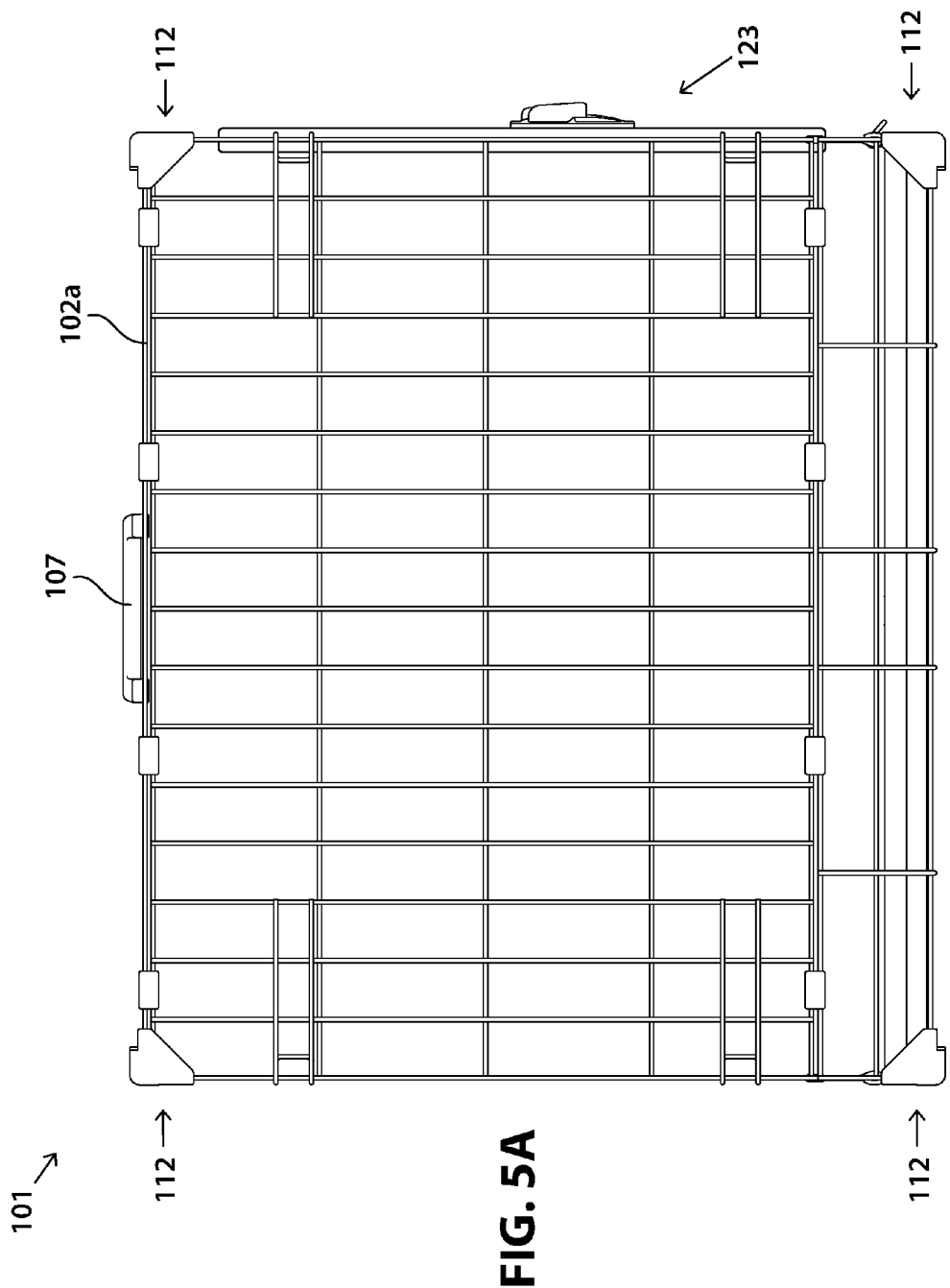

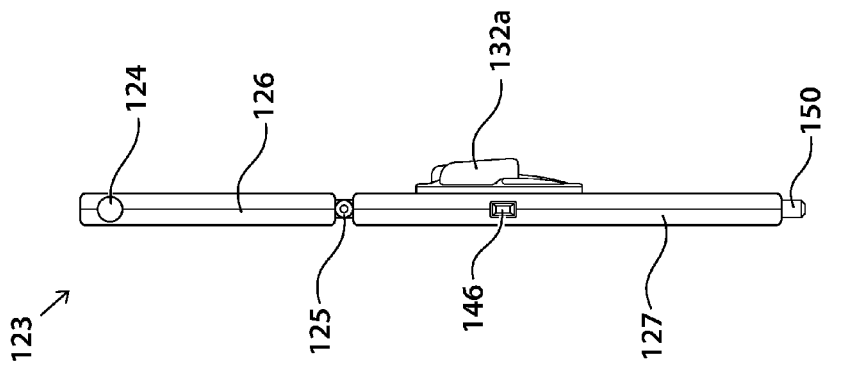
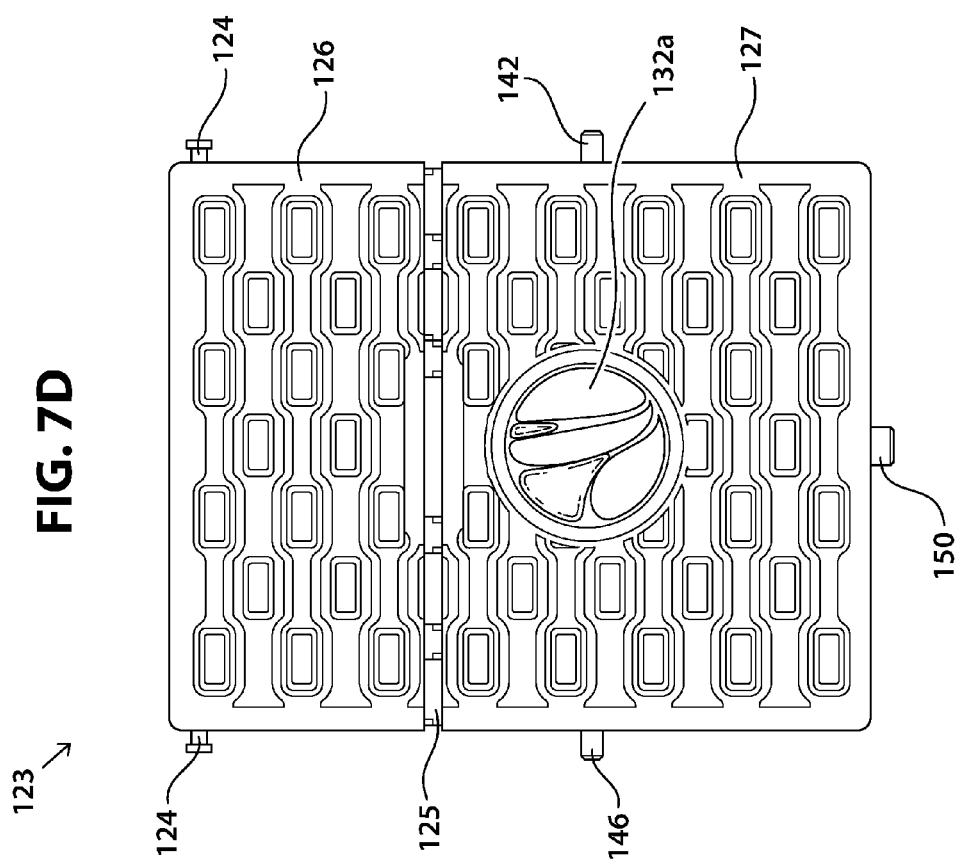

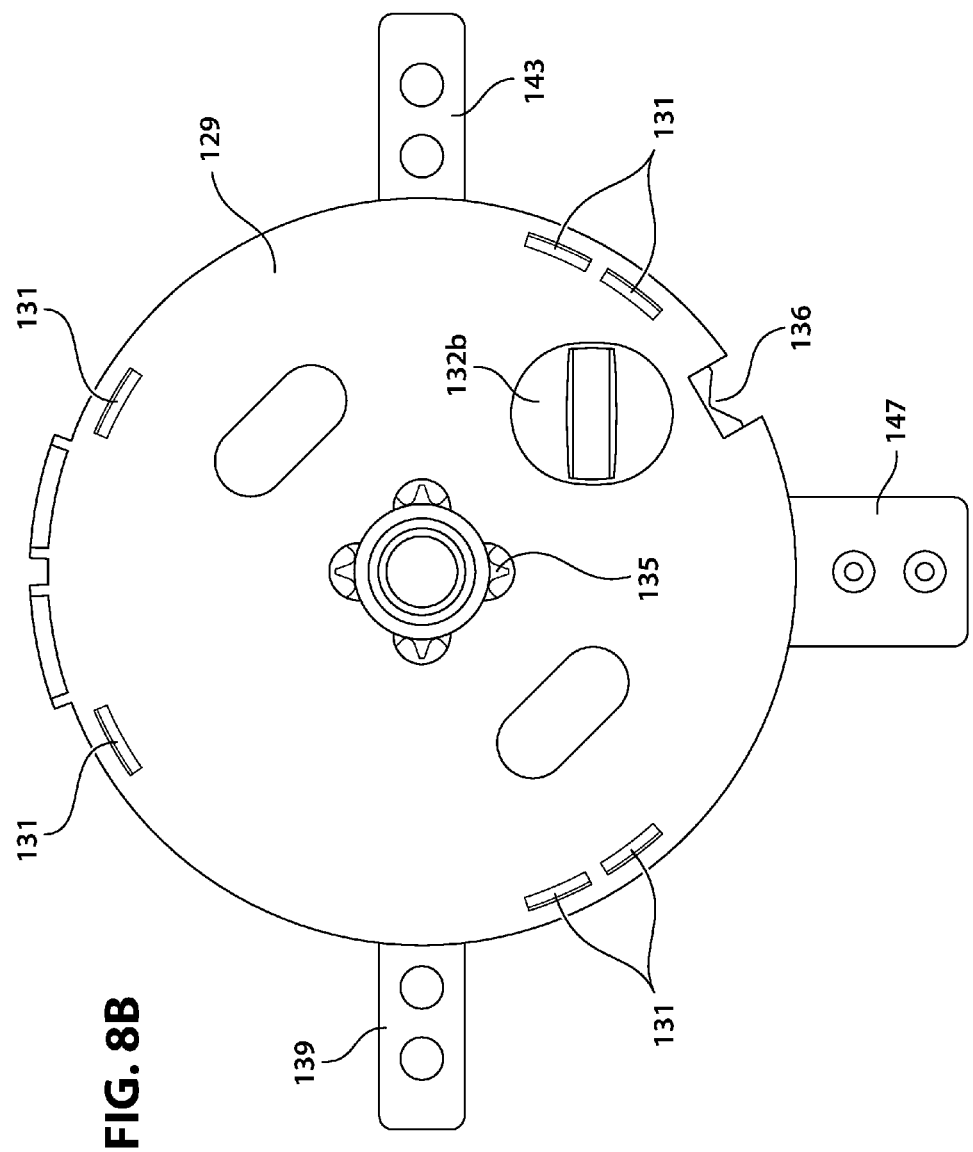

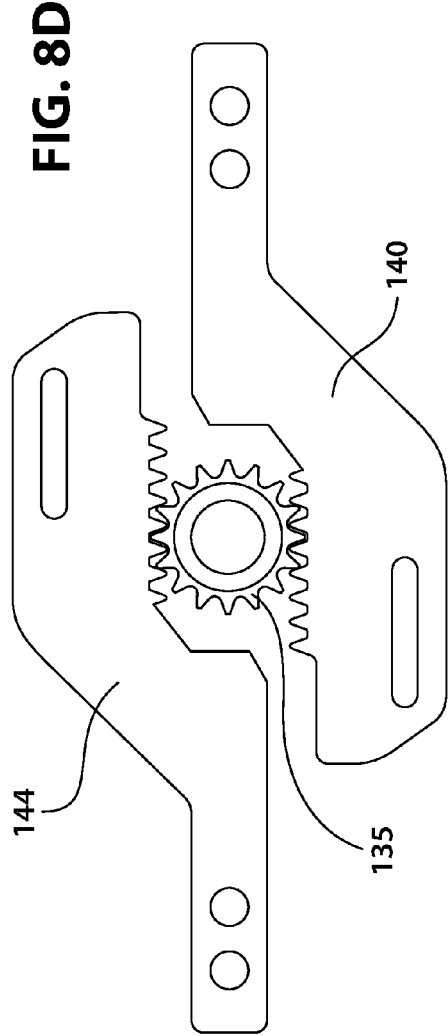
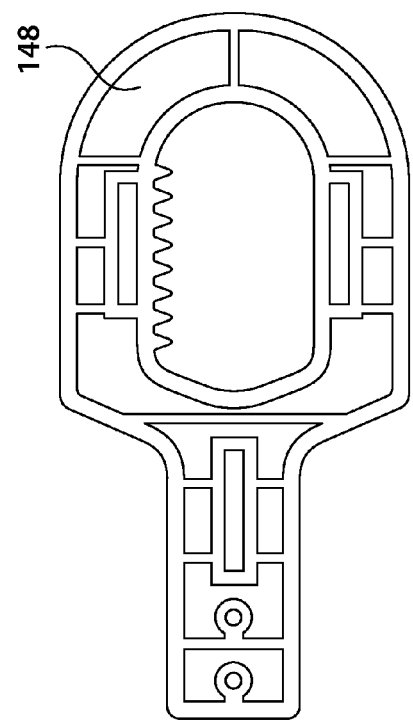
FIG. 8D
FIG. 8E

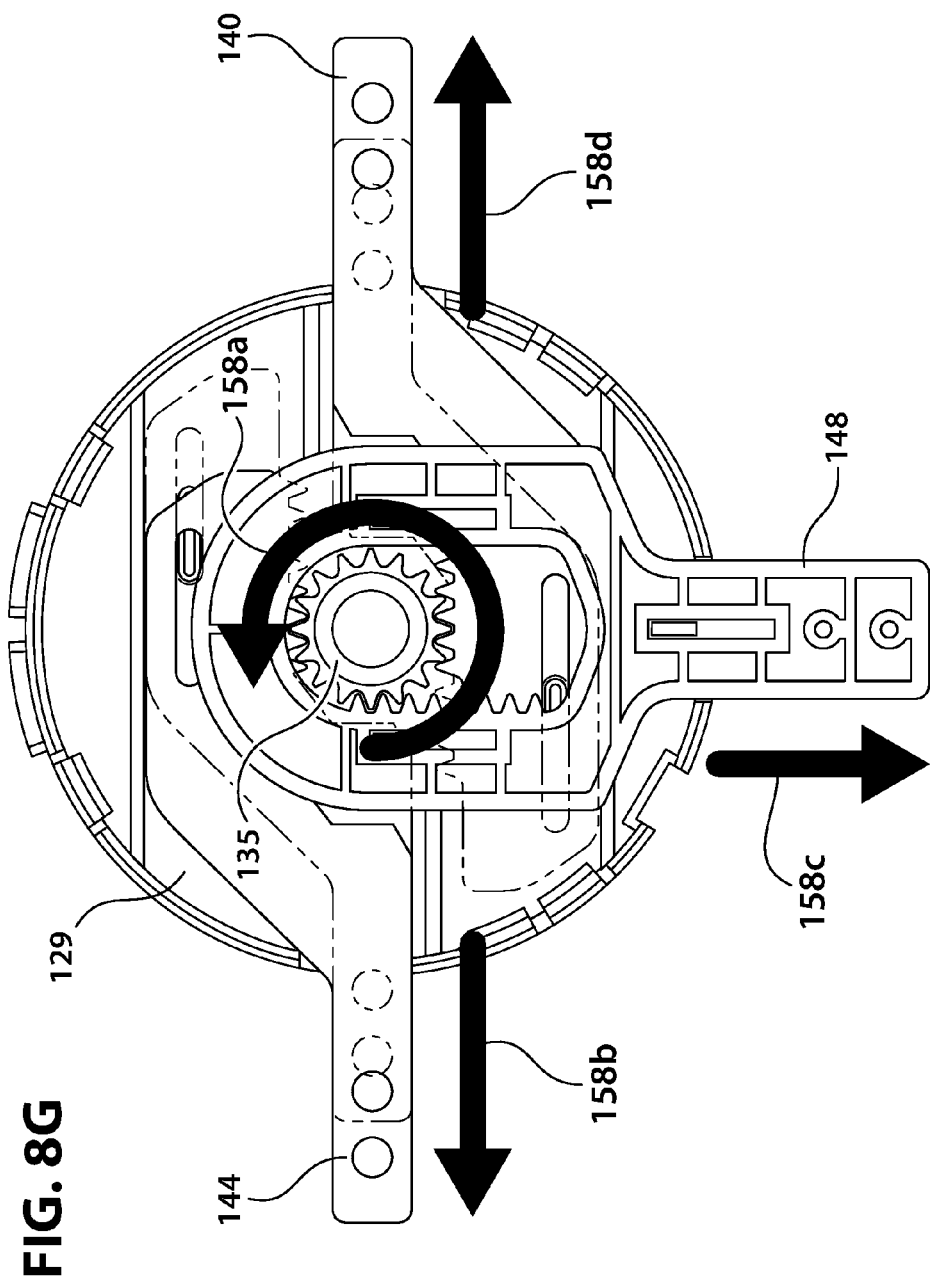

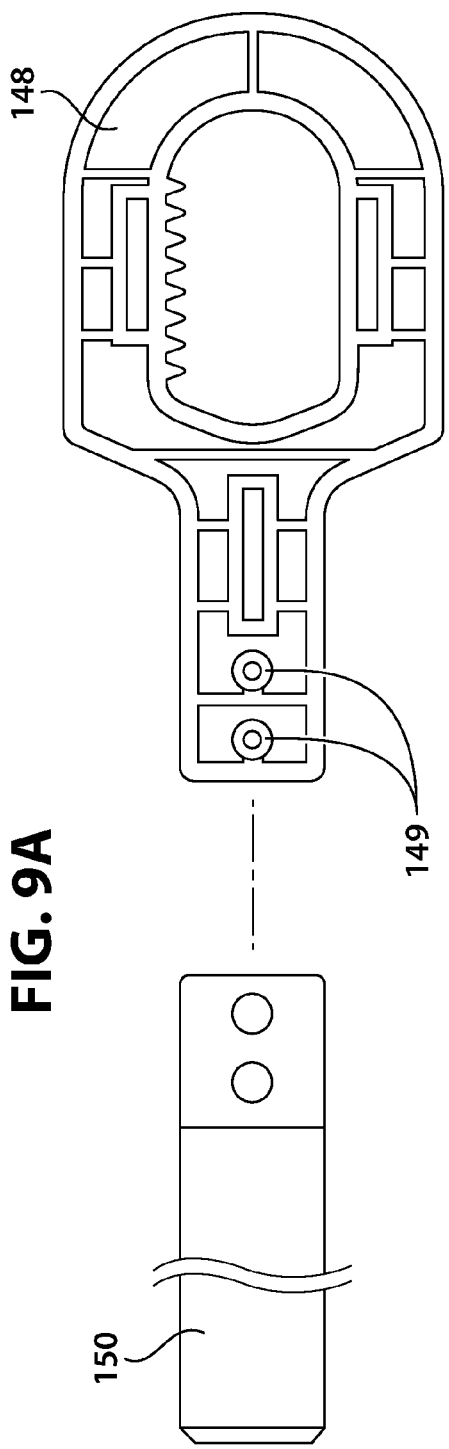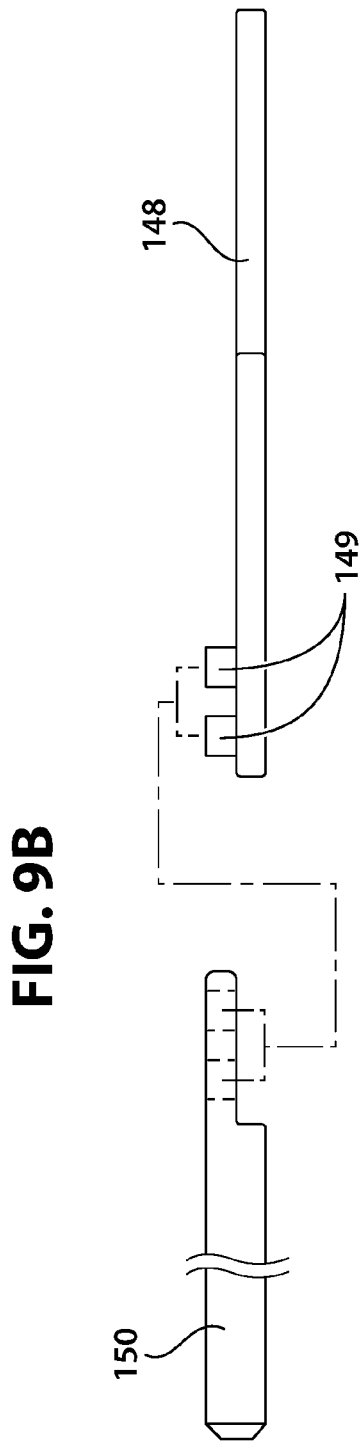

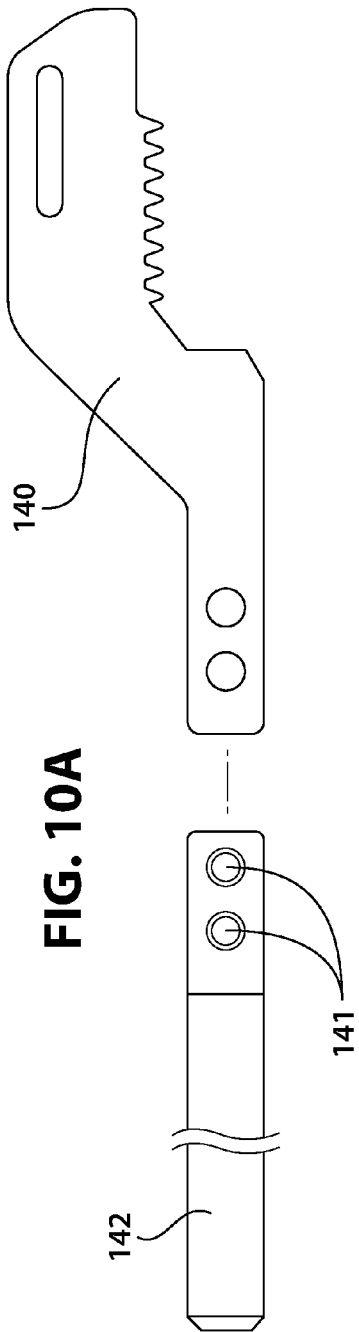
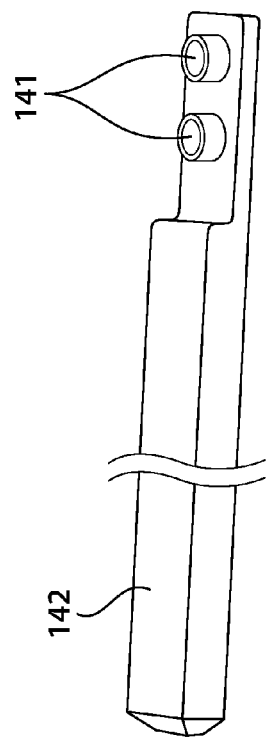
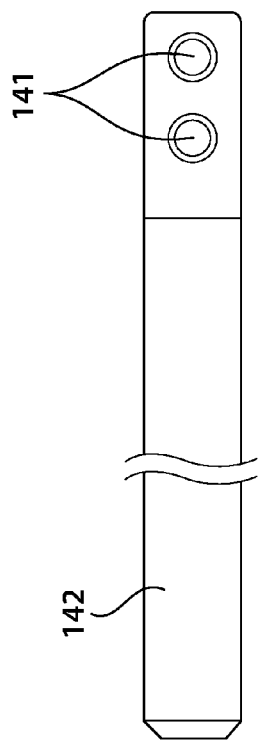
FIG. 10A
FIG. 10B
FIG. 10C

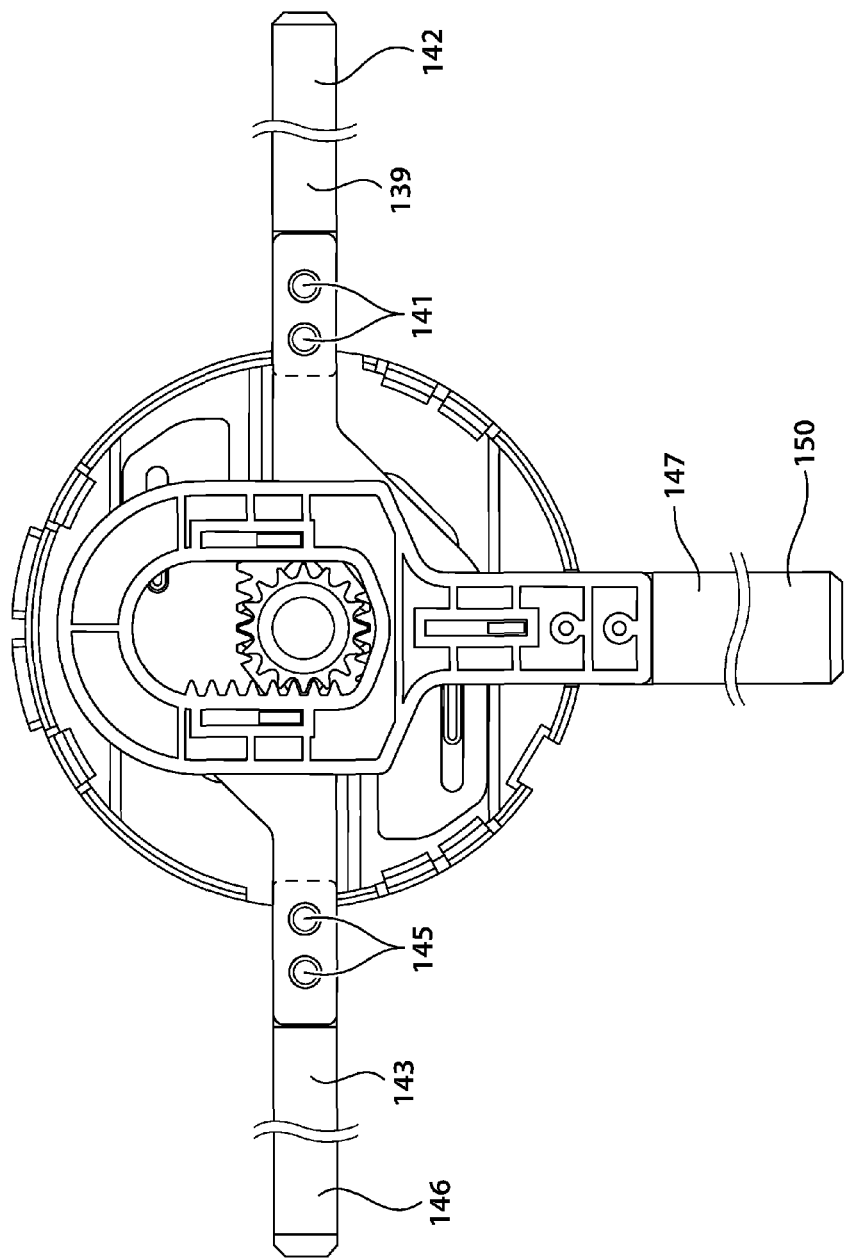

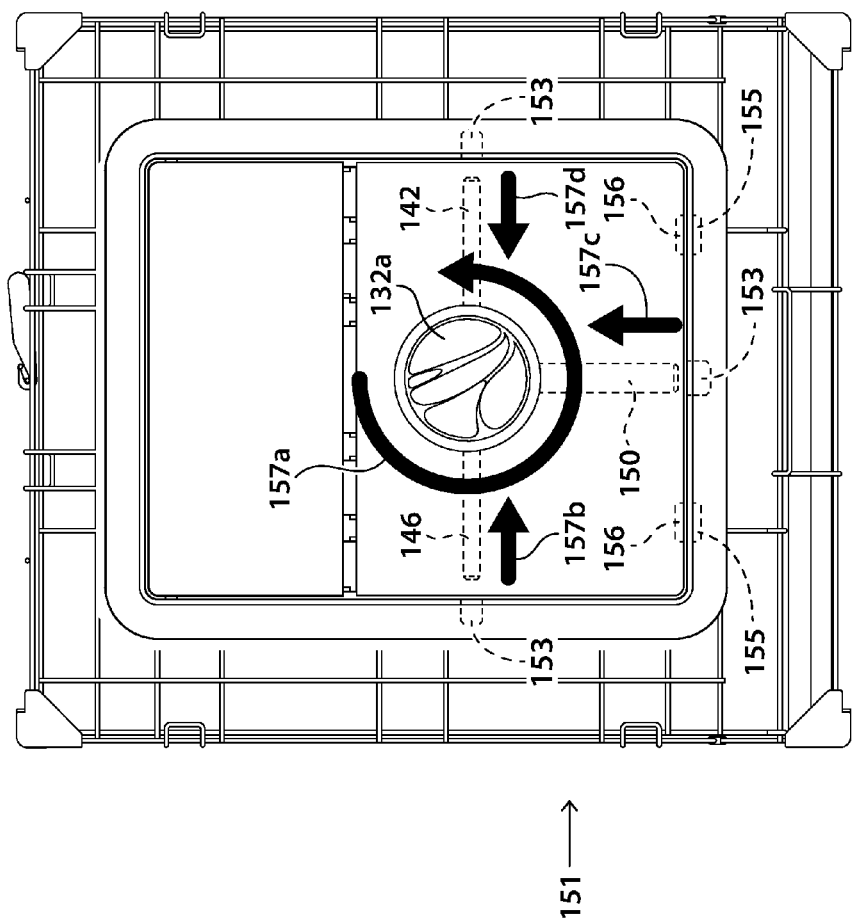

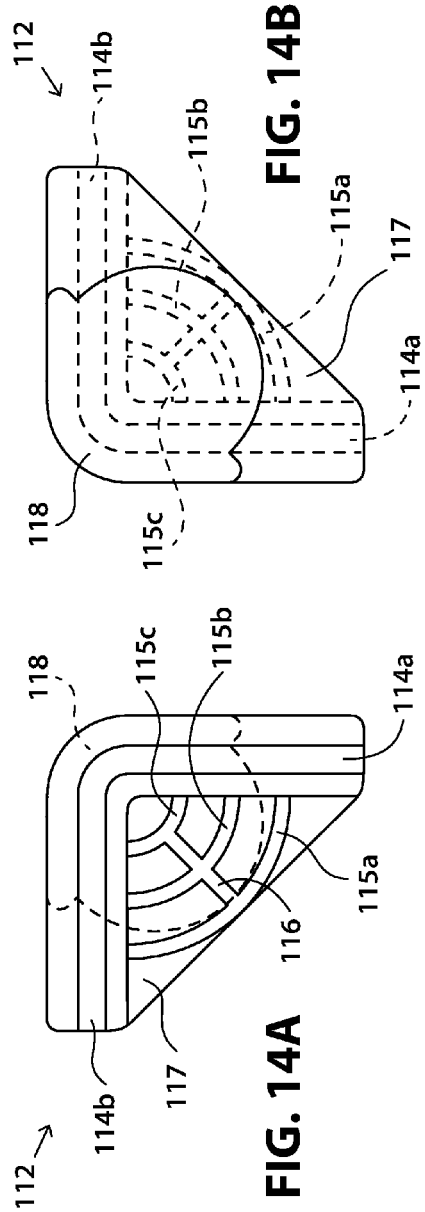

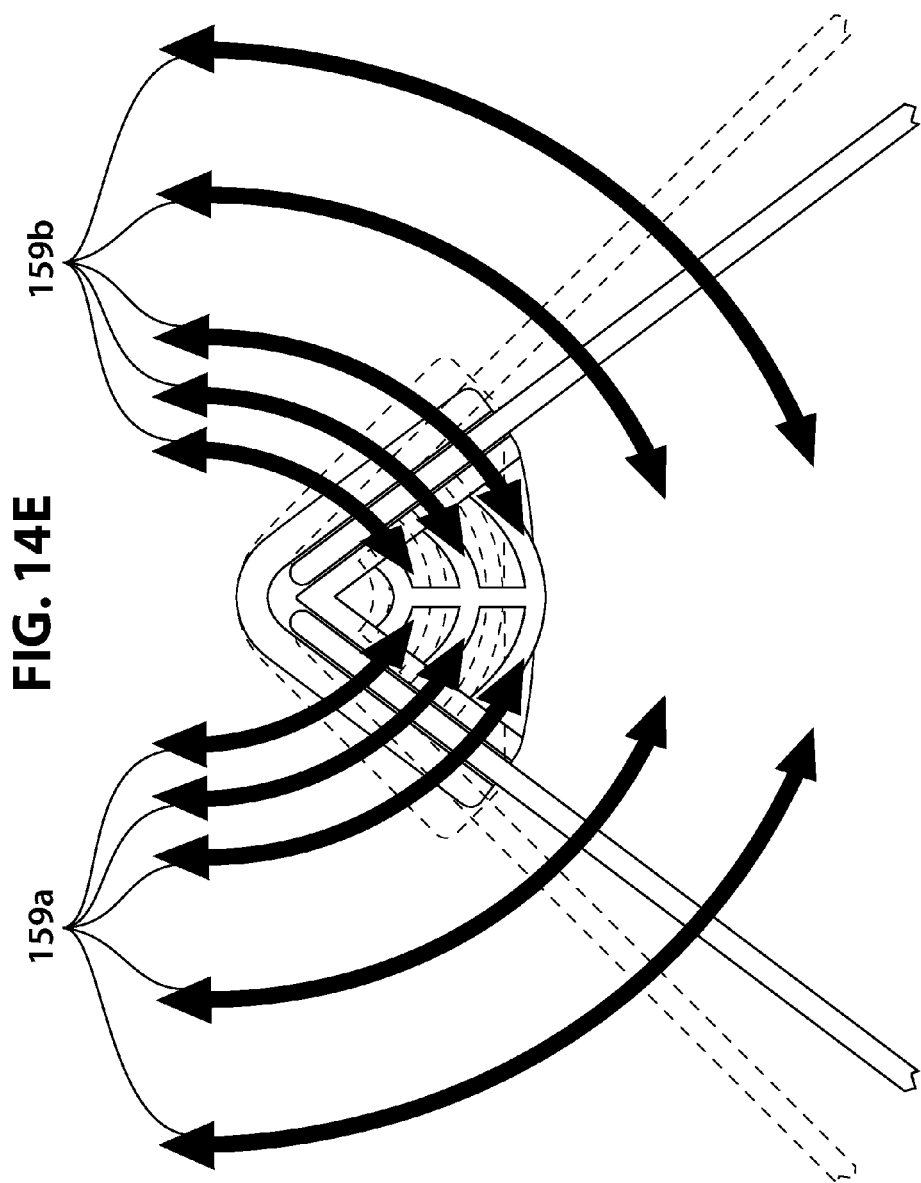

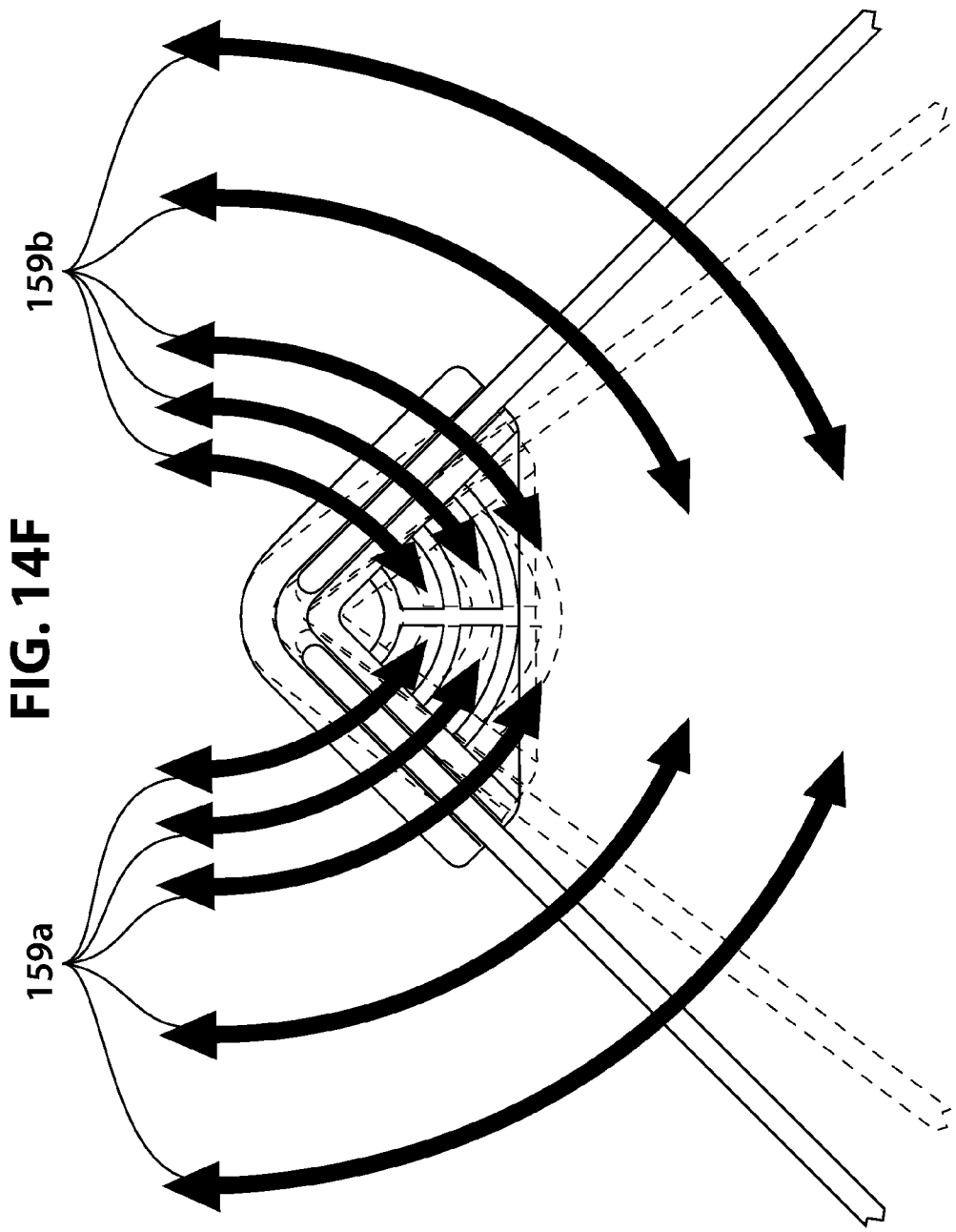

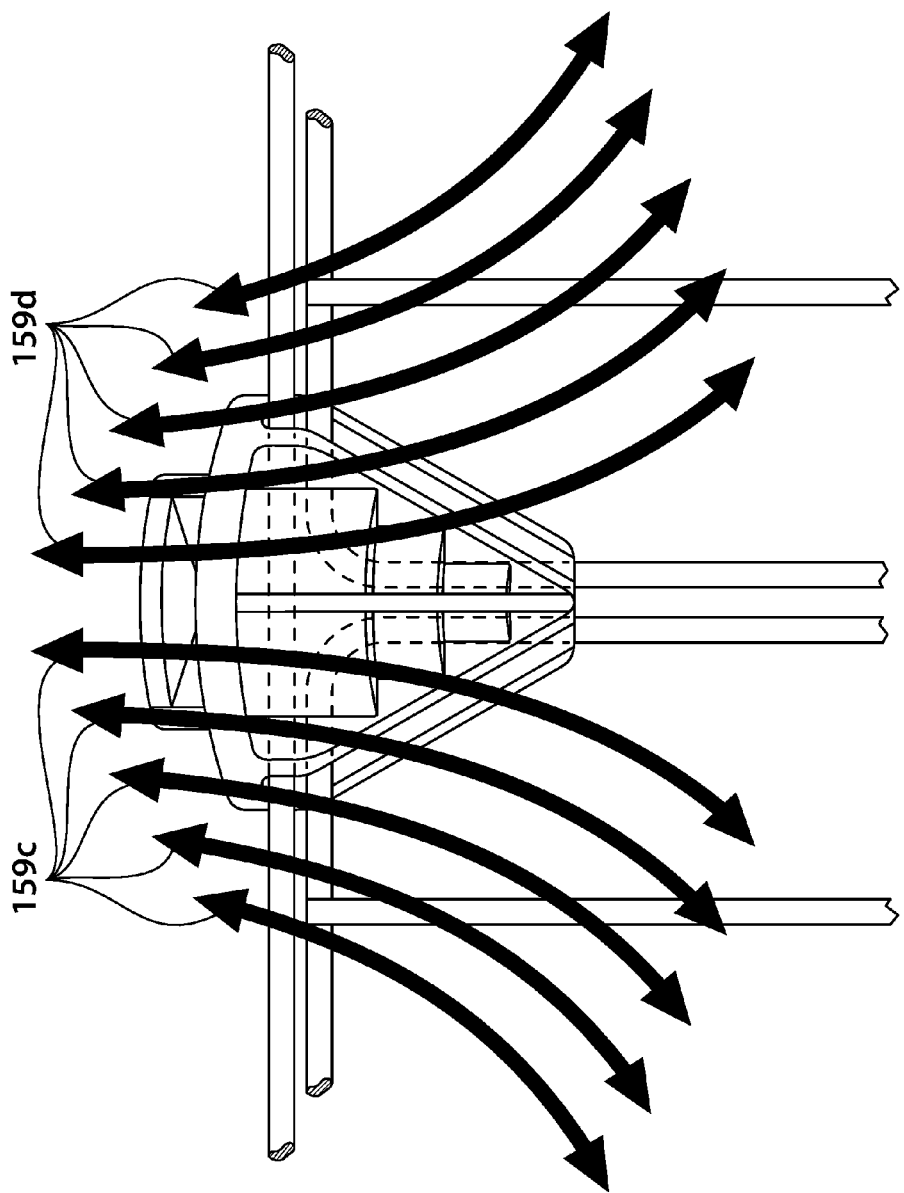

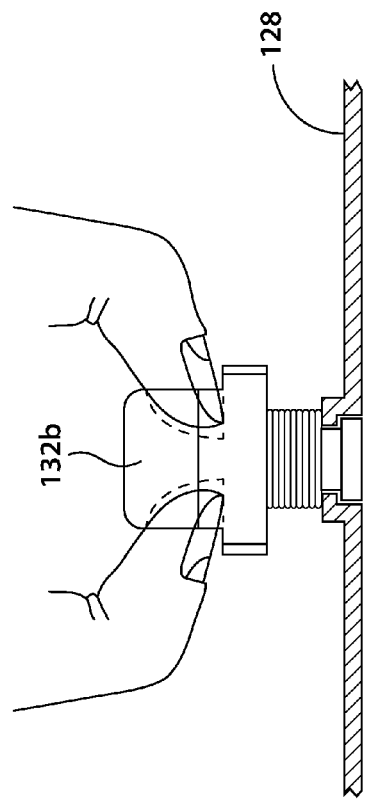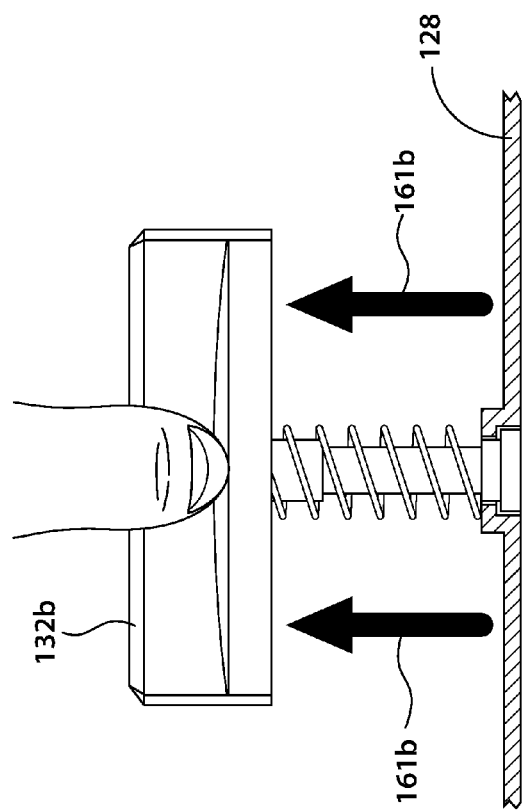
FIG. 16G
FIG. 16H

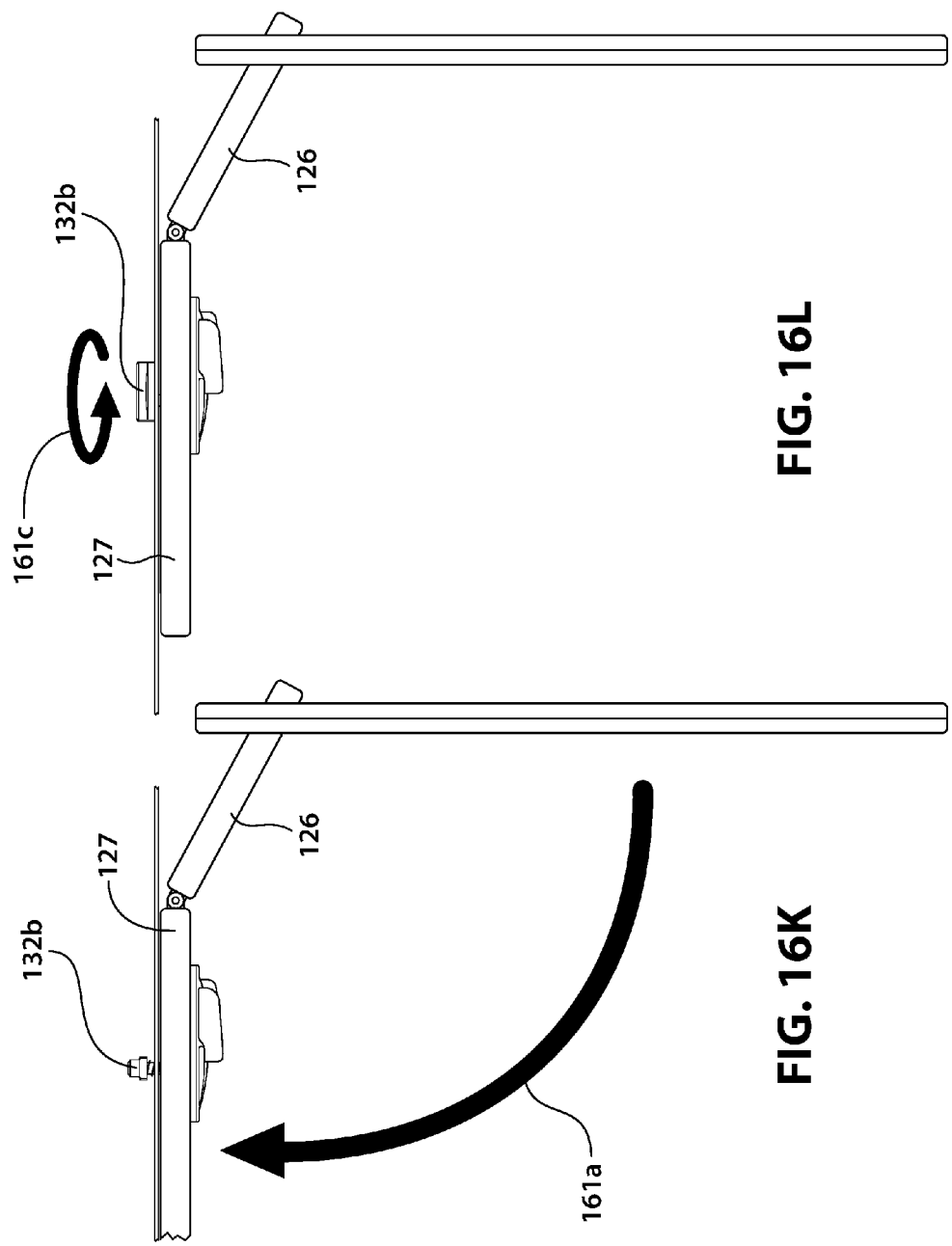

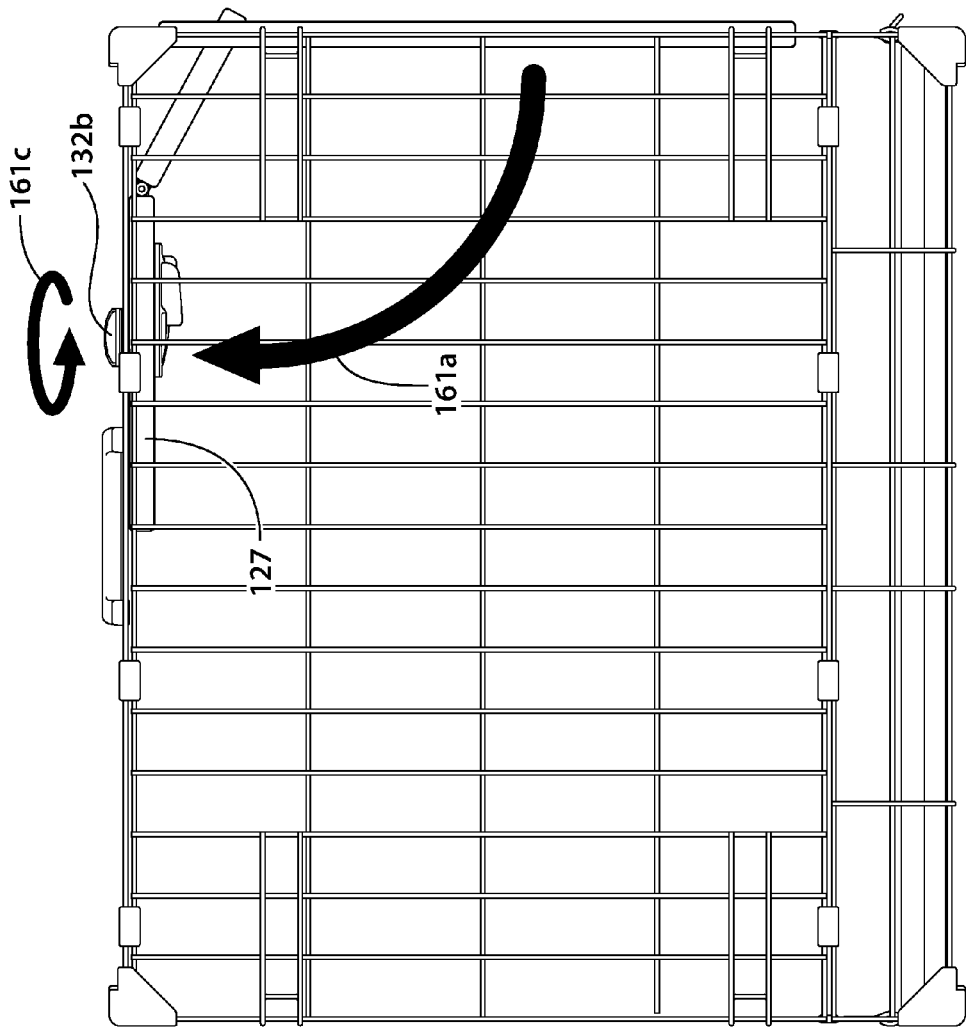

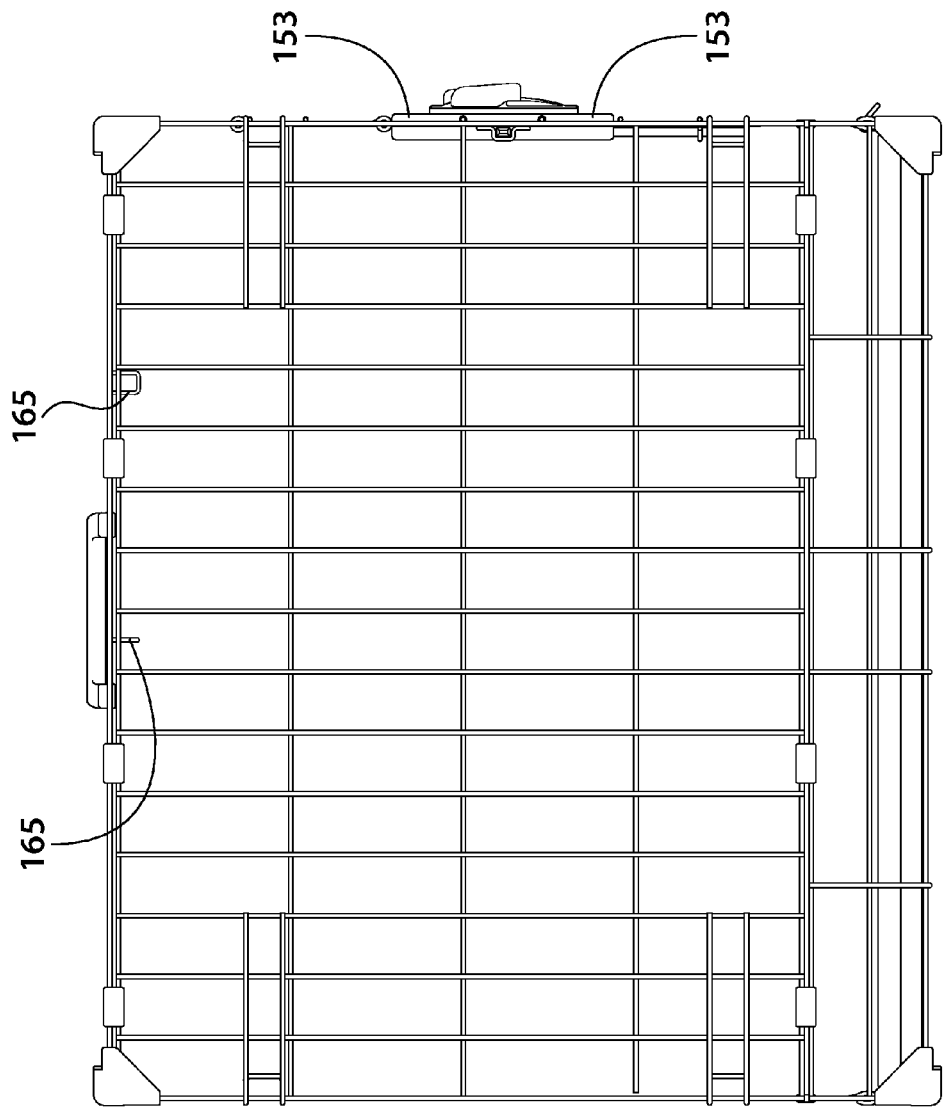

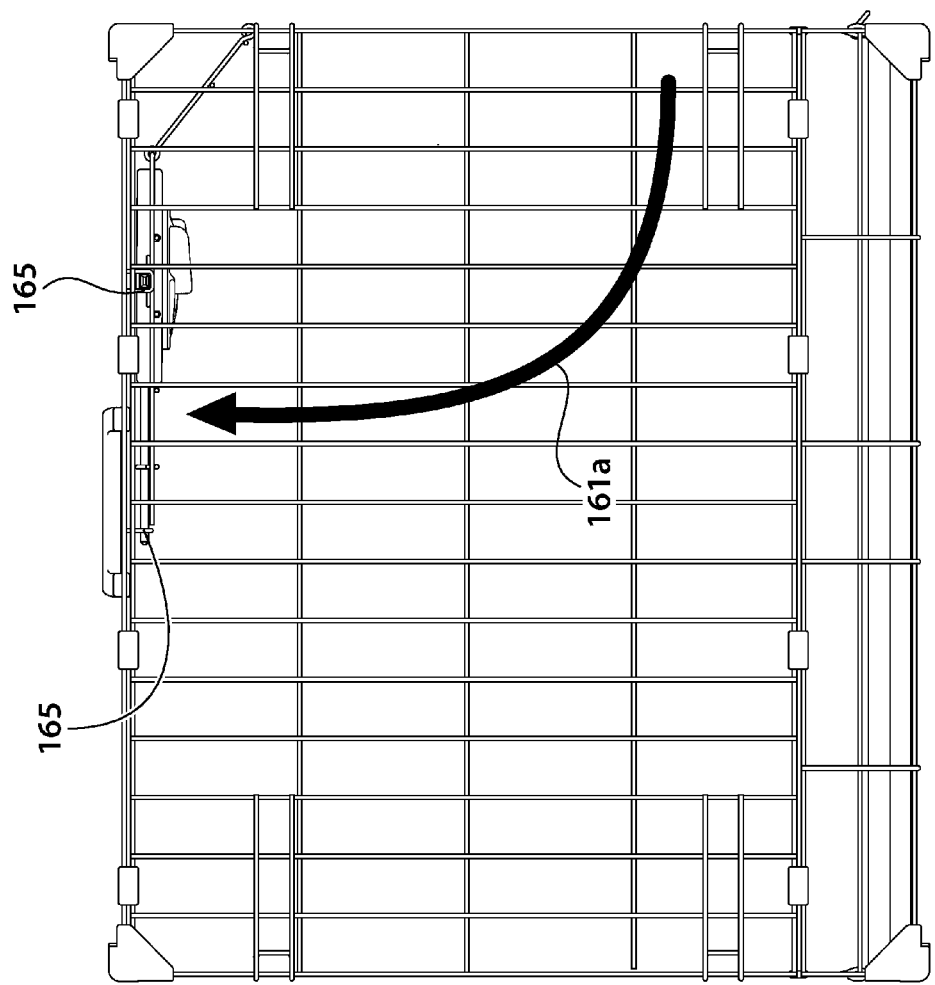

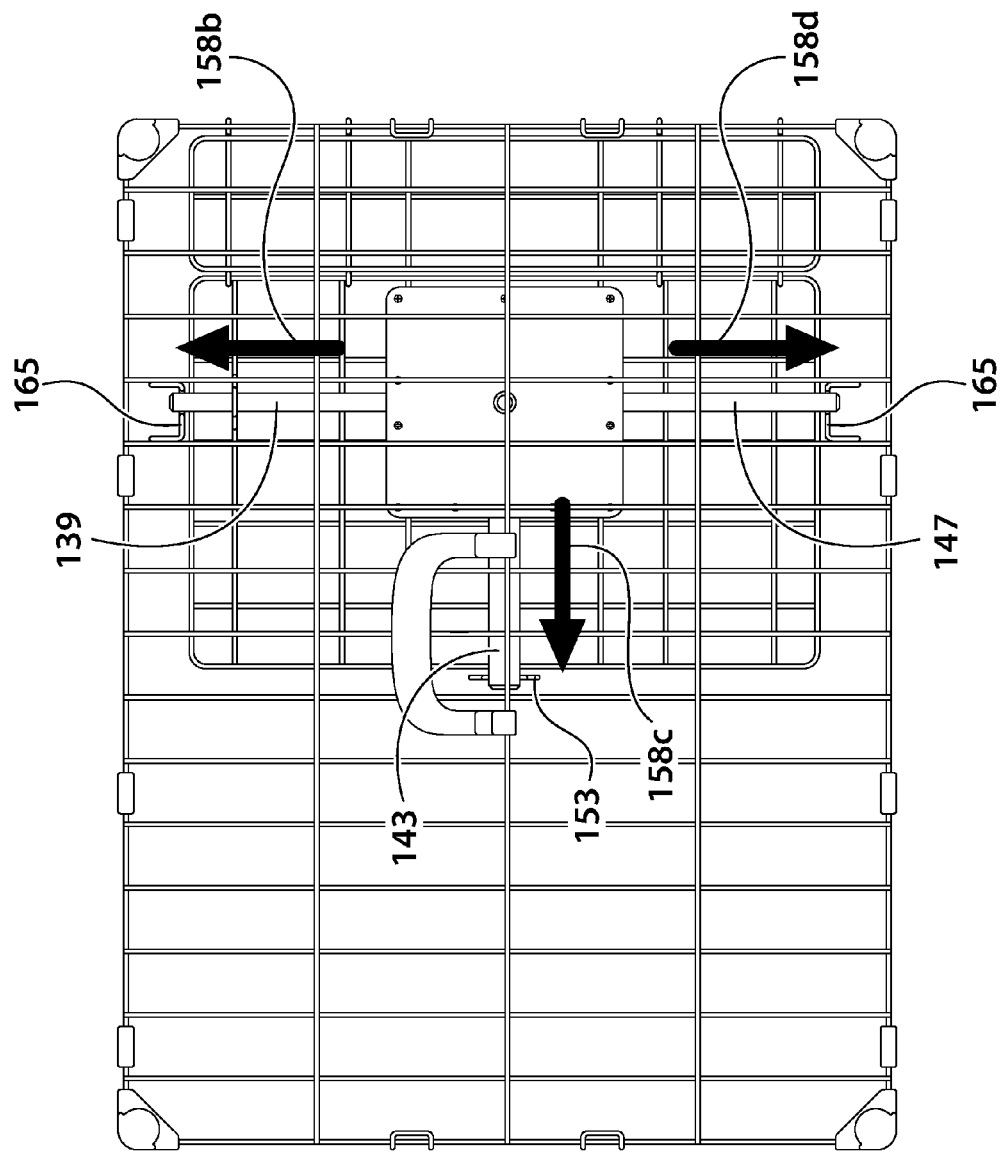

MULTI-STACKED-HINGE-DOOR PET CRATE, HAVING RIDGED SLANTED URINE-STORING BED SYSTEM, PLATFORM-LOCKING SHOCK-ABSORBING GUSSET SYSTEMS, DIKED GROOMING PLATFORM, AND TRIPLE-ROD-FRONT-LOCK SINGLE-KNOB-TOP-LOCK DOUBLE-MAGNET-FRONT-LOCK DOOR SYSTEM

1. FIELD OF THE INVENTION

The present invention relates to a foldable pet crate, which is cheap to produce, is easy to ship as one unit, requires no assembly, and can be quickly and easily be unfolded. Particularly, the present invention relates to a multi-stacked-hinge-door pet crate, having:
 a) Ridged slanted urine-storing bed system,
 b) Platform-locking shock-absorbing gusset systems,
 c) Diked grooming platform, and
 d) Triple-rod-front-lock single-knob-top-lock double-magnet-front-lock door system.

2. DESCRIPTION OF THE PRIOR ART

A number of foldable pet crates have been introduced.

U.S. Pat. No. 3,978,616, issued 1976 Sep. 7, to Everett C. Pennock, describes a pet door for closing an opening through a pet confining wall in a building, kennel, pen or the like, said door having a peripheral frame for mounting in the wall opening, a door member having its upper edge portion hinged to the frame on a horizontal axis for swinging movement of the door in either direction from a vertical closed position within the frame, and a spring tensioned slide acting between the frame and a cam on the upper edge of the door to yieldably retain the door in closed position.

U.S. Pat. No. 4,216,743, issued 1980 Aug. 12, to Robert E. Cohen, discloses a magnetically actuated pet door, which allows only the owner's pet, such as a cat or dog, to enter. The door is hinged at the top to open in both directions for ingress and egress, but is prevented from opening in the ingress direction by a solenoid-actuated, one-way latch comprised of a plunger against the inside of a flap that is in turn hinged on the inside of the pet door, and held flat against the pet door by springs.

U.S. Pat. No. 4,776,133, issued 198-10-11, to Anthony J. Green, describes a pet door which comprises a hinged flap mounted within a fixed frame and pivotable to allow passage therethrough in both directions. A locking mechanism is provided comprising a slide with two projections thereon which, in different lateral positions of the slide, are aligned with corresponding projections or cut-outs on the flap to allow or prevent pivoting of the flap in one or both directions.

U.S. Pat. No. 5,500,983, issued 1996 Mar. 26, to Reinhard Lautenschlager, relates to a corner cabinet hinge for hanging a free panel of a two-panel corner cabinet door on the panel that is hung by a hinge on the carcase supporting wall. The hinge has two members which are associated one with each of the door panels and which are formed as a hinge cup disposed in one of the door panels, and as a hinge arm mounted rotatably in the hinge cup and adjustably fastened to the other door panel.

U.S. Pat. No. 5,926,916, issued 1999 Jul. 27, to Seung-Woon Lee, relates to a computer having a door being opened/closed at either side having a case for protecting internal circuits of a computer from an external impact, a face which is attached to the front of the case; and a door, installed in an open area of the face, which can be opened/closed from either side.

U.S. Pat. No. 6,385,909, issued 2002 May 14, to Gary F. Marsh, outlines a pet door including a cammed closing mechanism and a sliding lock mechanism. The cammed closing mechanism returns the pet door to a resting closed position and provides sufficient force to resist opening by normal weather conditions such as wind or a hard rain without the need for additional components such as magnets. The sliding lock mechanism serves to control the ingress and/or the egress of an animal through the pet door as selected by the pet door owner.

U.S. Pat. No. 6,688,657, issued 2004 Feb. 10, to James L. Peacock, refers to a dual hinge door assembly that enables selective opening of one side of a two sided door or removal of the door. The two sides of the door have identical assemblies that connect via a horizontal bar. Actuating a switch causes the bar to move horizontally in one of two directions. Movement of the bar causes assemblies on each side of the door to rotate and translate the horizontal motion of the bar to vertical motion of a set of lock pins, and causes the handle on the side of the door selected for opening to become visible to the operator.

U.S. Pat. No. 7,120,967, issued 2006 Oct. 17, to Ryan E. Johnson, refers to a pet door hinge adapted to accommodate potentially damaging forces. The hinge mechanism includes a shaft that is received by a shock-absorbing bearing. The bearing is received by a sleeve. The bearing rotates within the sleeve to allow pivoting of the flap. In the event of potentially damaging forces, a resilient and deformable material forming the core of the bearing gives to prevent damage to or destruction of the hinge mechanism or the pet door.

U.S. Pat. No. 7,950,439, issued 2011 May 31, to Victor R. Anderson, demonstrates that by providing a door with components forming a multi-panel unit, a support & alignment mechanism, an automatic actuating panel action locking and release mechanism, sliding mechanism and hinges, a dual action door assembly is achieved which allows the door assembly to operate within controlled confines combining first a sliding action and then a swing action to open the door for full unobstructed access of a range of doorway widths from narrow to ultra-wide while overcoming the support problems, full open access problems and wide swing radii problems consistent with conventional doors.

U.S. Pat. No. 9,115,523, issued 2015 Aug. 25, to Raymond J. Friesen, defines a roller hinge assembly for connecting articulating door panels and simultaneously supporting a laterally extending panel support roller assembly including multiple uniformly sized hinges having a male hinge strap and a female strap. Two or more such uniformly sized hinge units are arrayed laterally or side by side co-joined by a single hinge pin. Further, to insure appropriate alignment, a tubular roller bushing co-joins the male or the female hinge straps.

U.S. Pat. No. 9,212,511, issued 2015 Dec. 15, to Lester L. Mortier, outlines an overhead door with spring-loaded roller hinges that push the door against its frame or weather stripping to provide an effective weather and thermal seal when the door is closed. The spring-loaded roller hinges are readily retrofit to overhead doors with conventional roller hinges. Each hinge spaces and pivotally secures a roller hub from the base of the hinge. The roller hub is pivotally secured to an inside flange and movably held by an elongated slot in an outer flange.

U.S. Pat. No. 9,297,190, issued 2016 Mar. 29, to Chen-Hsiang Lee, pertains to a hinge device for connecting two door panels of a folding door, and includes two installation strips and a connection strip for connecting the two installation strips. An installation slot is formed in each installation strip for receiving an inner end of an associated door panel. Two toothed portions are respectively formed on the installation strips and mesh with each other.

U.S. Pat. No. 9,357,748, issued 2016 Jun. 7, to Brad Cantwell, concerns an animal enclosure with a plurality of members which include a first member having a frame structure and door assembly formed by a plurality of interconnected horizontal and vertical wires. At least two of the horizontal wires of the frame structure form a hook positioned inside the defined opening. The door assembly is coupled to the frame and moves between an open and close positions. The door assembly includes a first door and a second door removably coupled to one another.

U.S. Pat. No. 9,546,511, issued 2017 Jan. 17, to Jay S. Dittmer, describes a hinge for a multi-panel door including a first bracket, a second bracket pivotally coupled to the first bracket, and a carrier link carrying a roller adapted to engage in a door track. The first bracket is operably attached to a first panel of the multi-panel door, the second bracket is operably attached to second panel of the multi-panel door, and the carrier link is pivotally attached to one of the first bracket or the second bracket. The carrier link is selectively positionable in a plurality of pre-defined positions.

U.S. Pat. No. D778,510, issued 2017 Feb. 7, to Addison Edmonds, depicts an ornamental design for an animal crate door.

U.S. Publication No. 20100282179, published 2010 Nov. 11, to Ying-Kuan Ho, reveals construction for a combination-type pet cage. Two lateral panels are assembled to a base by inserting flanges and screw rods into corresponding slots and holes of the base. Front and rear panel receiving portions are attached to the lateral panels onto projections formed at front ends and rear ends of the lateral panels. The lateral, front, and rear panels are secured in position to the base by wing nuts. Finally, a top panel is secured in position. Plural such pet cages are connectable and easily securable in position to one another.

DISADVANTAGES OF THE PRIOR ART

The prior art have failed to solve many problems associated with such foldable pet crates, as follows:
1) No prior art mention or disclose any pet crate, having a multi-function door system.
   Therefore, the prior art of pet crate:
   a) Cannot lock and adapt interchangeably to a plastic crate panel or wire crate panel;
   b) Cannot lock in horizontal position against the top panel of the multi-stacked-hinge-door pet crate,
      to allow large dogs to enter and exit easily;
   c) Cannot lock in horizontal position against the top panel of the multi-stacked-hinge-door pet crate,
      to allow interior space for better utilization for all-size pets; and
   d) Cannot allow a quick single movement
      to lock the door in a horizontal or vertical position.
2) No prior art mention or disclose any pet crate, having a palm knob. Therefore, the prior art of pet crate:
   a) Cannot conform to person's arthritic hand without bending fingers or hand,
      to lock and unlock the multi-function door system with minimal effort;
   b) Cannot allow other conventional grips on the palm knob,
      to lock and unlock the multi-function door system with a person's hand;
   c) Cannot allow minimal effort and contortion for a person's arthritic hand,
      to rotate the palm knob; and
   d) Cannot fit typical small and large sized hands.
3) No prior art mention or disclose any pet crate, having a spring-loaded palm knob.
   Therefore, the prior art of pet crate:
   a) Cannot conform to person's arthritic hand without bending fingers or hand,
      to lock and unlock the multi-function door system with minimal effort;
   b) Cannot allow other conventional grips on the spring-loaded palm knob,
      to lock and unlock the multi-function door system with a person's hand;
   c) Cannot allow minimal effort and contortion for a person's arthritic hand,
      to rotate the spring-loaded palm knob; and
   d) Cannot fit typical small and large sized hands.
4) No prior art mention or disclose any pet crate, having a multi-function grooming platform.
   Therefore, the prior art of pet crate:
   a) Cannot quickly and easily be attached,
      to multi-function platform-locking shock-absorbing gusset systems;
   b) Cannot conveniently provide secondary location for a pet,
      to stand, sit, lay, or be groomed on;
   c) Cannot conveniently allow pet grooming,
      to take place in the same location as the multi-stacked-hinge-door pet crate;
   d) Cannot conveniently provide standing, sitting, laying, or grooming area atop the multi-stacked-hinge-door pet crate,
      to take no additional square footage;
   e) Cannot conveniently provide alternate location for a pet,
      to provide them relief from confinement;
   f) Cannot quickly and easily be assembled and disassembled without tools; and
   g) Cannot quickly and easily be cleaned.
5) No prior art mention or disclose any pet crate, having platform dikes.
   Therefore, the prior art of pet crate:
   a) Cannot prevent pet urine from running off the multi-function grooming platform,
      to keep the multi-stacked-hinge-door pet crate and surrounding areas clean;
   b) Cannot prevent pet hair from falling off the multi-function grooming platform,
      to keep the multi-stacked-hinge-door pet crate and surrounding areas clean;
   c) Cannot prevent pet hair and urine from falling off the multi-function grooming platform,
      to protect the multi-stacked-hinge-door pet crate's crate area from contamination; and
   d) Cannot provide a comfort platform for a pet,
      to sit, stand, rest, and sleep thereon while being groomed.
6) No prior art mention or disclose any pet crate, having a multi-function slanted urine-storing bed system. Therefore, the prior art of pet crate:

a) Cannot allow urine to run down the sanitary urine-storing gutters,
   to keep the slanted sanitary-urine-storing-gutter bed dry;
b) Cannot provide gutter ridges to elevate pet paws from the sanitary urine-storing gutters,
   to prevent pets from stepping in urine;
c) Cannot provide a comfort platform for pets,
   to allow the pets to sit, stand, play, rest, and sleep thereon;
d) Cannot keep pets away and not on urine,
   to keep the pets dry; and
e) Cannot keep pets away and not on urine,
   to prevent the pets from getting diseases and infections caused by their own urine.
7) No prior art mention or disclose any pet crate, having sanitary urine-storing gutters.
Therefore, the prior art of pet crate:
a) Cannot store urine running down from a slanted sanitary-urine-storing-gutter bed,
   to keep the slanted sanitary-urine-storing-gutter bed dry;
b) Cannot store urine running down from a slanted sanitary-urine-storing-gutter bed,
   to prevent pets from being on their own urine;
c) Cannot prevent pets from getting diseases and infections caused by their own urine;
d) Cannot quickly and easily be assembled and disassembled without tools; and
e) Cannot quickly and easily be cleaned.
8) No prior art mention or disclose any pet crate, having platform-locking shock-absorbing gusset tabs. Therefore, the prior art of pet crate:
a) Cannot lock the multi-function grooming platform,
   to the platform-locking shock-absorbing gusset tabs when the platform-locking corners are inserted under the platform-locking shock-absorbing gusset tabs;
b) Cannot apply the downward pressure of the weight of the pet,
   to additionally lock and secure the multi-function grooming platform;
c) Cannot secure the multi-function grooming platform atop the multi-stacked-hinge-door pet crate,
   to conveniently groom a pet thereon;
d) Cannot interchange from top to bottom, right to left, and front to back,
   to be economically manufactured; and
e) Cannot save materials, labor, and time.
9) No prior art mention or disclose any pet crate, having multi-function platform-locking shock-absorbing gusset systems. Therefore, the prior art of pet crate:
a) Cannot absorb shocks and impacts exerted on the multi-stacked-hinge-door pet crate,
   to provide pets with comfort while being stationary or transported;
b) Cannot prevent all eight corners of the multi-stacked-hinge-door pet crate from causing injuries to people and pets,
   to make the multi-stacked-hinge-door pet crate safer to use;
c) Cannot absorb vibrations exerted on the multi-stacked-hinge-door pet crate,
   to provide pets with comfort while being stationary or transported; and
d) Cannot resist the twisting, bending, and wobbling forces exerted on the multi-stacked-hinge-door pet crate
   to strengthen the multi-stacked-hinge-door pet crate.
10) No prior art mention or disclose any pet crate, having curved gusset springs, vertical gusset spring, and horizontal gusset springs. Therefore, the prior art of pet crate:
a) Cannot absorb shocks and impacts exerted on the multi-stacked-hinge-door pet crate,
   to provide pets with comfort while being stationary or transported;
b) Cannot prevent all eight corners of the multi-stacked-hinge-door pet crate from causing injuries to people and pets,
   to make the multi-stacked-hinge-door pet crate safer to use;
c) Cannot absorb vibrations exerted on the multi-stacked-hinge-door pet crate,
   to provide pets with comfort while being stationary or transported; and
d) Cannot resist the twisting, bending, and wobbling forces exerted on the multi-stacked-hinge-door pet crate
   to strengthen the multi-stacked-hinge-door pet crate.

OBJECTS AND ADVANTAGES OF THE INVENTION

The present invention substantially departs from the conventional concepts and designs of the prior art. In doing so, the present invention provides a multi-stacked-hinge-door pet crate (having: a) Ridged slanted urine-storing bed system, b) Platform-locking shock-absorbing gusset systems, c) Diked grooming platform, and d) Triple-rod-front-lock single-knob-top-lock double-magnet-front-lock door system), having many unique and significant features, functions, and advantages, which overcome all the disadvantages of the prior art, as follows:
1) It is an object of the new invention to provide a multi-stacked-hinge-door pet crate, having a multi-function door system. Therefore, the multi-stacked-hinge-door pet crate:
a) Can lock and adapt interchangeably
   to a plastic crate panel or wire crate panel;
b) Can lock in horizontal position against the top panel of the multi-stacked-hinge-door pet crate,
   to allow large dogs to enter and exit easily;
c) Can lock in horizontal position against the top panel of the multi-stacked-hinge-door pet crate,
   to allow interior space for better utilization for all-size pets; and
d) Can allow a quick single movement
   to lock the door in a horizontal or vertical position.
2) It is another object of the new invention to provide a multi-stacked-hinge-door pet crate, having a palm knob. Therefore, the multi-stacked-hinge-door pet crate:
a) Can conform to person's arthritic hand without bending fingers or hand,
   to lock and unlock the multi-function door system with minimal effort;
b) Can allow other conventional grips on the palm knob,
   to lock and unlock the multi-function door system with a person's hand;
c) Can allow minimal effort and contortion for a person's arthritic hand,
   to rotate the palm knob; and
d) Can fit typical small and large sized hands.

3) It is another object of the new invention to provide a multi-stacked-hinge-door pet crate, having a spring-loaded palm knob. Therefore, the multi-stacked-hinge-door pet crate:
   a) Can conform to person's arthritic hand without bending fingers or hand,
      to lock and unlock the multi-function door system with minimal effort;
   b) Can allow other conventional grips on the spring-loaded palm knob,
      to lock and unlock the multi-function door system with a person's hand;
   c) Can allow minimal effort and contortion for a person's arthritic hand,
      to rotate the spring-loaded palm knob; and
   d) Can fit typical small and large sized hands.
4) It is a further object of the new invention to provide a multi-stacked-hinge-door pet crate, having a multi-function grooming platform. Therefore, the multi-stacked-hinge-door pet crate:
   a) Can quickly and easily be attached,
      to multi-function platform-locking shock-absorbing gusset systems;
   b) Can conveniently provide secondary location for a pet,
      to stand, sit, lay, or be groomed on;
   c) Can conveniently allow pet grooming,
      to take place in the same location as the multi-stacked-hinge-door pet crate;
   d) Can conveniently provide standing, sitting, laying, or grooming area atop the multi-stacked-hinge-door pet crate,
      to take no additional square footage;
   e) Can conveniently provide alternate location for a pet,
      to provide them relief from confinement;
   f) Can quickly and easily be assembled and disassembled without tools; and
   g) Can quickly and easily be cleaned.
5) It is an even further object of the new invention to provide a multi-stacked-hinge-door pet crate, having platform dikes. Therefore, the multi-stacked-hinge-door pet crate:
   a) Can prevent pet urine from running off the multi-function grooming platform,
      to keep the multi-stacked-hinge-door pet crate and surrounding areas clean;
   b) Can prevent pet hair from falling off the multi-function grooming platform,
      to keep the multi-stacked-hinge-door pet crate and surrounding areas clean;
   c) Can prevent pet hair and urine from falling off the multi-function grooming platform,
      to protect the multi-stacked-hinge-door pet crate's crate area from contamination; and
   d) Can provide a comfort platform for a pet,
      to sit, stand, rest, and sleep thereon while being groomed.
6) It is another object of the new invention to provide a multi-stacked-hinge-door pet crate, having a multi-function slanted urine-storing bed system. Therefore, the multi-stacked-hinge-door pet crate:
   a) Can allow urine to run down the sanitary urine-storing gutters,
      to keep the slanted sanitary-urine-storing-gutter bed dry;
   b) Can provide gutter ridges to elevate pet paws from the sanitary urine-storing gutters,
      to prevent pets from stepping in urine;
   c) Can provide a comfort platform for pets,
      to allow the pets to sit, stand, play, rest, and sleep thereon;
   d) Can keep pets away and not on urine,
      to keep the pets dry; and
   e) Can keep pets away and not on urine,
      to prevent the pets from getting diseases and infections caused by their own urine.
7) It is yet another object of the new invention to provide a multi-stacked-hinge-door pet crate, having sanitary urine-storing gutters. Therefore, the multi-stacked-hinge-door pet crate:
   a) Can store urine running down from a slanted sanitary-urine-storing-gutter bed,
      to keep the slanted sanitary-urine-storing-gutter bed dry;
   b) Can store urine running down from a slanted sanitary-urine-storing-gutter bed,
      to prevent pets from being on their own urine;
   c) Can prevent pets from getting diseases and infections caused by their own urine;
   d) Can quickly and easily be assembled and disassembled without tools; and
   e) Can quickly and easily be cleaned.
8) It is still yet another object of the new invention to provide a multi-stacked-hinge-door pet crate, having platform-locking shock-absorbing gusset tabs. Therefore, the multi-stacked-hinge-door pet crate:
   a) Can lock the multi-function grooming platform,
      to the platform-locking shock-absorbing gusset tabs when the platform-locking corners are inserted under the platform-locking shock-absorbing gusset tabs;
   b) Can apply the downward pressure of the weight of the pet,
      to additionally lock and secure the multi-function grooming platform;
   c) Can secure the multi-function grooming platform atop the multi-stacked-hinge-door pet crate,
      to conveniently groom a pet thereon;
   d) Can interchange from top to bottom, right to left, and front to back,
      to be economically manufactured; and
   e) Can save materials, labor, and time.
9) It is still yet an even further object of the new invention to provide a multi-stacked-hinge-door pet crate, having multi-function platform-locking shock-absorbing gusset systems. Therefore, the multi-stacked-hinge-door pet crate:
   a) Can absorb shocks and impacts exerted on the multi-stacked-hinge-door pet crate,
      to provide pets with comfort while being stationary or transported;
   b) Can prevent all eight corners of the multi-stacked-hinge-door pet crate from causing injuries to people and pets,
      to make the multi-stacked-hinge-door pet crate safer to use;
   c) Can absorb vibrations exerted on the multi-stacked-hinge-door pet crate,
      to provide pets with comfort while being stationary or transported; and
   d) Can resist the twisting, bending, and wobbling forces exerted on the multi-stacked-hinge-door pet crate
      to strengthen the multi-stacked-hinge-door pet crate.
10) It is still yet an even further object of the new invention to provide a multi-stacked-hinge-door pet crate, having curved gusset springs, vertical gusset spring, and horizontal gusset springs. Therefore, the multi-stacked-hinge-door pet crate:
a) Can absorb shocks and impacts exerted on the multi-stacked-hinge-door pet crate,
   to provide pets with comfort while being stationary or transported;
b) Can prevent all eight corners of the multi-stacked-hinge-door pet crate from causing injuries to people and pets,
   to make the multi-stacked-hinge-door pet crate safer to use;
c) Can absorb vibrations exerted on the multi-stacked-hinge-door pet crate,
   to provide pets with comfort while being stationary or transported; and
d) Can resist the twisting, bending, and wobbling forces exerted on the multi-stacked-hinge-door pet crate
   to strengthen the multi-stacked-hinge-door pet crate.

Other objects and advantages of the present invention will become apparent from a consideration of the accompanying drawings and ensuing description.

BRIEF DESCRIPTION OF THE DRAWINGS

FIGS. 1A, 1B, 2A, and 2B illustrate side and top views of the multi-stacked-hinge-door pet crate, having multi-function slanted urine-storing bed system, multi-function platform-locking shock-absorbing gusset systems, multi-function grooming platform, and multi-function door system.

FIGS. 5A, 5B, 5C, 6, 7A, 7B, 7C, 7D, 7E, 7F, 8A, 8B, 8C, 8D, 8E, 8F, 8G, 9A, and 9B illustrate side, front, and rear views of how door-locking rods and rod-locking-and-unlocking gears are installed on multi-function door system.

FIGS. 10A, 10B, 10C, 10D, 10E, 10F, 10G, 10H, 11A, 11B, 12A, 12B, 12C, 12D, 13A, and 13B illustrate side, front, and perspective views of how door-locking rods and rod-locking-and-unlocking gears are operated on multi-function door system FIGS. 14A, 14B, 14C, 14D, 14E, 14F, 14G, 14H, 14I, 14J, and 14K illustrate top, side, front, and rear views of how multi-function platform-locking shock-absorbing gusset systems work.

FIGS. 16A, 16B, 16C, 16D, 16E, 16F, 16G, 16H, 16I, 16J, 16K, 16L, 16M, 16N, 16O, and 16P illustrate top, front, and perspective views of how to lock multi-function door system on the multi-stacked-hinge-door pet crate.

FIGS. 19A, 19B, 19C, 19D, 19E, 20A, 20B, 20C, and 21 illustrate front and side views of an equivalent variation of multi-function door system, having three rings attached to the top panel of the multi-stacked-hinge-door pet crate.

SUMMARY OF THE INVENTION

Figure 1B:
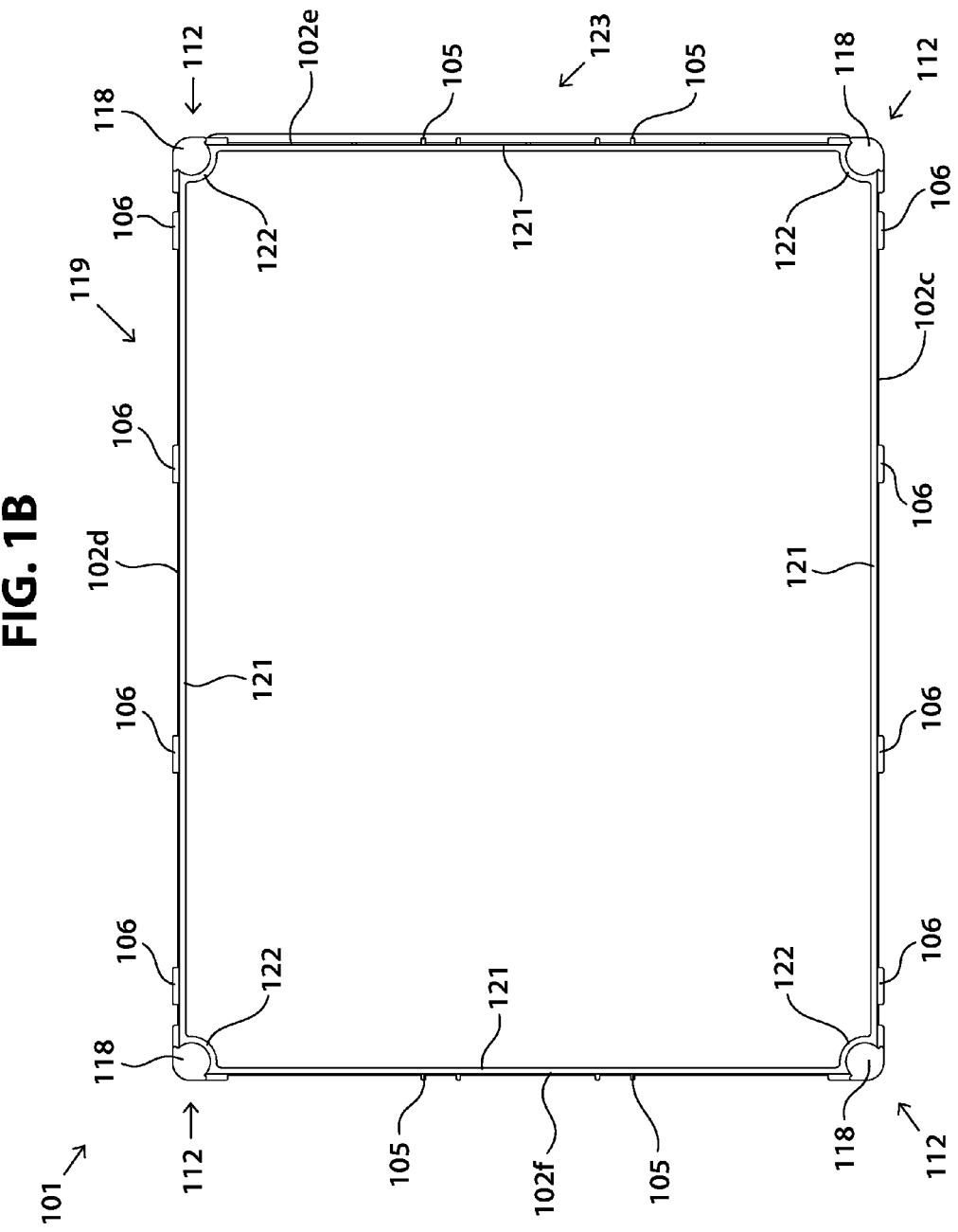
Figure 3:
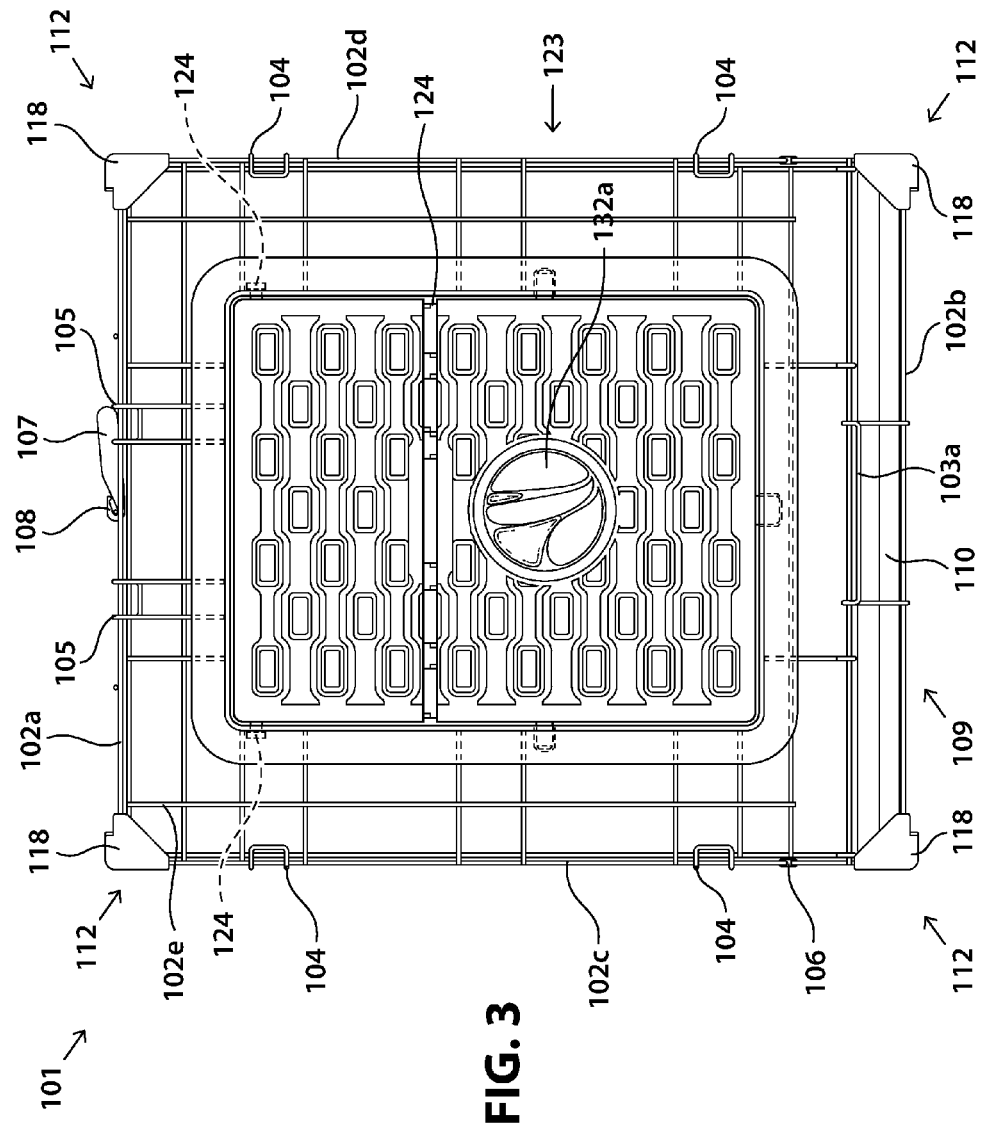
FIGS. 3 and 4 illustrate front and top views of how multi-function door system is installed on the front panel of the multi-stacked-hinge-door pet crate.
Figure 4:
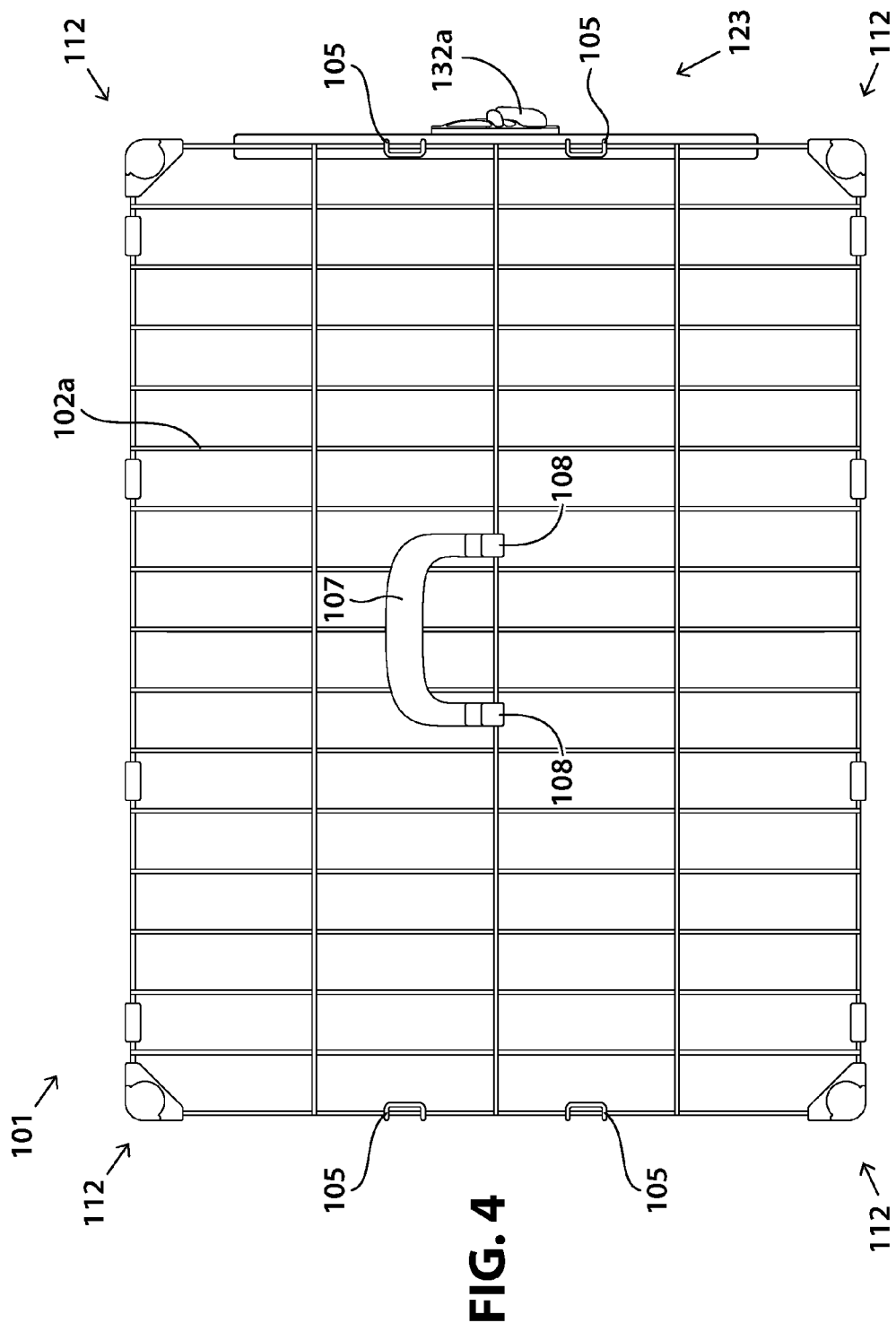
Figure 5B:
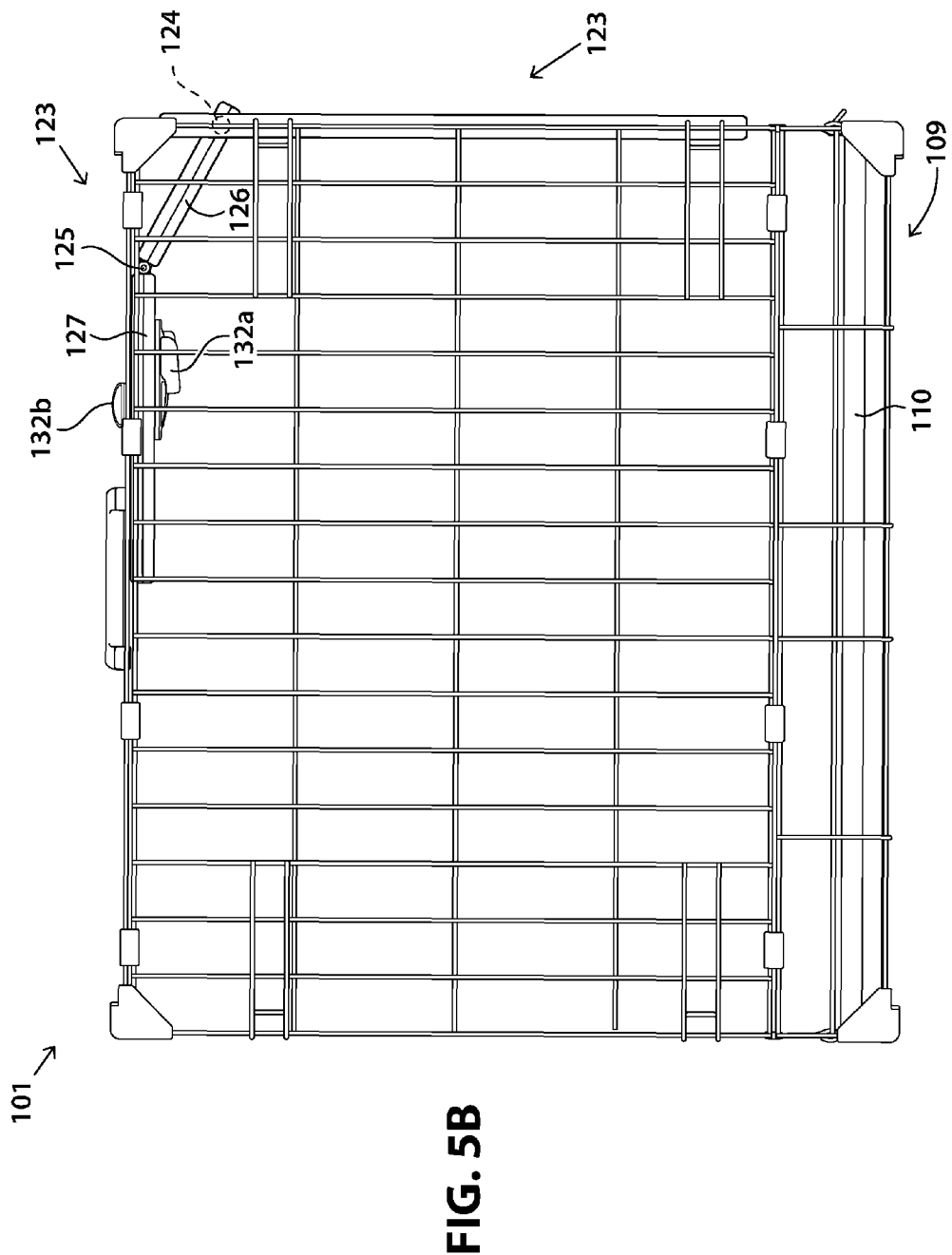
Figure 5C:
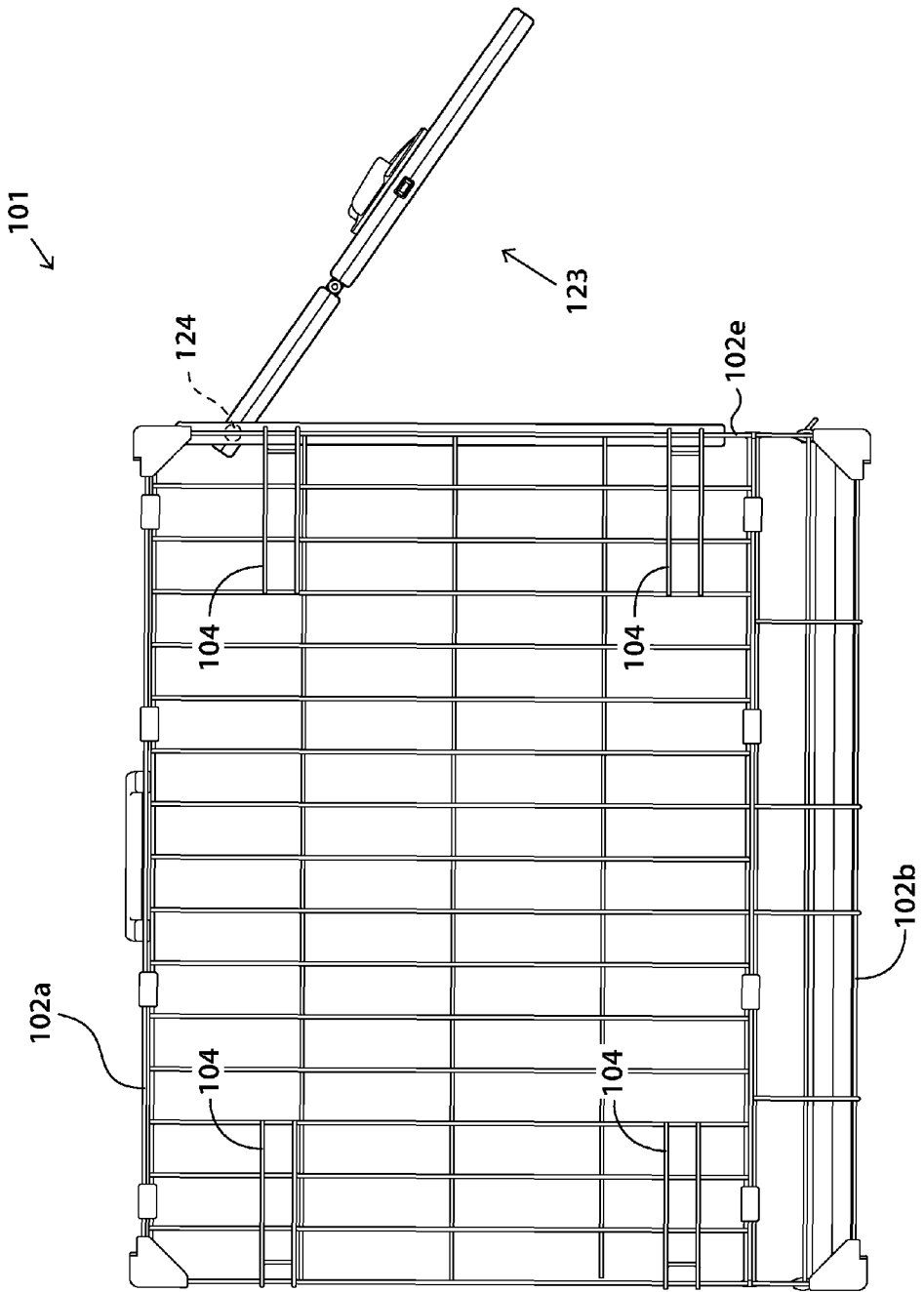
Figure 6:
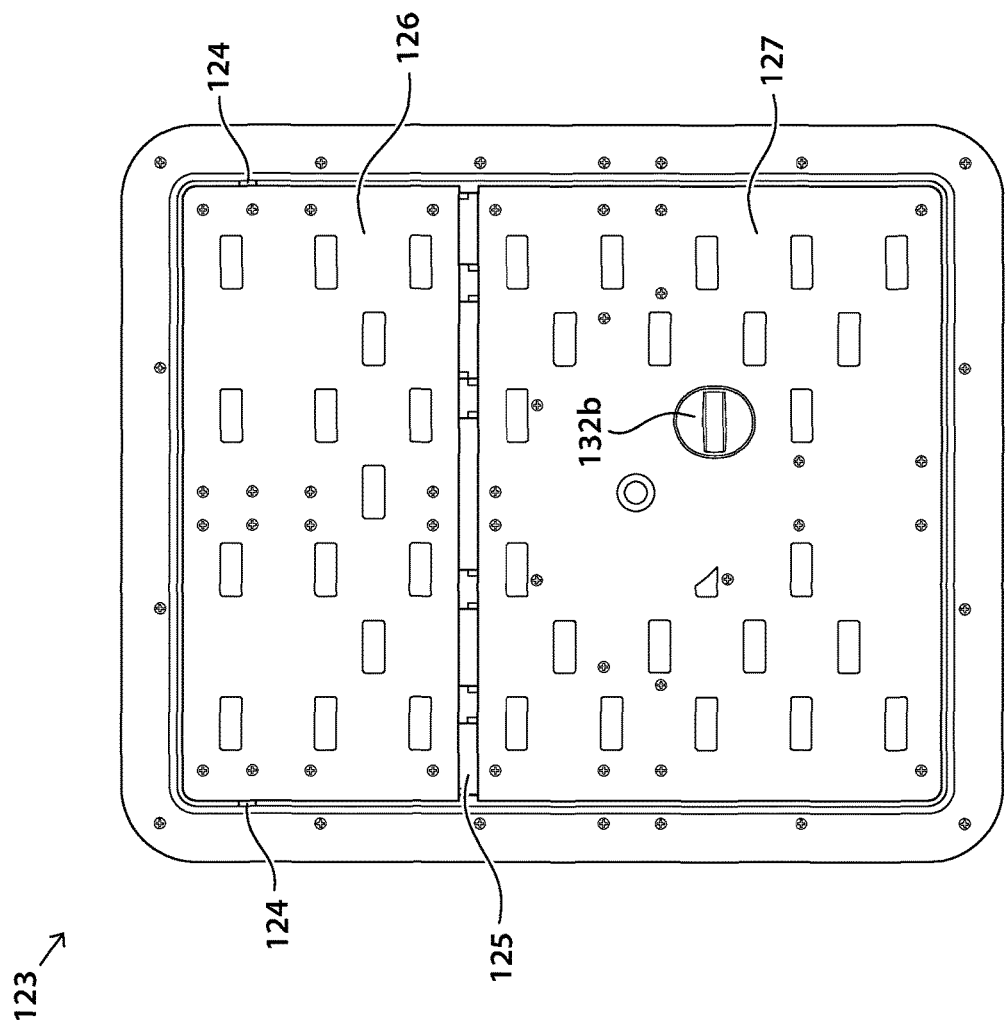
Figure 7A:
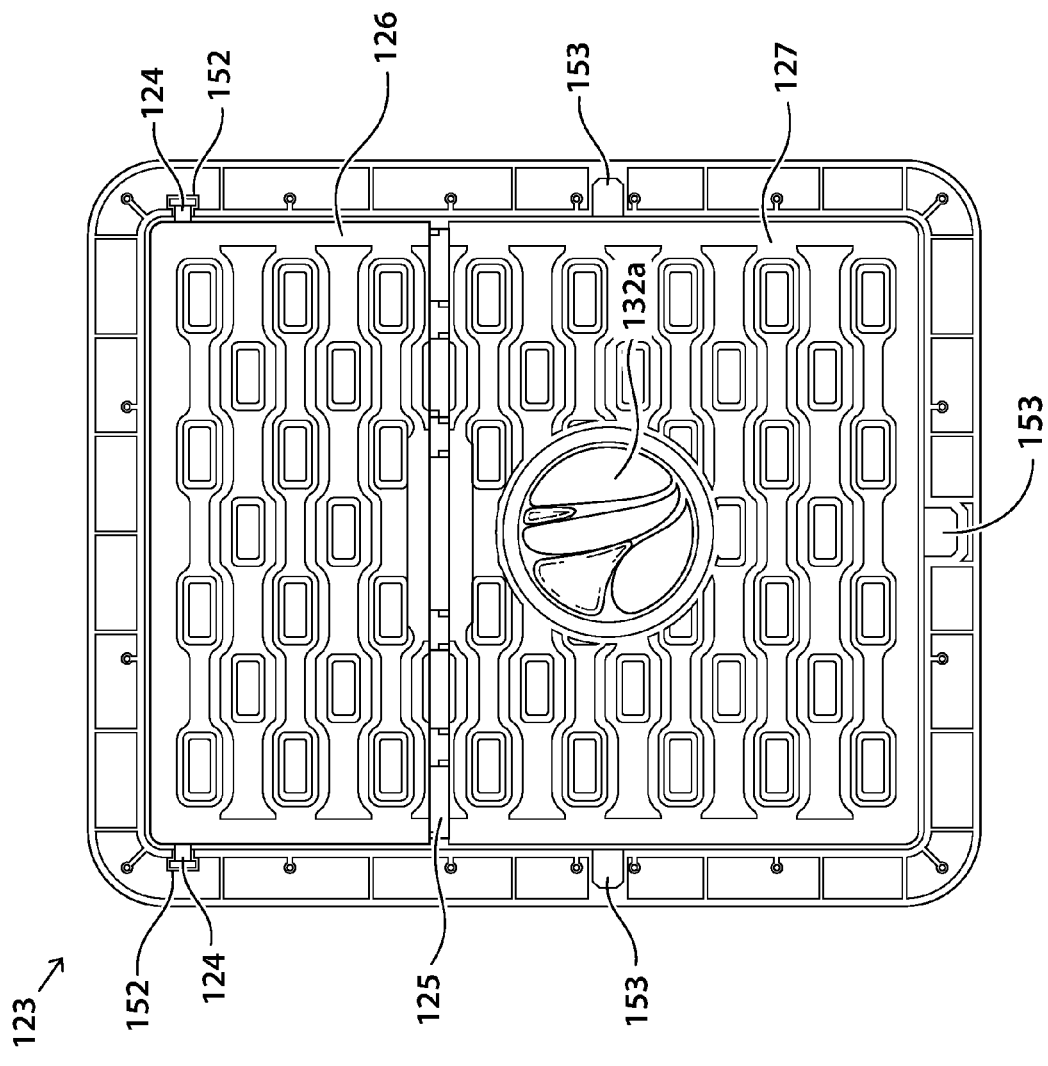
Figure 7B:
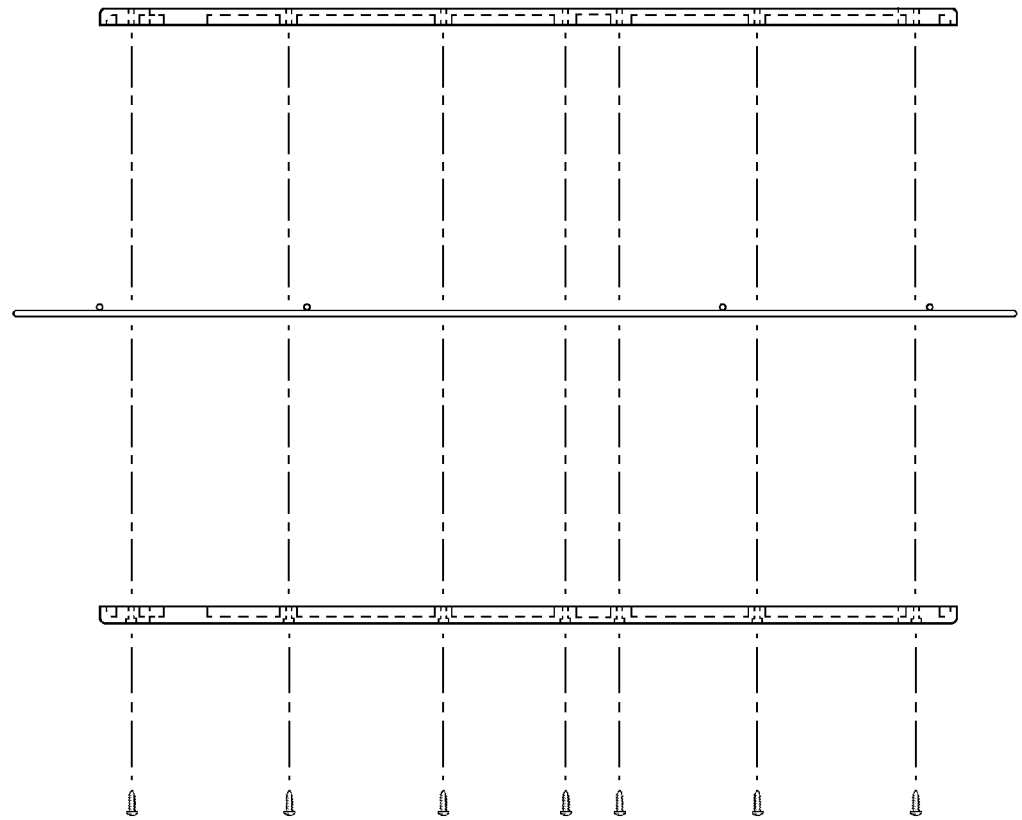
Figure 7C:
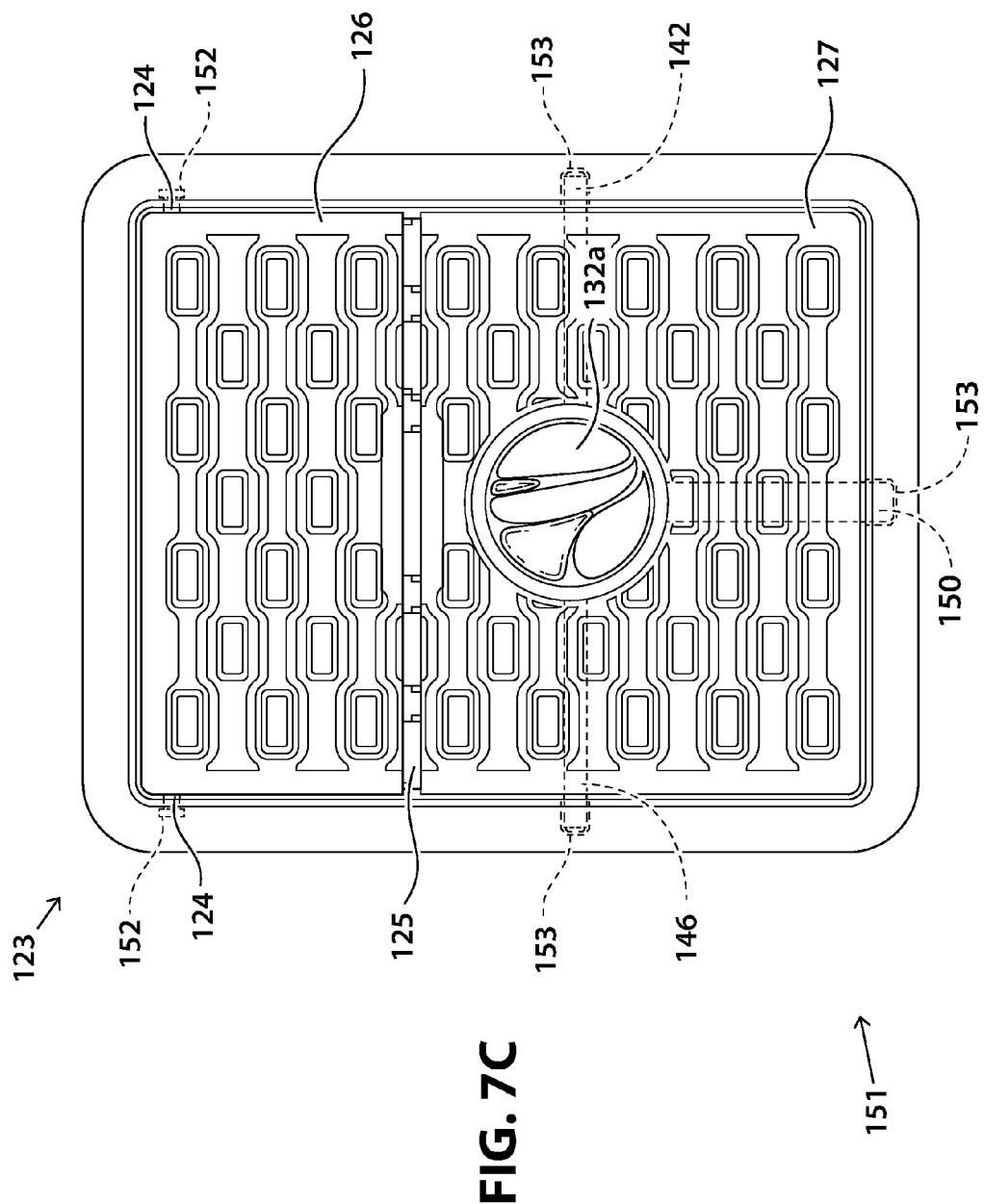
Figure 7F:
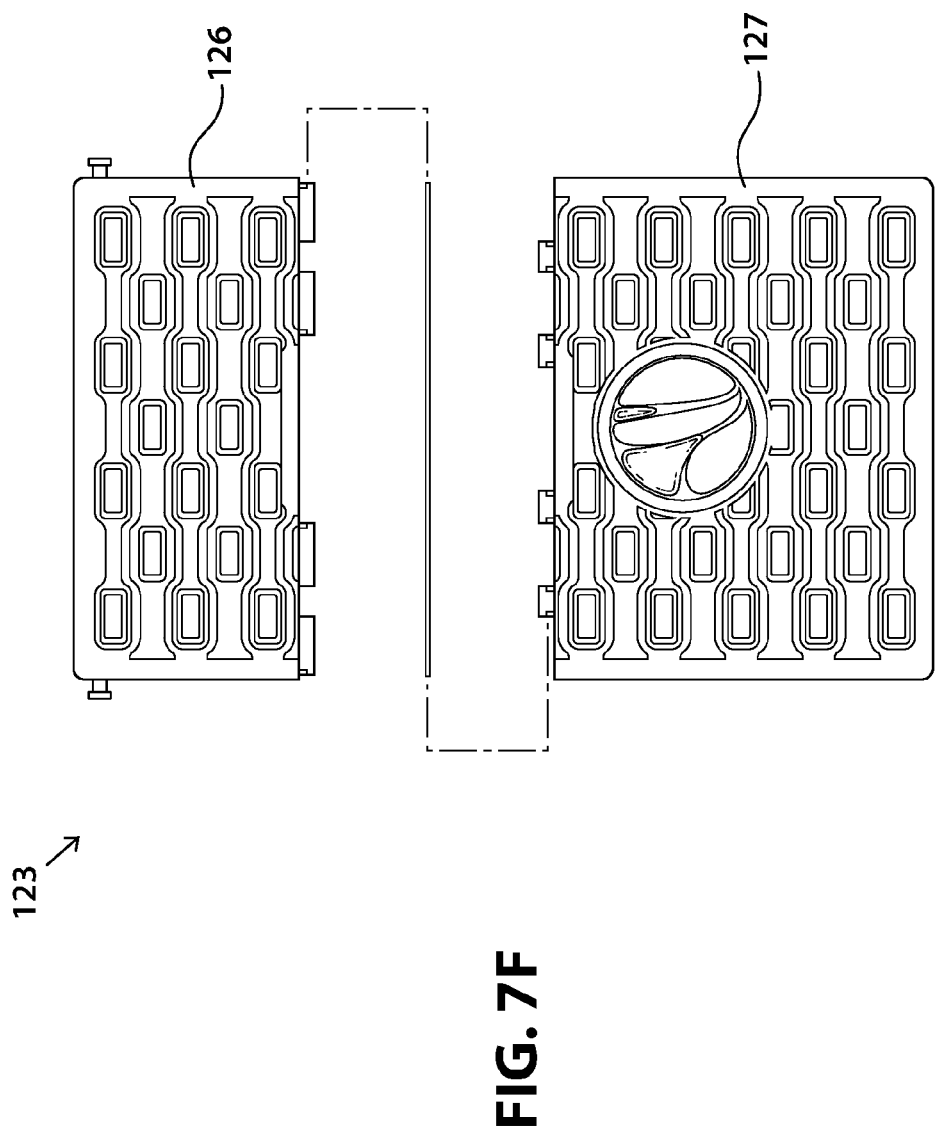
Figure 8A:
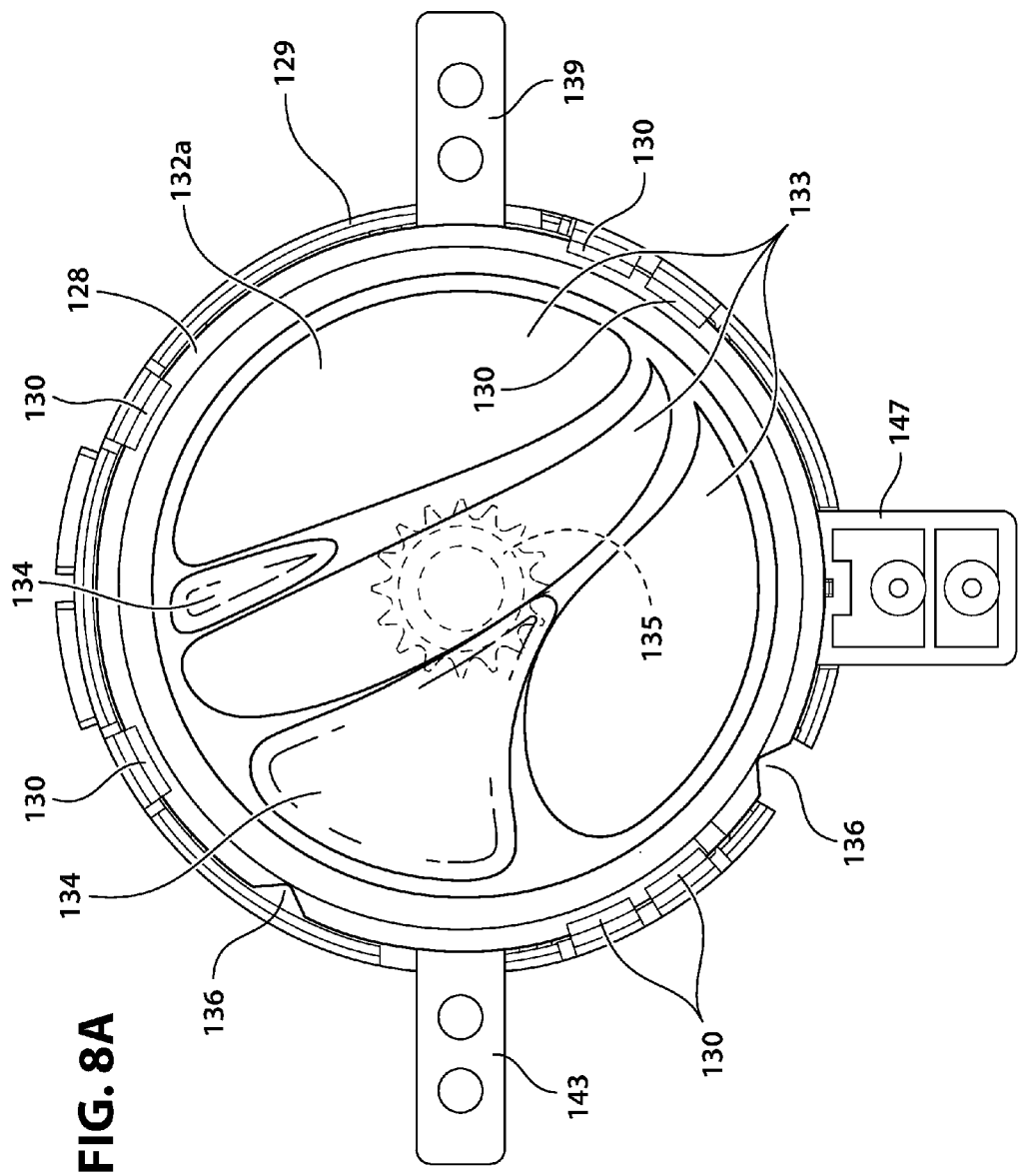
Figure 8C:
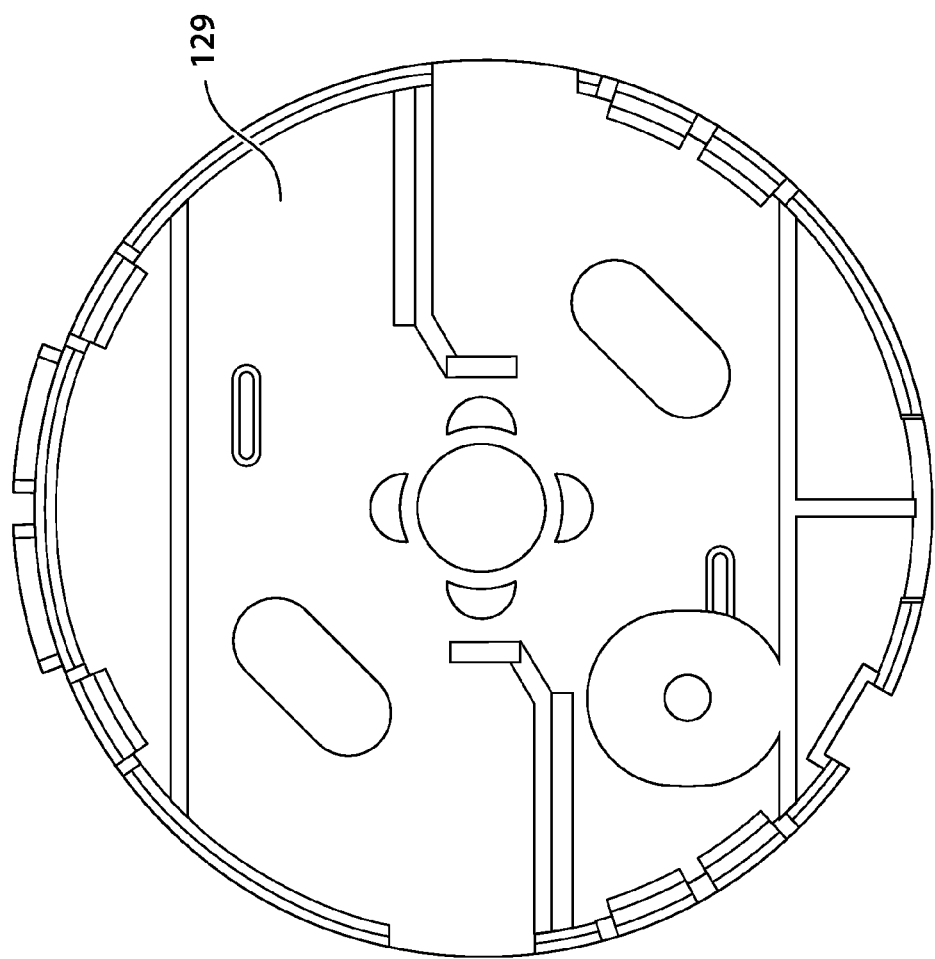
Figure 8F:
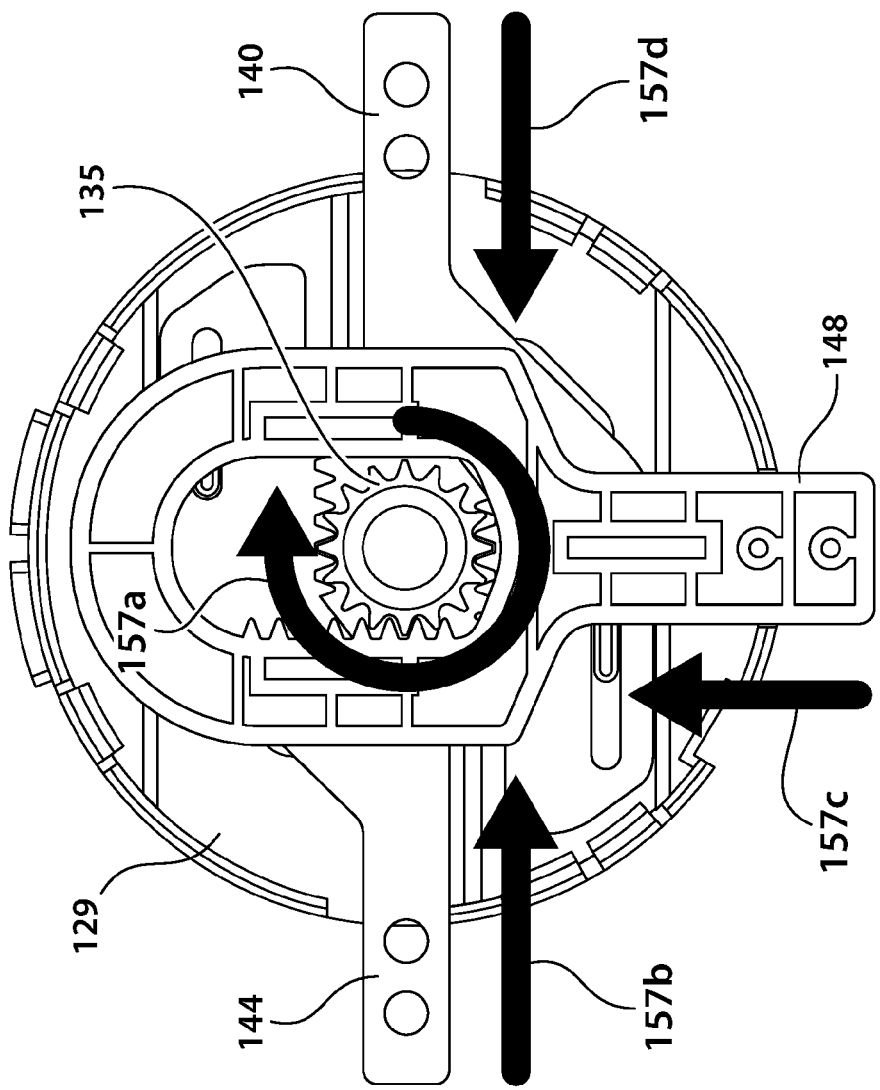
Figure 10D:
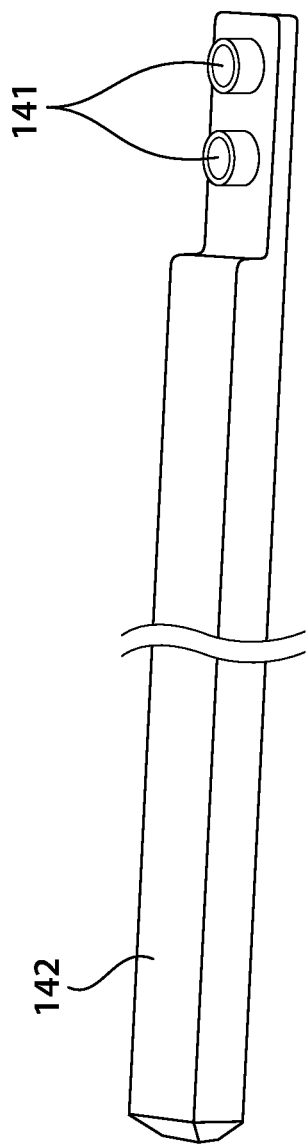
Figure 10E:
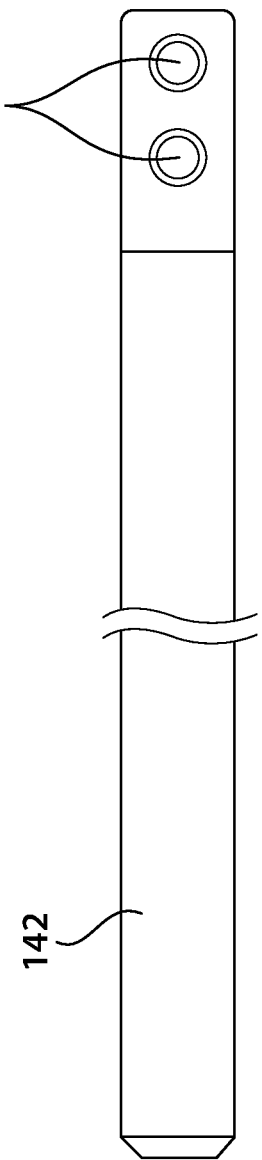
Figure 10H:
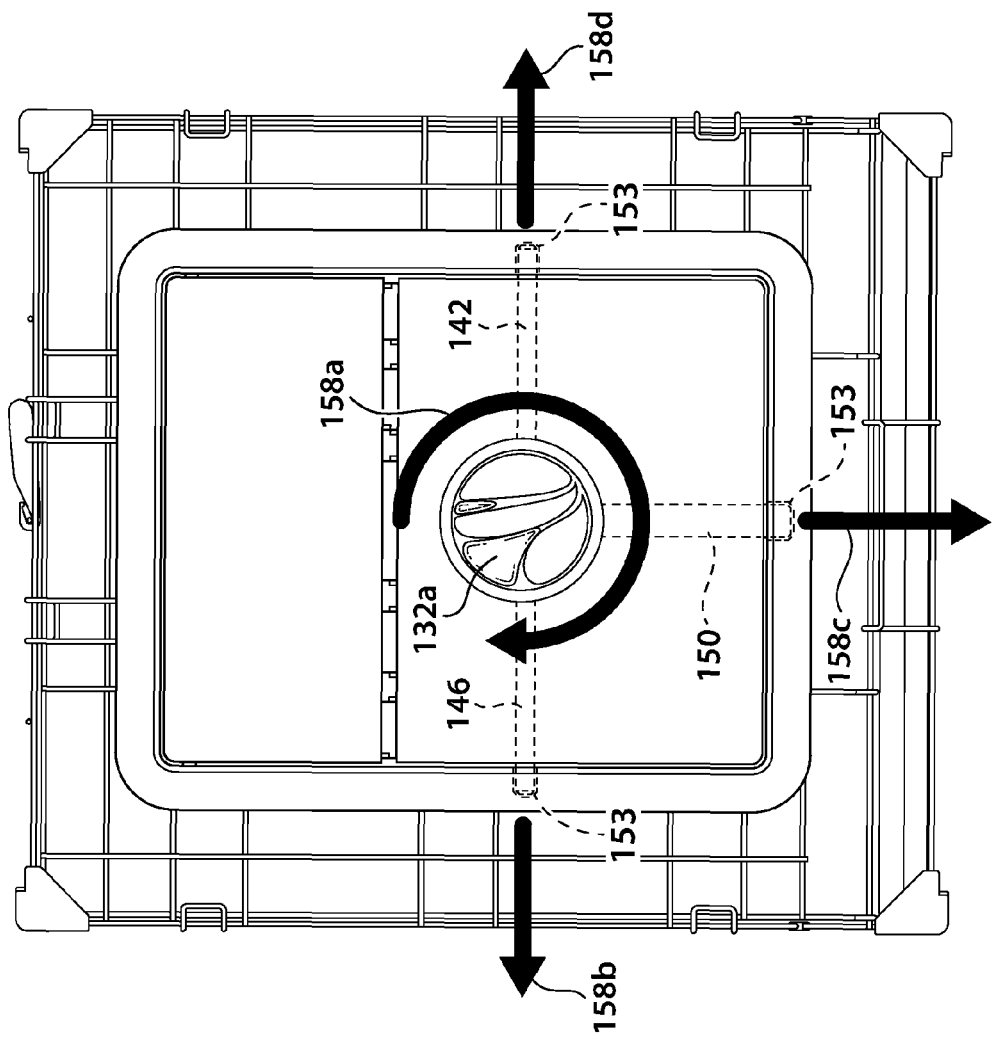
Figure 11A:
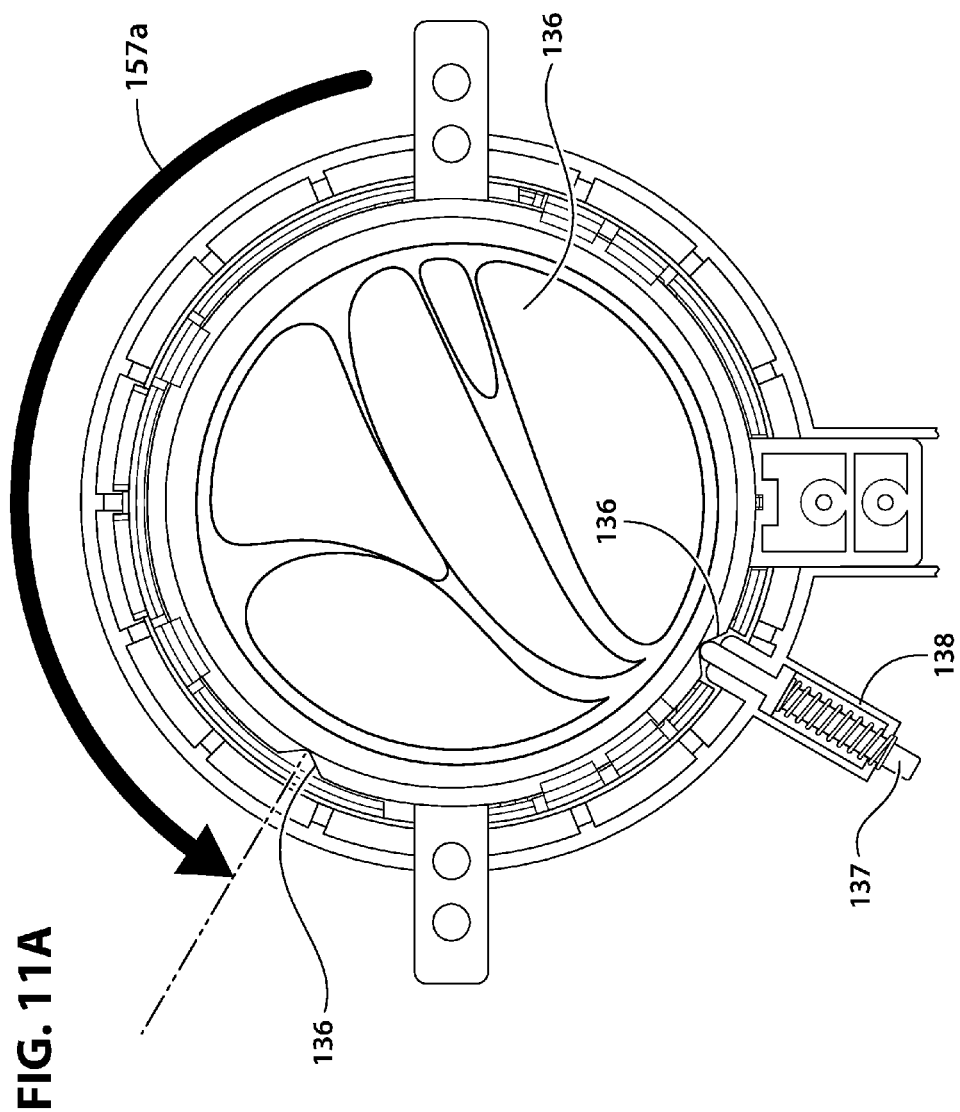
Figure 11B:
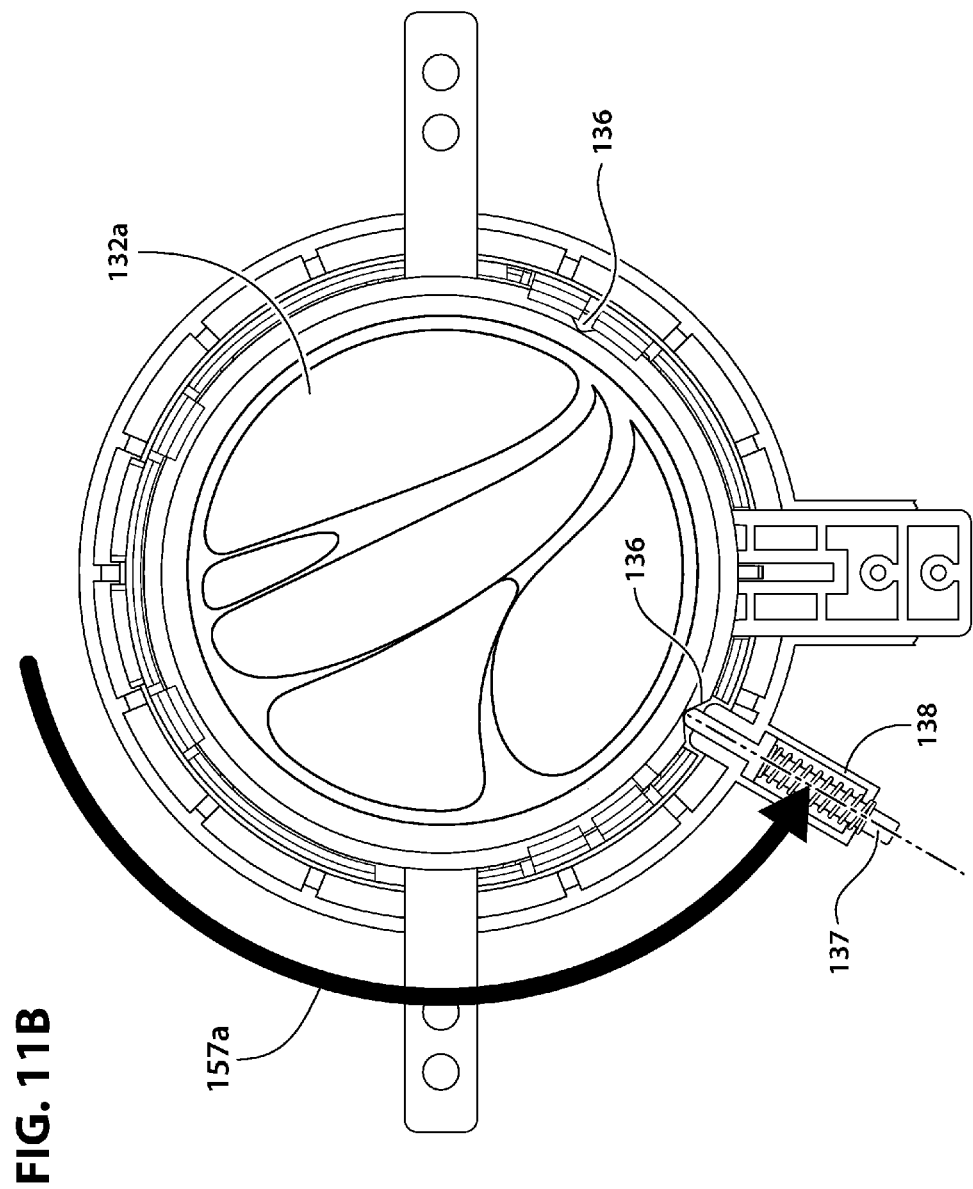
Figure 12A:
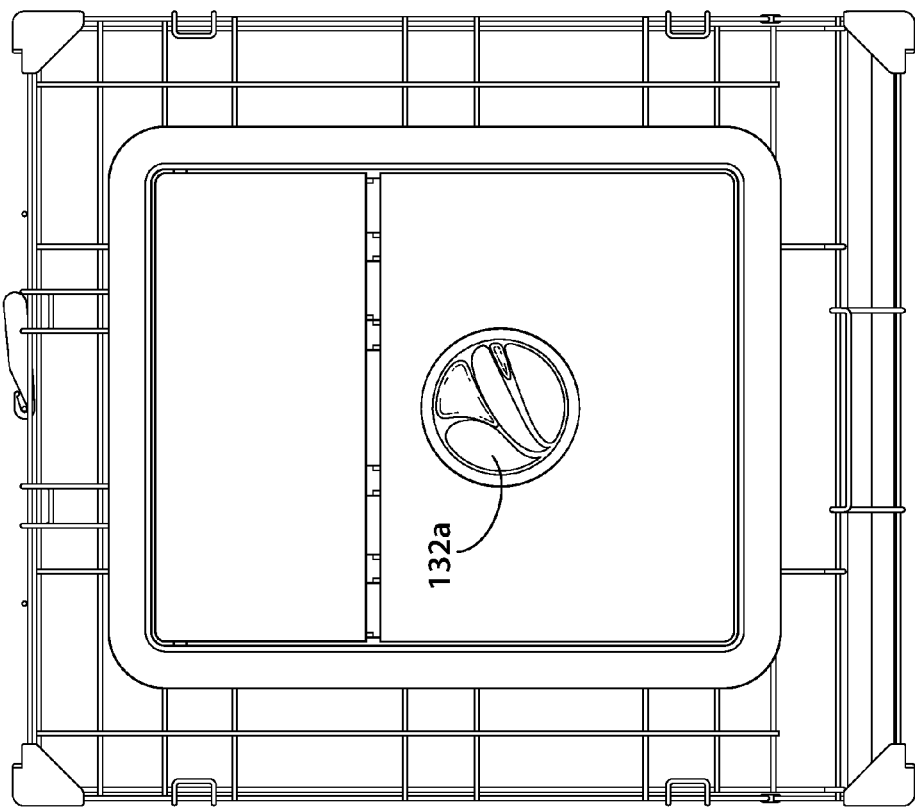
Figure 12B:
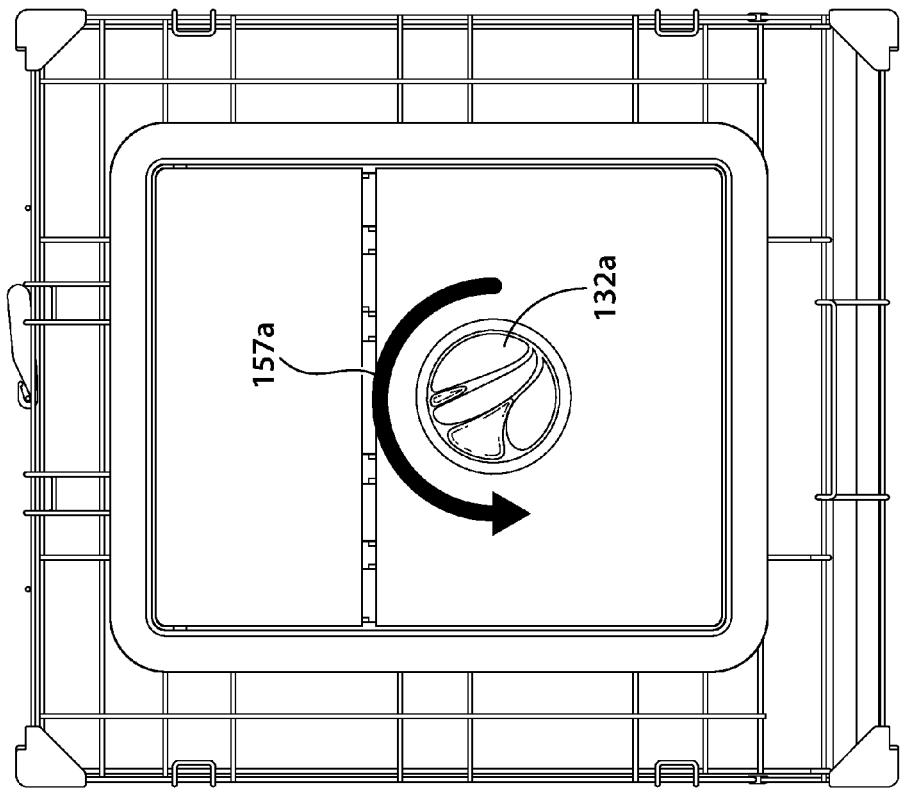
Figure 12C:
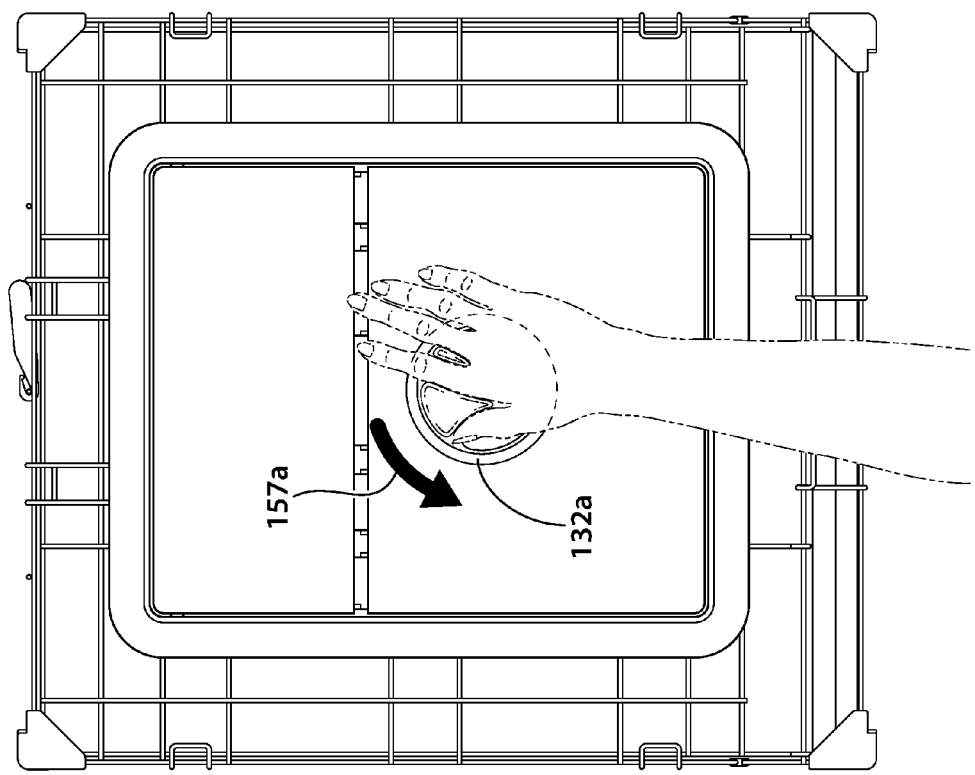
Figure 12D:
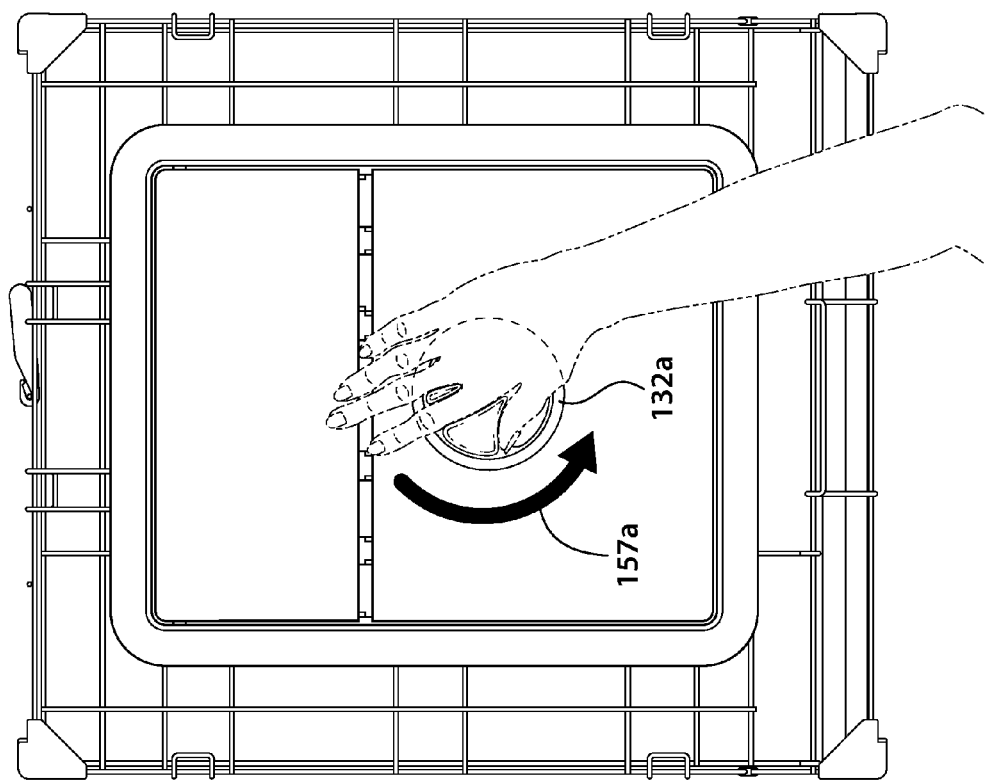
Figure 13A:
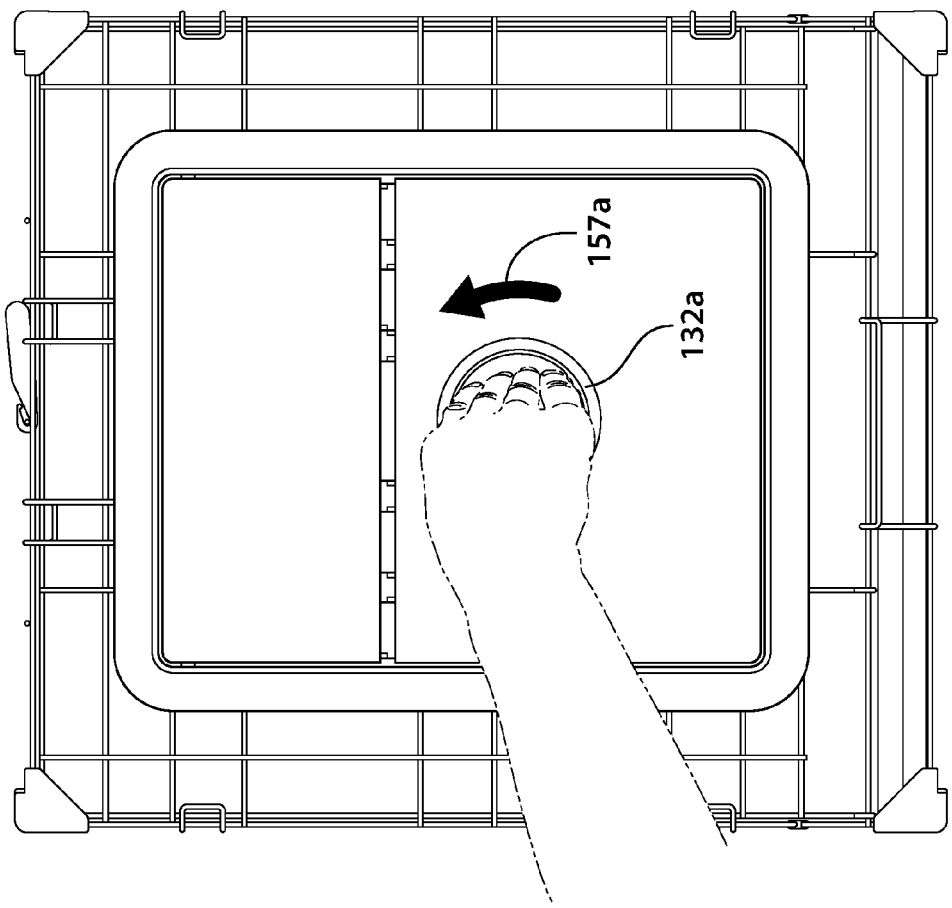
Figure 13B:
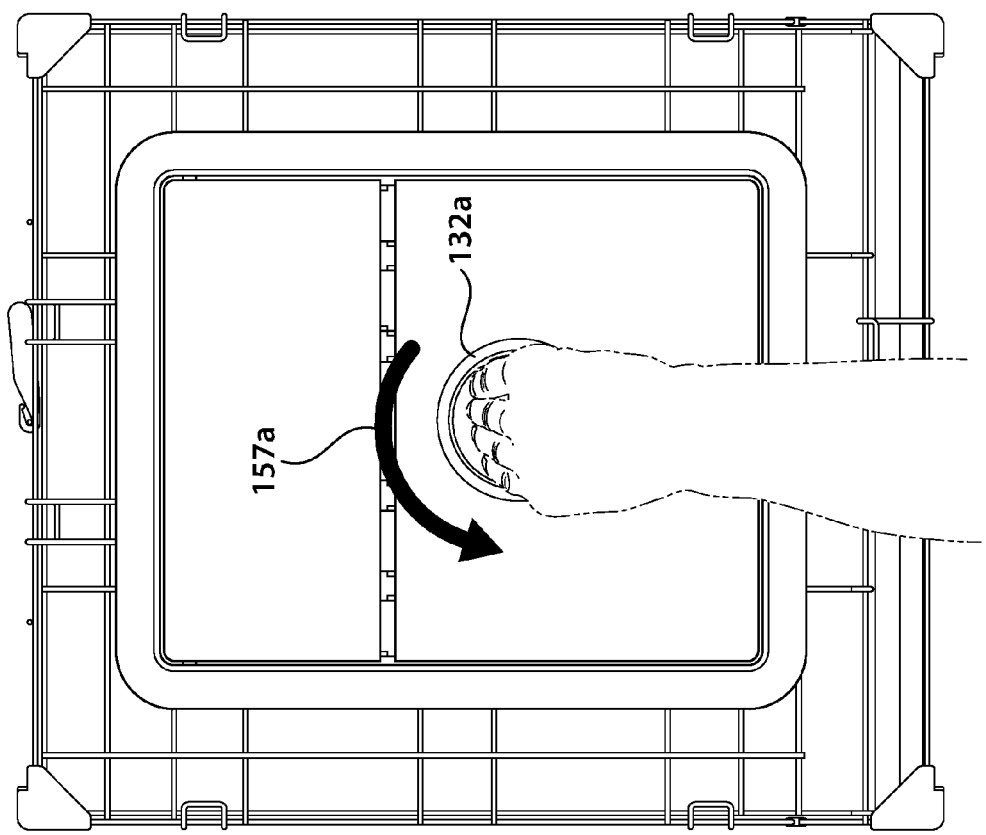
Figure 14G:
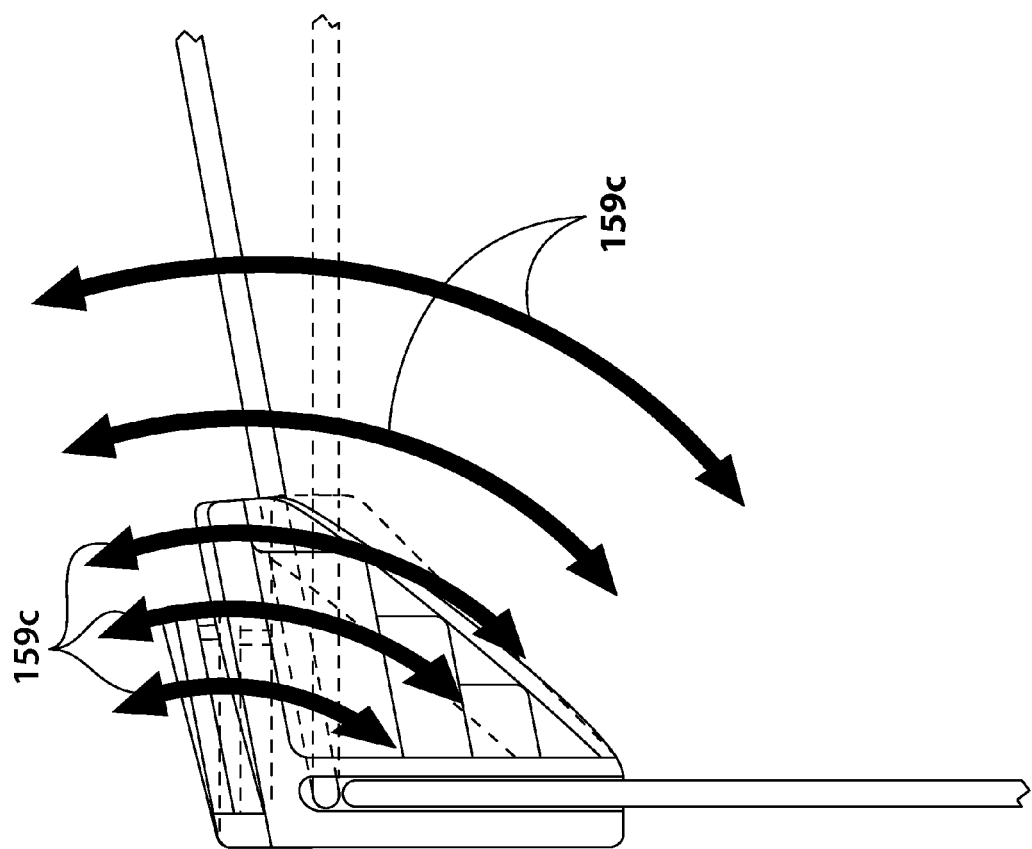
Figure 14H:
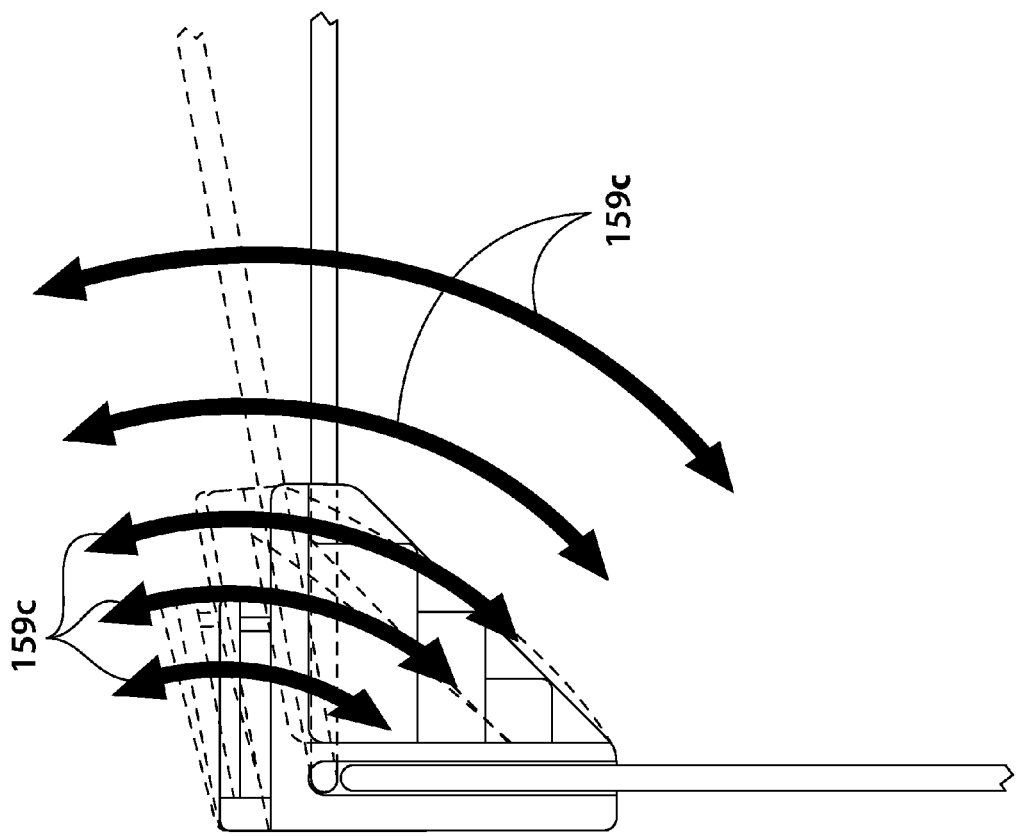
Figure 14I:
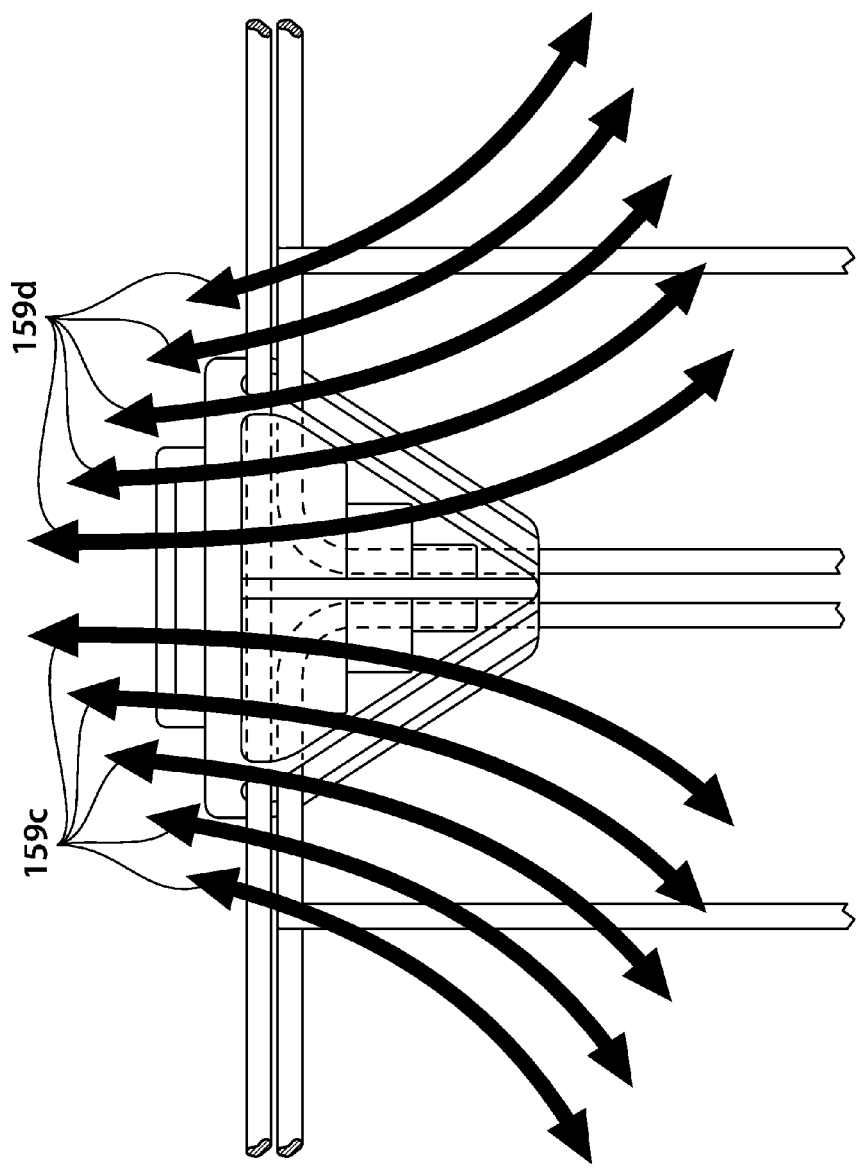
Figure 14K:
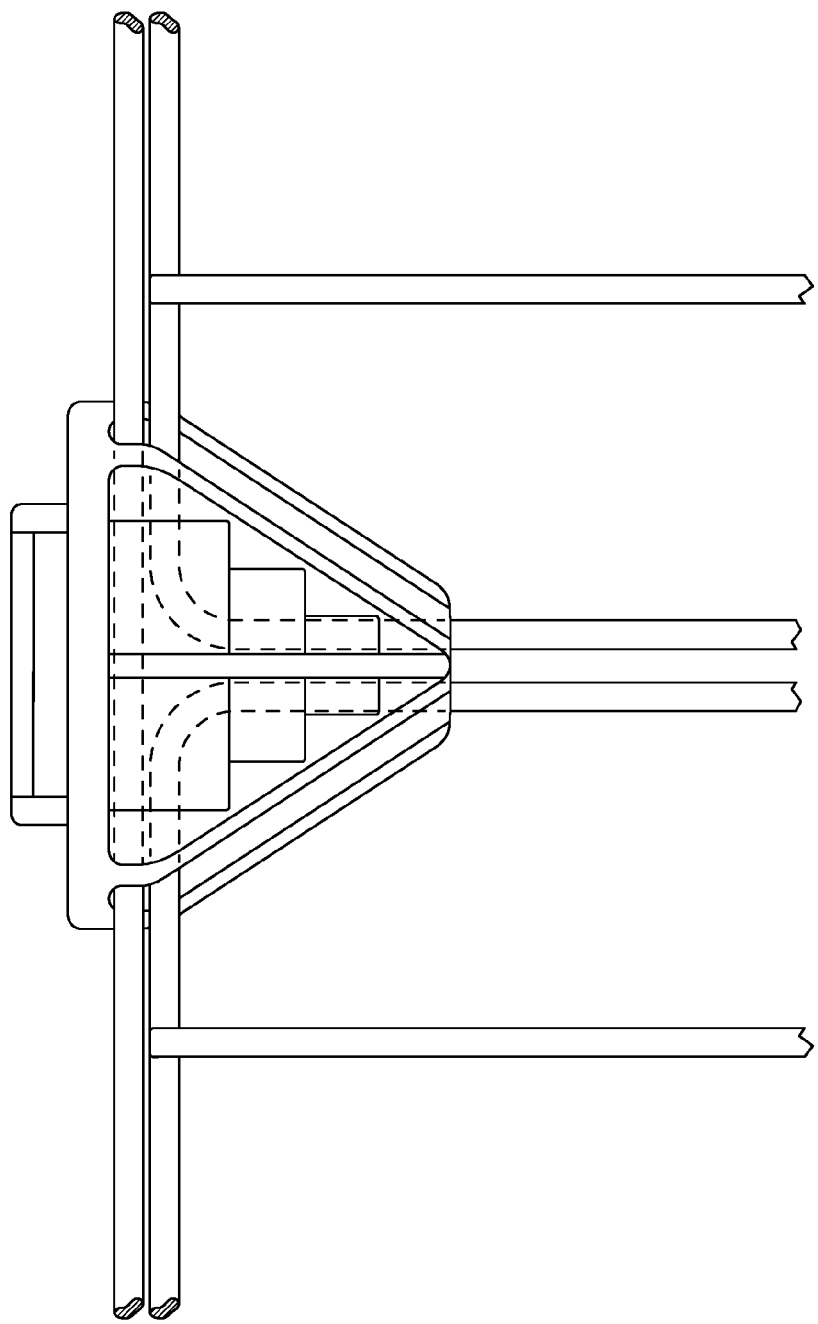
Figure 15A:
FIGS. 15A, 15B, 15C, 15D, 15E, and 15F illustrate top and side views of how to install multi-function grooming platform on the multi-stacked-hinge-door pet crat.
Figure 15B:
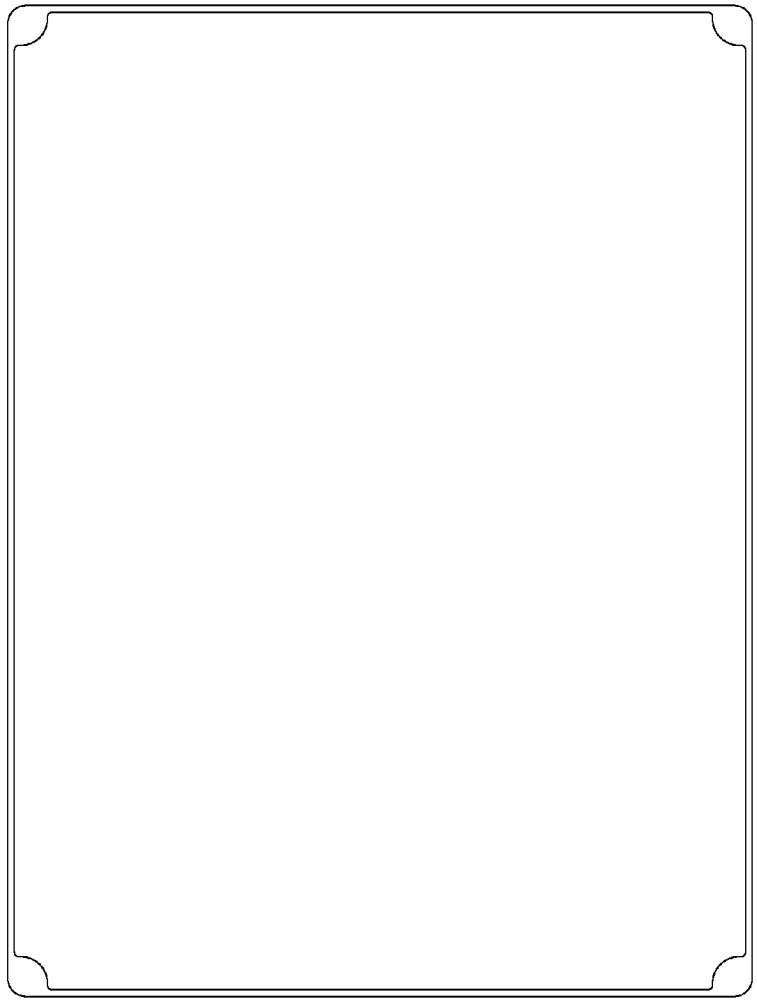
Figure 15C:
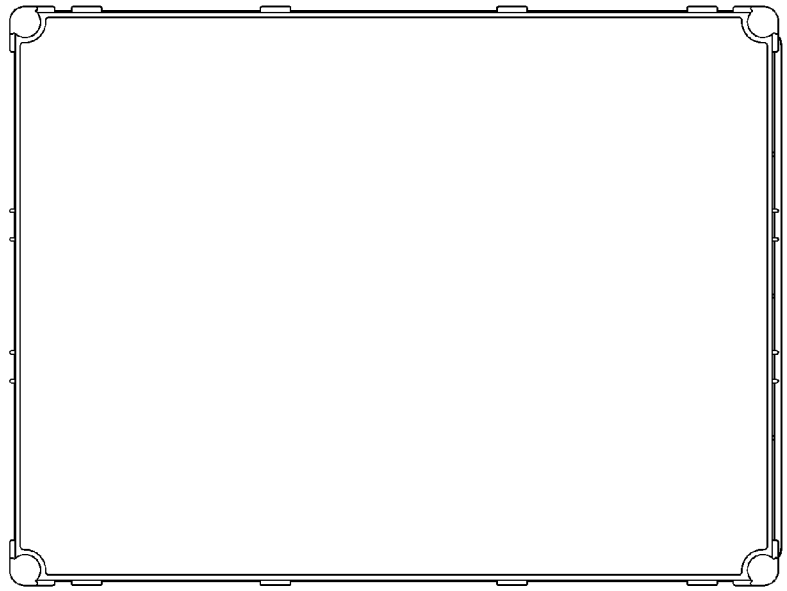
Figure 15D:
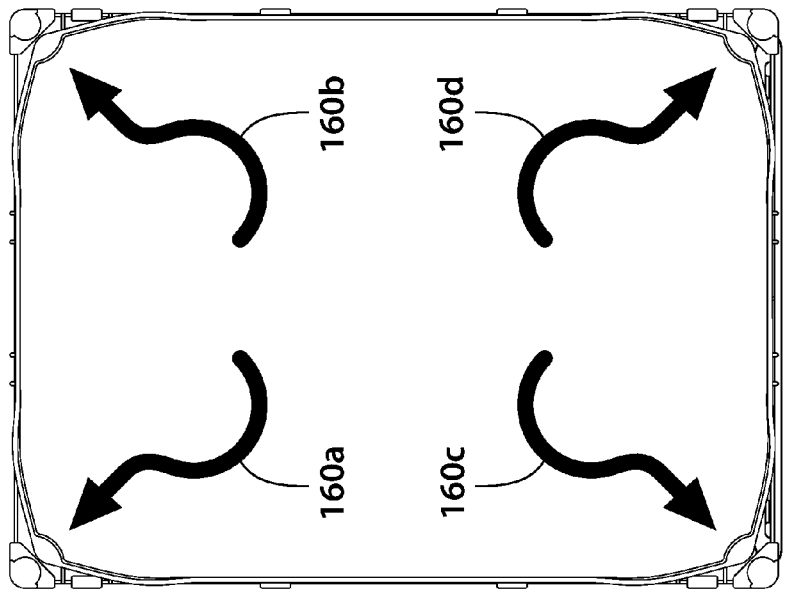
Figure 15E:
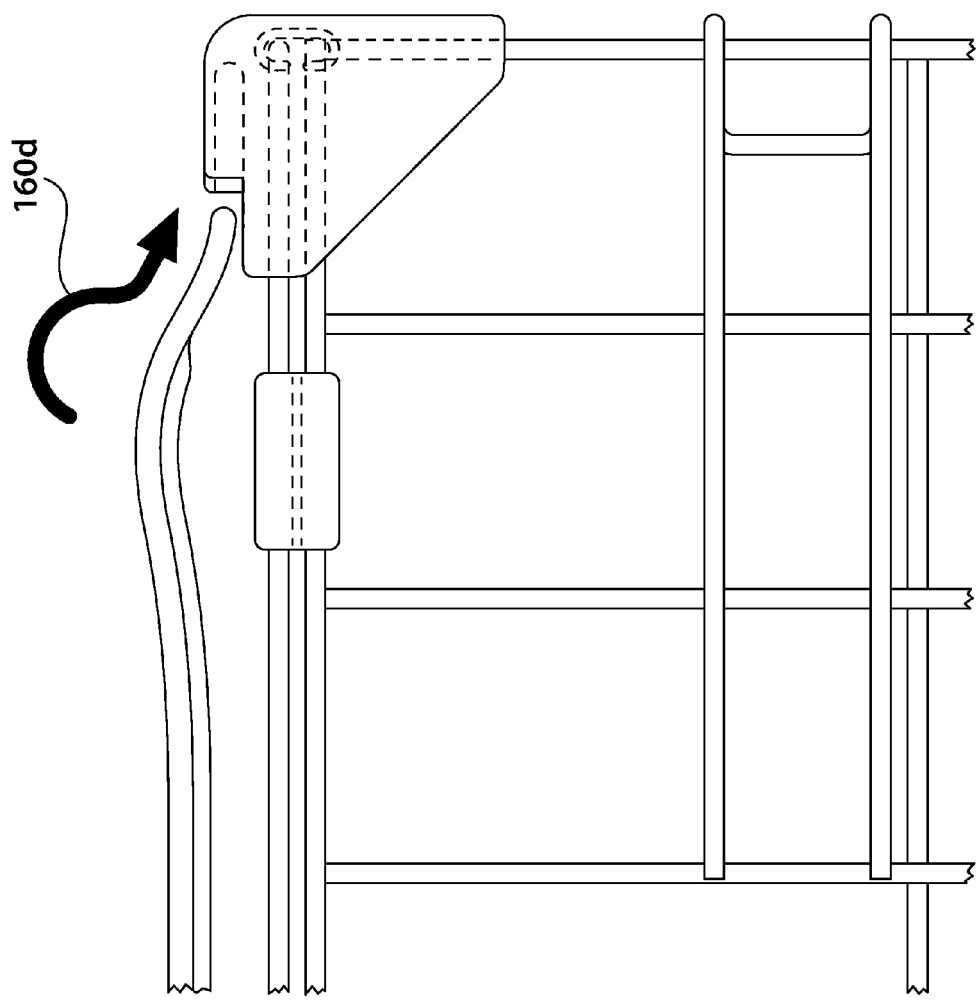
Figure 15F:
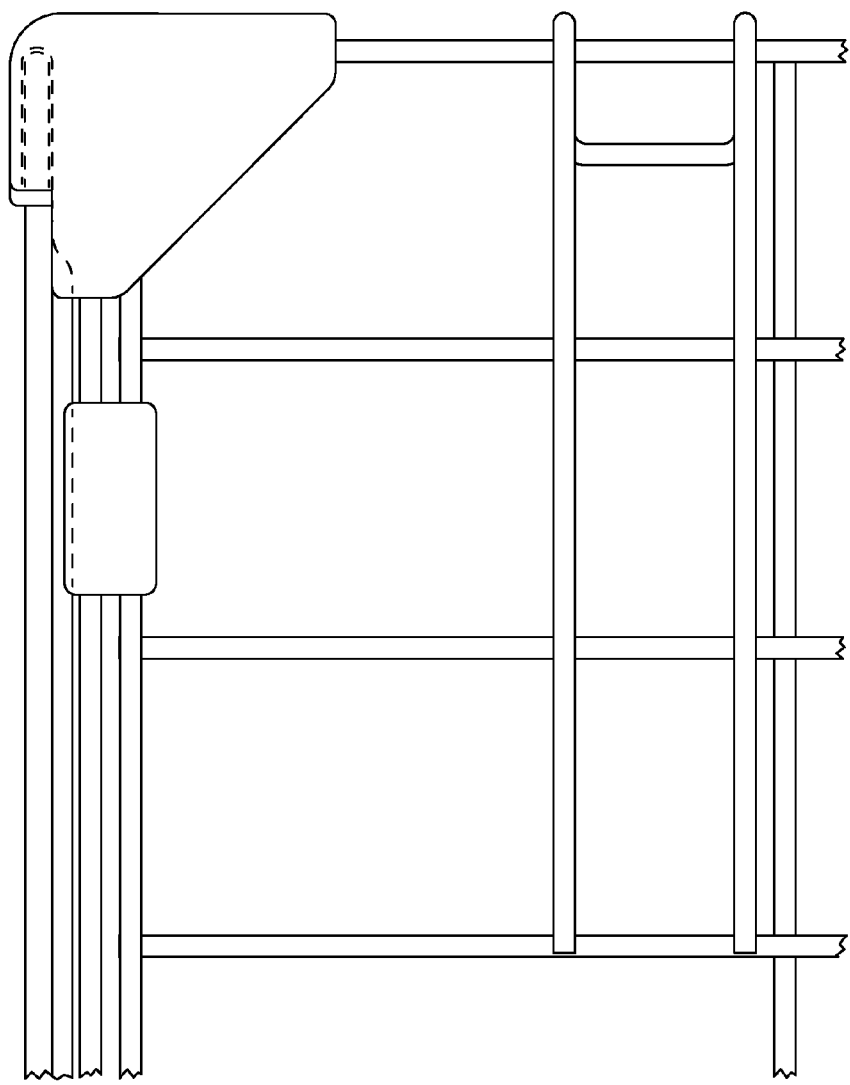
Figure 16C:
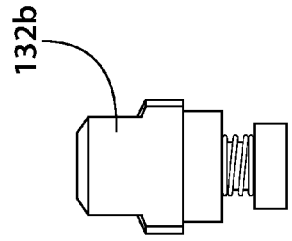
Figure 16D:
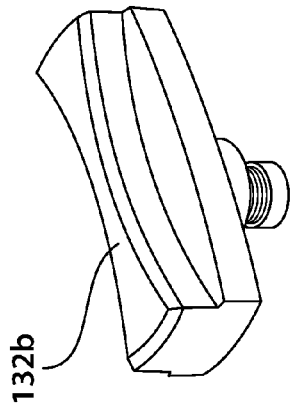
Figure 16A:
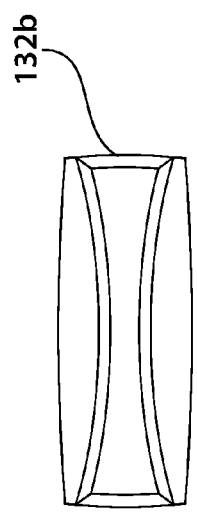
Figure 16B:
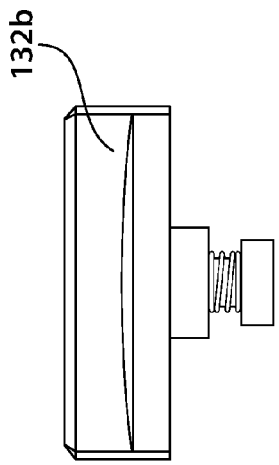
Figure 16F:
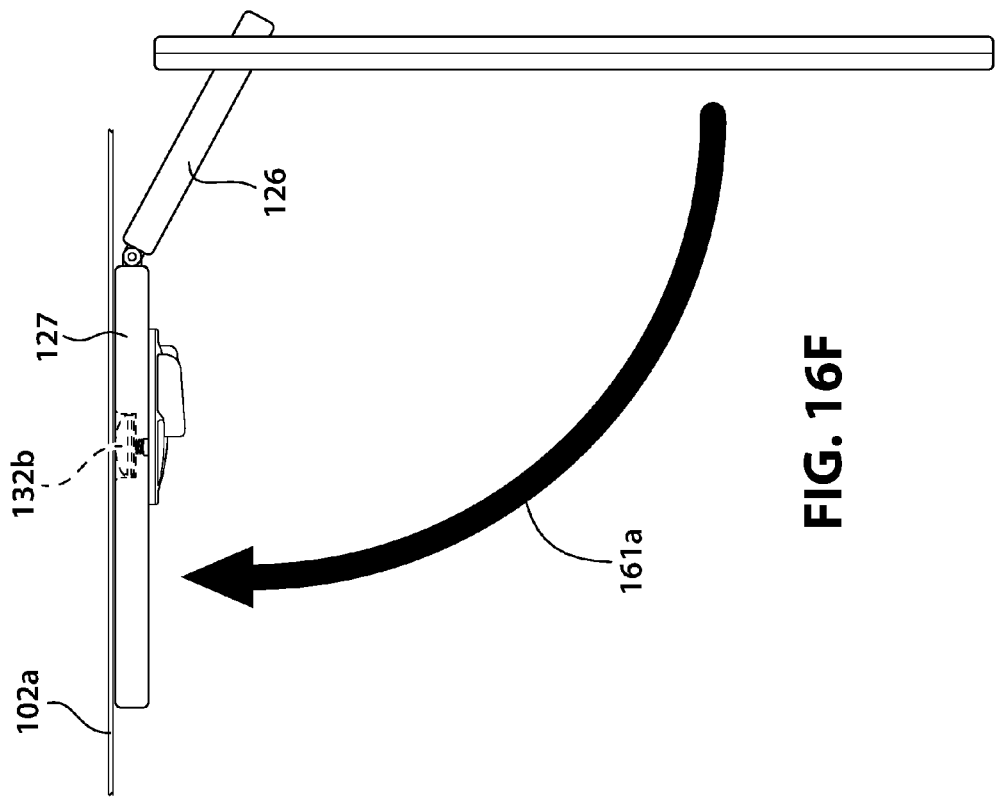
Figure 16E:
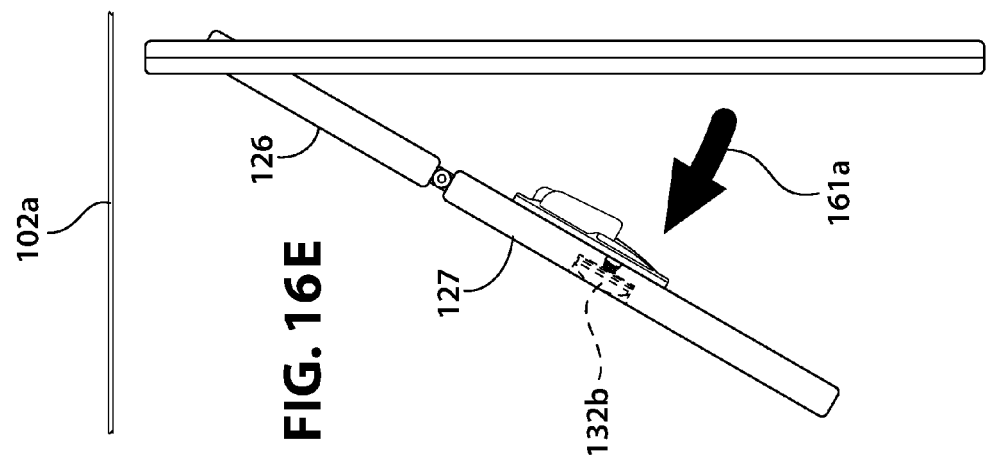
Figure 16I:
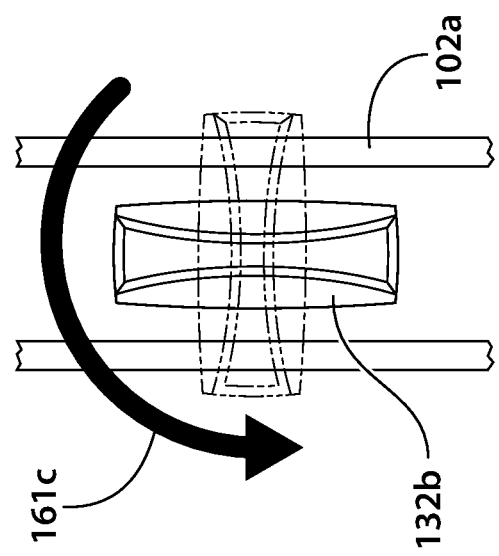
Figure 16J:
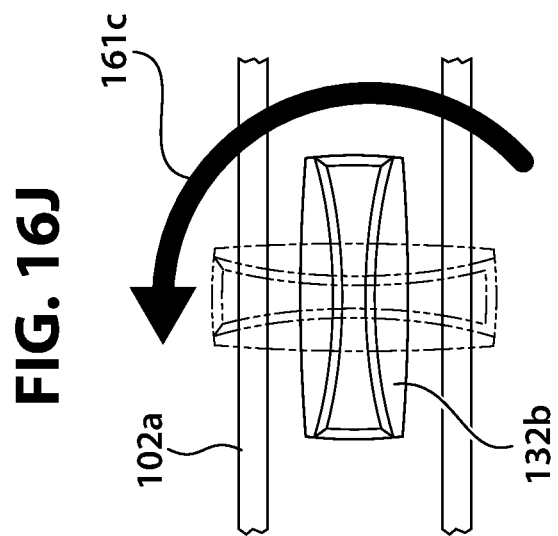
Figure 16M:
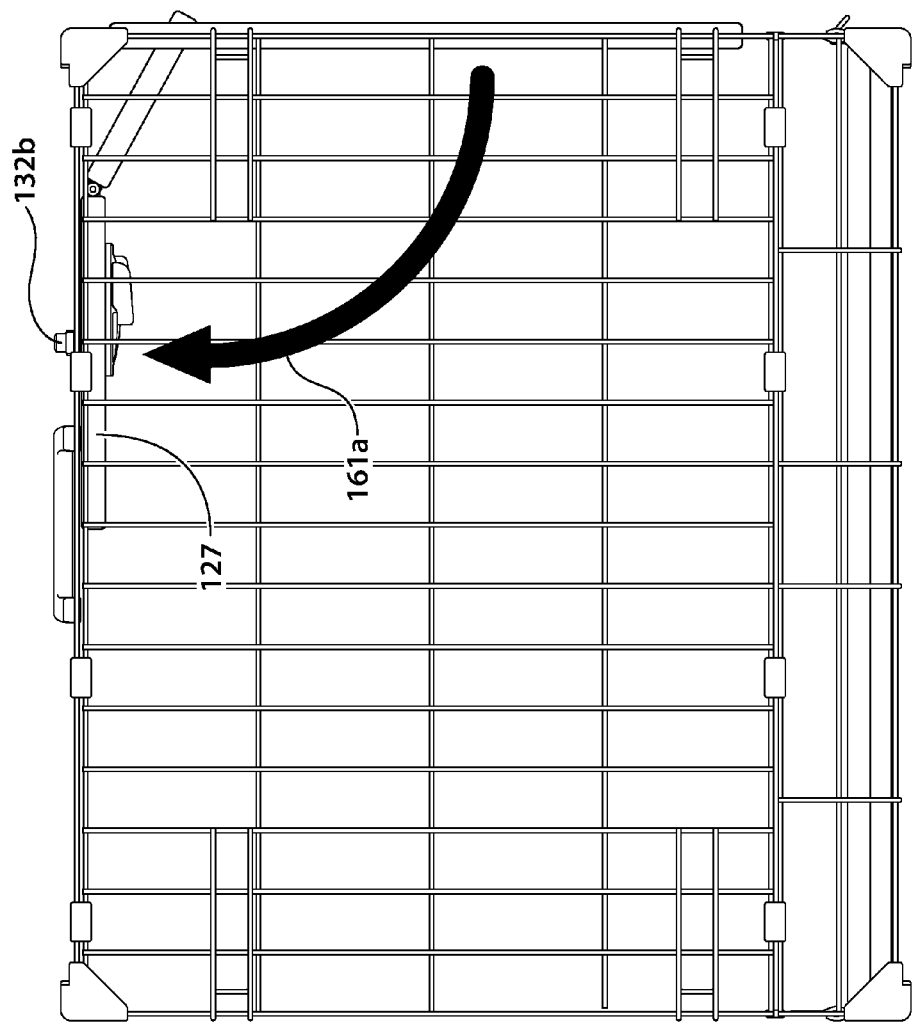
Figure 160:
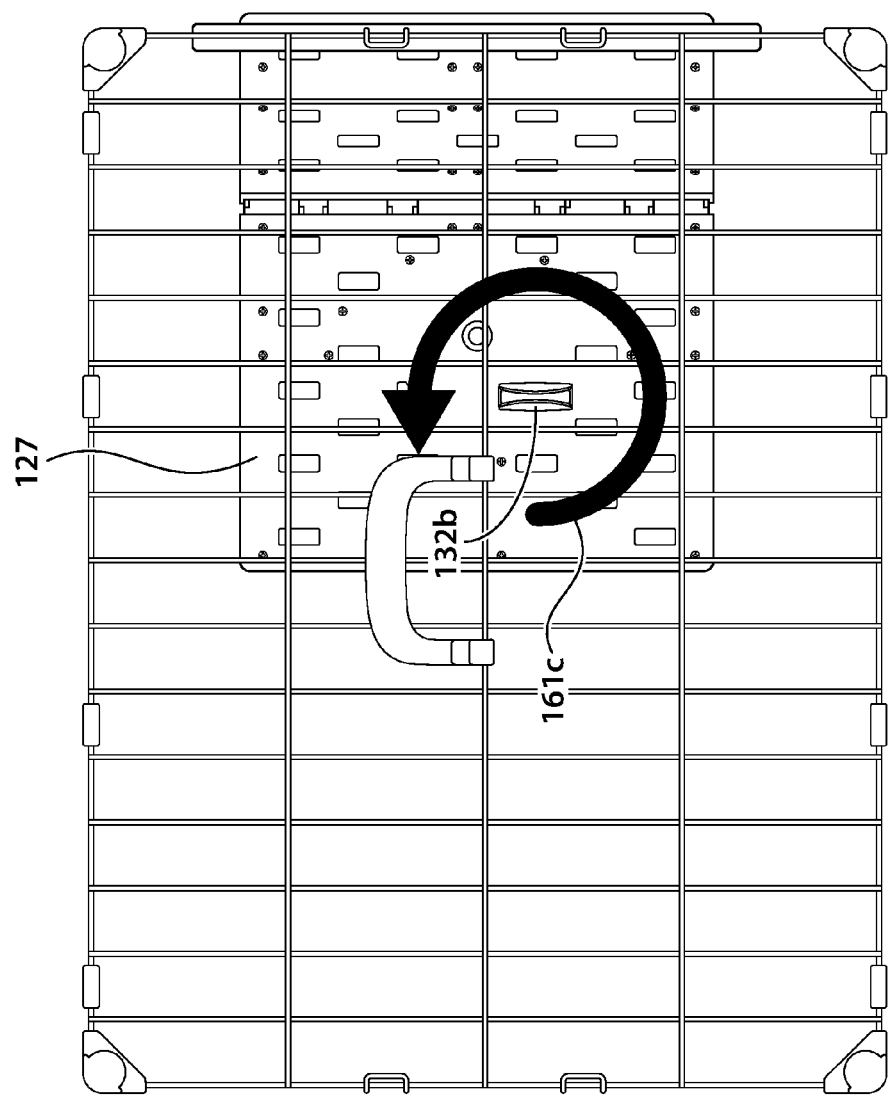
Figure 16P:
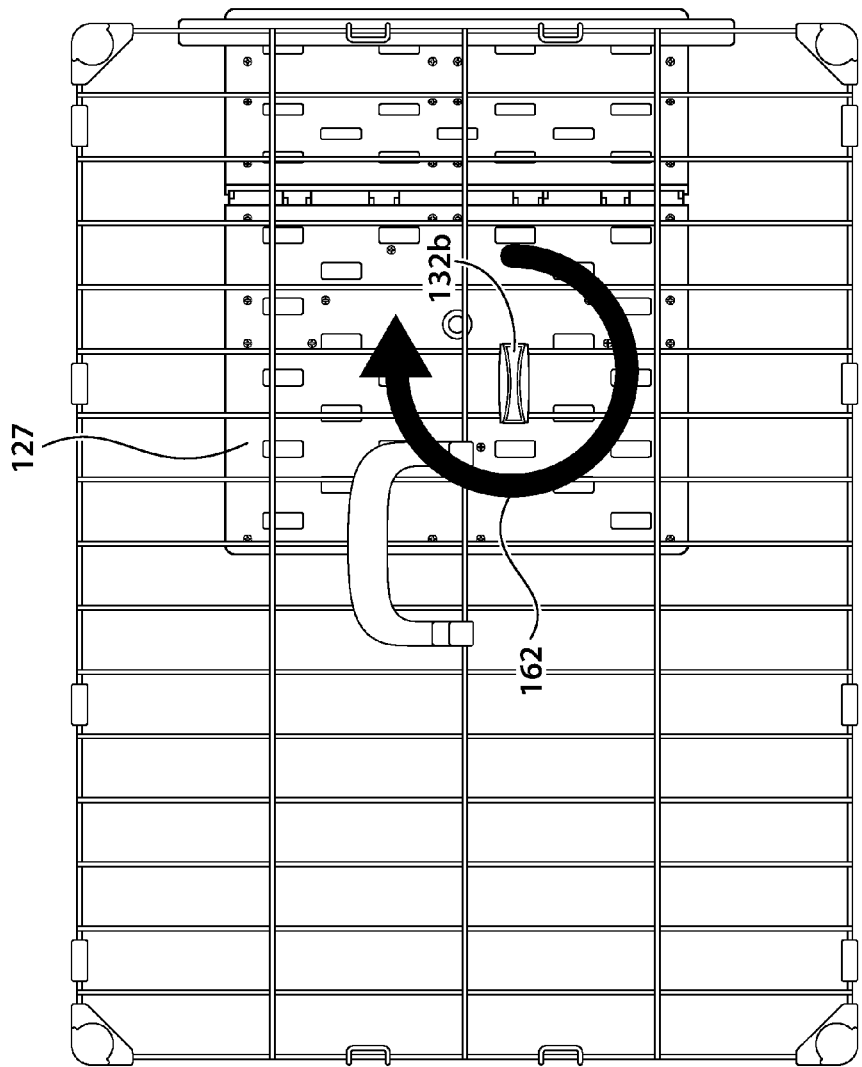

A multi-stacked-hinge-door pet crate comprises top, bottom, left, right, front, and rear panels attached to one another, multi-function slanted urine-storing bed having built-in gutters and ridges disposed on the bottom panel, a grooming platform, multi-function shock-absorbing gussets covering all the corners of the panels to lock the grooming platform and to absorb shocks and vibrations, and a multi-function door having double hinges thereon to allow door to open and fold, triple locking rods to lock the multi-function door the front panel, a palm knob with palm recesses and palm hills for an arthritic to use without the need for folding his or her fingers, a spring-loaded palm knob to lock the multi-function door against and parallel to the top panel, and double magnets attached to the multi-function door and the front panel, respectively, to stop the multi-function door from swinging.

DETAILED DESCRIPTION OF THE INVENTION

The multi-stacked-hinge-door pet crate has:
a) Ridged slanted urine-storing bed system,
b) Platform-locking shock-absorbing gusset systems,
c) Diked grooming platform, and
d) Triple-rod-front-lock single-knob-top-lock double-magnet-front-lock door system.

Component

Referring to FIGS. 1A, 1B, 2A, 2B, 3, 4, 5A, 5B, 5C, 6, 7A, 7B, 7C, 7D, 7E, 7F, 8A, 8B, 8C, 8D, 8E, 8F, 8G, 9A, 9B, 10A, 10B, 10C, 10D, 10E, 10F, 10G, 10H, 11A, and 11B, the multi-stacked-hinge-door pet crate comprises:
1) Crate-panel system 101, comprising:
2) Top, bottom, left, right, front, and rear panels 102a, 102b, 102c, 102d, 102e, and 102f;
3) Bottom panel-locking hooks 103a and 103b,
4) Side panel-locking hooks 104,
5) Top panel-locking hooks 105,
6) Panel-coupling clamps 106,
7) Handle 107,
8) Handle-locking hooks 108;
9) Multi-function slanted urine-storing bed system 109, comprising:
10) Slanted sanitary-urine-storing-gutter bed 110,
11) Sanitary urine-storing gutters and gutter ridges 111a and 111b;
12) Multi-function platform-locking shock-absorbing gusset systems 112, each comprising:
13) Gusset walls 113,
14) Wire-locking gusset recesses 114a and 114b,
15) Curved gusset springs 115a, 115b, and 115c,
16) Vertical gusset spring 116, 17) Horizontal gusset spring 117,
18) Platform-locking shock-absorbing gusset tab 118;
19) Multi-function grooming platform 119, comprising:
20) Grooming platform 120,
21) Platform dikes 121,
22) Platform-locking corners 122;
23) Multi-function door system 123, comprising:
24) First door hinge 124,
25) Second door hinge 125,
26) First door panel 126,
27) Second door panel 127,
28) Front knob panel 128,
29) Rear knob panel 129,
30) Front knob hooks 130,
31) Rear knob hooks 131,
32) Palm knob 132a and spring-loaded palm knob 132b,
33) Palm recesses 133,
34) Palm hills 134,
35) Circular knob gears 135,
36) Knob-stopping notches 136,
37) Knob-stopping spring-loaded pin 137,
38) Spring-loaded-pin housing 138,
39) First locking rod 139,
40) First-locking-rod linear gears 140,
41) First-locking-rod attacher 14I,
42) First-locking-rod extender 142,
43) Second locking rod 143,
44) Second-locking-rod linear gears 144,
45) Second-locking-rod attacher 145,
46) Second-locking-rod extender 146,
47) Third locking rod 147,
48) Third-locking-rod linear gears 148,
49) Third-locking-rod attacher 149,
50) Third-locking-rod extender 150;
51) Multi-function door-locking ring system 151, comprising:
52) Hinge-locking rings 152,
53) Rod-locking rings 153; and
54) Door-panel-and-door magnet system 154,
55) Panel magnet 155,
56) Door magnet 156.

Material

Referring to FIGS. 1A, 1B, 2A, 2B, 3, 4, 5A, 5B, 5C, 6, 7A, 7B, 7C, 7D, 7E, 7F, 8A, 8B, 8C, 8D, 8E, 8F, 8G, 9A, 9B, 10A, 10B, 10C, 10D, 10E, 10F, 10G, 10H, 11A, and 11B:
1) Crate-panel system 101 is made of the combined materials of its components.
2) Top, bottom, left, right, front, and rear panels 102a, 102b, 102c, 102d, 102e, and 102f each are made of plastic, wooden, or metallic material, or a combination of at least two of the above-mentioned materials.
3) Bottom panel-locking hooks 103a and 103b each are made of plastic, wooden, or metallic material, or a combination of at least two of the above-mentioned materials.
4) Side panel-locking hooks 104 each are made of plastic, wooden, or metallic material, or a combination of at least two of the above-mentioned materials.
5) Top panel-locking hooks 105 each are made of plastic, wooden, or metallic material, or a combination of at least two of the above-mentioned materials.
6) Panel-coupling clamps 106 each are made of plastic, wooden, or metallic material, or a combination of at least two of the above-mentioned materials.
7) Handle 107 is made of plastic, wooden, or metallic material, or a combination of at least two of the above-mentioned materials.
8) Handle-locking hooks 108 each are made of plastic, wooden, or metallic material, or a combination of at least two of the above-mentioned materials.
9) Multi-function slanted urine-storing bed system 109 is made of the combined materials of its components.
10) Slanted sanitary-urine-storing-gutter bed 110 is made of plastic, wooden, or metallic material, or a combination of at least two of the above-mentioned materials.
11) Sanitary urine-storing gutters and gutter ridges 111a and 111b each are made of plastic, wooden, or metallic material, or a combination of at least two of the above-mentioned materials.
12) Multi-function platform-locking shock-absorbing gusset systems 112 each are made of the combined materials of its components.
13) Gusset walls 113 each are made of plastic, wooden, or metallic material, or a combination of at least two of the above-mentioned materials.
14) Wire-locking gusset recesses 114a and 114b each are made of empty space.
15) Curved gusset springs 115a, 115b, and 115c each are made of plastic, wooden, or metallic material, or a combination of at least two of the above-mentioned materials.
16) Vertical gusset spring 116 is made of plastic, wooden, or metallic material, or a combination of at least two of the above-mentioned materials.
17) Horizontal gusset spring 117 is made of plastic, wooden, or metallic material, or a combination of at least two of the above-mentioned materials.
18) Platform-locking shock-absorbing gusset tab 118 is made of plastic, wooden, or metallic material, or a combination of at least two of the above-mentioned materials.
19) Multi-function grooming platform 119 is made of the combined materials of its components.
20) Grooming platform 120 is made of plastic, wooden, or metallic material, or a combination of at least two of the above-mentioned materials.
21) Platform dikes 121 each are made of plastic, wooden, or metallic material, or a combination of at least two of the above-mentioned materials.
22) Platform-locking corners 122 each are made of plastic, wooden, or metallic material, or a combination of at least two of the above-mentioned materials.
23) Multi-function door system 123 is made of the combined materials of its components.
24) First door hinge 124 is made of plastic, wooden, or metallic material, or a combination of at least two of the above-mentioned materials.
25) Second door hinge 125 is made of plastic, wooden, or metallic material, or a combination of at least two of the above-mentioned materials.
26) First door panel 126 is made of plastic, wooden, or metallic material, or a combination of at least two of the above-mentioned materials.
27) Second door panel 127 is made of plastic, wooden, or metallic material, or a combination of at least two of the above-mentioned materials.
28) Front knob panel 128 is made of plastic, wooden, or metallic material, or a combination of at least two of the above-mentioned materials.
29) Rear knob panel 129 is made of plastic, wooden, or metallic material, or a combination of at least two of the above-mentioned materials.
30) Front knob hooks 130 each are made of plastic, wooden, or metallic material, or a combination of at least two of the above-mentioned materials.

31) Rear knob hooks 131 each are plastic, wooden, or metallic material, or a combination of at least two of the above-mentioned materials.
32) Palm knob 132a and spring-loaded palm knob 132b each are made of plastic, wooden, or metallic material, or a combination of at least two of the above-mentioned materials.
33) Palm recesses 133 each are made of empty space.
34) Palm hills 134 each are made of plastic, wooden, or metallic material, or a combination of at least two of the above-mentioned materials.
35) Circular knob gears 135 each are made of plastic, wooden, or metallic material, or a combination of at least two of the above-mentioned materials.
36) Knob-stopping notches 136 each are made of empty space.
37) Knob-stopping spring-loaded pin 137 is made of plastic, wooden, or metallic material, or a combination of at least two of the above-mentioned materials.
38) Spring-loaded-pin housing 138 is made of plastic, wooden, or metallic material, or a combination of at least two of the above-mentioned materials.
39) First locking rod 139 is made of plastic, wooden, or metallic material, or a combination of at least two of the above-mentioned materials.
40) First-locking-rod linear gears 140 each are made of plastic, wooden, or metallic material, or a combination of at least two of the above-mentioned materials.
41) First-locking-rod attacher 141 is made of plastic, wooden, or metallic material, or a combination of at least two of the above-mentioned materials.
42) First-locking-rod extender 142 is made of plastic, wooden, or metallic material, or a combination of at least two of the above-mentioned materials.
43) Second locking rod 143 is made of plastic, wooden, or metallic material, or a combination of at least two of the above-mentioned materials.
44) Second-locking-rod linear gears 144 each are made of plastic, wooden, or metallic material, or a combination of at least two of the above-mentioned materials.
45) Second-locking-rod attacher 145 is made of plastic, wooden, or metallic material, or a combination of at least two of the above-mentioned materials.
46) Second-locking-rod extender 146 is made of plastic, wooden, or metallic material, or a combination of at least two of the above-mentioned materials.
47) Third locking rod 147 is made of plastic, wooden, or metallic material, or a combination of at least two of the above-mentioned materials.
48) Third-locking-rod linear gears 148 each are made of plastic, wooden, or metallic material, or a combination of at least two of the above-mentioned materials.
49) Third-locking-rod attacher 149 is made of plastic, wooden, or metallic material, or a combination of at least two of the above-mentioned materials.
50) Third-locking-rod extender 150 is made of plastic, wooden, or metallic material, or a combination of at least two of the above-mentioned materials.
51) Multi-function door-locking ring system 151 is made of the combined materials of its components.
52) Hinge-locking rings 152 each are made of plastic, wooden, or metallic material, or a combination of at least two of the above-mentioned materials.
53) Rod-locking rings 153 each are made of plastic, wooden, or metallic material, or a combination of at least two of the above-mentioned materials.
54) Door-panel-and-door magnet system 154 is made of the combined materials of its components.
55) Panel magnet 155 is made of metallic material.
56) Door magnet 156 is made of metallic material.

Shape

Referring to FIGS. 1A, 1B, 2A, 2B, 3, 4, 5A, 5B, 5C, 6, 7A, 7B, 7C, 7D, 7E, 7F, 8A, 8B, 8C, 8D, 8E, 8F, 8G, 9A, 9B, 10A, 10B, 10C, 10D, 10E, 10F, 10G, 10H, 11A, and 11B:

1) Crate-panel system 101 has the combined shapes of its components.
2) Top, bottom, left, right, front, and rear panels 102a, 102b, 102c, 102d, 102e, and 102f, each have a rectangular shape.
3) Bottom panel-locking hooks 103a and 103b each have a curved L shape.
4) Side panel-locking hooks 104 each have an L shape.
5) Top panel-locking hooks 105 each have an L shape.
6) Panel-coupling clamps 106 each have a C shape with curved ends.
7) Handle 107 has a C shape.
8) Handle-locking hooks 108 each have a U shape.
9) Multi-function slanted urine-storing bed system 109 has the combined shapes of its components.
10) Slanted sanitary-urine-storing-gutter bed 110 has a rectangular shape.
11) Sanitary urine-storing gutters 111a each have a rectangular shape with a U-shaped cross-section. Gutter ridges 111b each have a rectangular shape.
12) Multi-function platform-locking shock-absorbing gusset systems 112 each have the combined shapes of its components.
13) Gusset walls 113 each have a triangular shape.
14) Wire-locking gusset recesses 114a and 114b each have a triangular shape.
15) Curved gusset springs 115a, 115b, and 115c each have a curved rectangular shape.
16) Vertical gusset spring 116 has a rectangular shape.
17) Horizontal gusset spring 117 has a triangular shape.
18) Platform-locking shock-absorbing gusset tab 118 has a triangular shape with a curved front edge.
19) Multi-function grooming platform 119 has the combined shapes of its components.
20) Grooming platform 120 has a rectangular shape.
21) Platform dikes 121 each have a rectangular shape with a U-shaped cross-section.
22) Platform-locking corners 122 each have a triangular shape.
23) Multi-function door system 123 has the combined shapes of its components.
24) First door hinge 124 has an I shape.
25) Second door hinge 125 has an I shape.
26) First door panel 126 has a rectangular shape.
27) Second door panel 127 has a rectangular shape.
28) Front knob panel 128 has a ring shape.
29) Rear knob panel 129 has a ring shape.
30) Front knob hooks 130 each have an L shape.
31) Rear knob hooks 131 each have an L shape.
32) Palm knob 132a and spring-loaded palm knob 132b each have a round shape.
33) Palm recesses 133 each have a curved-water-drop shape.
34) Palm hills 134 each have a curved-water-drop shape.
35) Circular knob gears 135 each have a circular-gear shape.
36) Knob-stopping notches 136 each have a triangular shape.
37) Knob-stopping spring-loaded pin 137 has a cylindrical shape.
38) Spring-loaded-pin housing 138 has a bottle shape.

39) First locking rod 139 has an S-rod shape.
40) First-locking-rod linear gears 140 each have a linear-gear shape.
41) First-locking-rod attacher 141 has a tube-cylinder shape.
42) First-locking-rod extender 142 has an I-rod shape.
43) Second locking rod 143 has an S-rod shape.
44) Second-locking-rod linear gears 144 each have a linear-gear shape.
45) Second-locking-rod attacher 145 has a tube-cylinder shape.
46) Second-locking-rod extender 146 has an I-rod shape.
47) Third locking rod 147 has an O-rod shape.
48) Third-locking-rod linear gears 148 each have a linear-gear shape.
49) Third-locking-rod attacher 149 has a tube-cylinder shape.
50) Third-locking-rod extender 150 has an I-rod shape.
51) Multi-function door-locking ring system 151 has the combined shapes of its components.
52) Hinge-locking rings 152 each have an O shape.
53) Rod-locking rings 153 each have an O shape.
54) Door-panel-and-door magnet system 154 has the combined shapes of its components.
55) Panel magnet 155 has a rectangular-cube shape.
56) Door magnet 156 has a rectangular-cube shape.

Connection

Referring to FIGS. 1A, 1B, 2A, 2B, 3, 4, 5A, 5B, 5C, 6, 7A, 7B, 7C, 7D, 7E, 7F, 8A, 8B, 8C, 8D, 8E, 8F, 8G, 9A, 9B, 10A, 10B, 10C, 10D, 10E, 10F, 10G, 10H, 11A, and 11B:
1) Crate-panel system 101 has the combined connections of its components.
2) Top, bottom, left, right, front, and rear panels 102*a*, 102*b*, 102*c*, 102*d*, 102*e*, and 102*f* respectively are foldably connected to one another.
3) Bottom panel-locking hooks 103*a* and 103*b* respectively are foldably connected to bottom panel 102*b*.
4) Side panel-locking hooks 104 respectively are welded to left and right panels 102*c* and 102*d*.
5) Top panel-locking hooks 105 respectively are welded to front and rear panels 102*e* and 102*f*.
6) Panel-coupling clamps 106 respectively are clamped on top, bottom, left, and right panels 102*a*, 102*b*, 102*c*, and 102*d*.
7) Handle 107 is molded to handle-locking hooks 108.
8) Handle-locking hooks 108 respectively are molded to handle 107.
9) Multi-function slanted urine-storing bed system 109 has the combined connections of its components.
10) Slanted sanitary-urine-storing-gutter bed 110 is seated on bottom panel 102*b*.
11) Sanitary urine-storing gutters and gutter ridges 111*a* and 111*b* respectively are molded to slanted sanitary-urine-storing-gutter bed 110.
12) Multi-function platform-locking shock-absorbing gusset systems 112 respectively have the combined connections of its components.
13) Gusset walls 113 respectively are molded to curved gusset springs 115*a*, 115*b*, and 115*c*, vertical gusset spring 116, and horizontal gusset spring 117.
14) Wire-locking gusset recesses 114*a* and 114*b* respectively are molded inside gusset walls 113.
15) Curved gusset springs 115*a*, 115*b*, and 115*c* respectively are molded to gusset walls 113, vertical gusset spring 116, and horizontal gusset spring 117.
16) Vertical gusset spring 116 is molded to gusset walls 113, curved gusset springs 115*a*, 115*b*, and 115*c*, and horizontal gusset spring 117.
17) Horizontal gusset spring 117 is molded to gusset walls 113, curved gusset springs 115*a*, 115*b*, and 115*c*, and vertical gusset spring 116.
18) Platform-locking shock-absorbing gusset tab 118 is molded to horizontal gusset spring 117.
19) Multi-function grooming platform 119 has the combined connections of its components.
20) Grooming platform 120 is molded to platform dikes 121.
21) Platform dikes 121 respectively are molded to grooming platform 120.
22) Platform-locking corners 122 respectively are molded to platform dikes 121.
23) Multi-function door system 123 has the combined connections of its components.
24) First door hinge 124 is attached to front panel 102*e*.
25) Second door hinge 125 is attached to first door panel 126.
26) First door panel 126 is attached to first door hinge 124.
27) Second door panel 127 is attached to second door hinge 125.
28) Front knob panel 128 is snap-locked on rear knob panel 129.
29) Rear knob panel 129 is snap-locked on front knob panel 128.
30) Front knob hooks 130 respectively are snap-locked on rear knob hooks 131.
31) Rear knob hooks 131 respectively are snap-locked on front knob hooks 130.
32) Palm knob 132*a* and spring-loaded palm knob 132*b* each are sandwiched between front knob panel 128 and rear knob panel 129.
33) Palm recesses 133 respectively are molded in palm knob 132*a*.
34) Palm hills 134 respectively are molded on palm knob 132*a*.
35) Circular knob gears 135 respectively are molded on palm knob 132*a*.
36) Knob-stopping notches 136 respectively are molded on palm knob 132*a*.
37) Knob-stopping spring-loaded pin 137 is inserted into one of knob-stopping notches 136.
38) Spring-loaded-pin housing 138 is molded on front knob panel 128 and rear knob panel 129.
39) First locking rod 139 is engaged to circular knob gear 135.
40) First-locking-rod linear gears 140 respectively are engaged to circular knob gear 135.
41) First-locking-rod attacher 141 is attached to first locking rod 139.
42) First-locking-rod extender 142 is attached to first-locking-rod attacher 141.
43) Second locking rod 143 is engaged to circular knob gear 135.
44) Second-locking-rod linear gears 144 respectively are engaged to circular knob gear 135.
45) Second-locking-rod attacher 145 is attached to second locking rod 143.
46) Second-locking-rod extender 146 is attached to second-locking-rod attacher 145.
47) Third locking rod 147 is engaged to circular knob gear 135.
48) Third-locking-rod linear gears 148 respectively are engaged to circular knob gear 135.
49) Third-locking-rod attacher 149 is attached to third locking rod 147.
50) Third-locking-rod extender 150 is attached to third-locking-rod attacher 149.

51) Multi-function door-locking ring system 151 has the combined connections of its components.
52) Hinge-locking rings 152 respectively are molded, welded, or otherwise attached to front panel 102e.
53) Rod-locking rings 153 respectively are molded, welded, or otherwise attached to front panel 102e.
54) Door-panel-and-door magnet system 154 has the combined connections of its components.
55) Panel magnet 155 is attached to front panel 102e.
56) Door magnet 156 is attached to second door panel 127.

Function

Referring to FIGS. 1A, 1B, 2A, 2B, 3, 4, 5A, 5B, 5C, 6, 7A, 7B, 7C, 7D, 7E, 7F, 8A, 8B, 8C, 8D, 8E, 8F, 8G, 9A, 9B, 10A, 10B, 10C, 10D, 10E, 10F, 10G, 10H, 11A, and 11B:

1) Crate-panel system 101 is for performing the combined functions of its components.
2) Top, bottom, left, right, front, and rear panels 102a, 102b, 102c, 102d, 102e, and 102f respectively are for:
   Forming a crate.
3) Bottom panel-locking hooks 103a and 103b respectively are for:
   Preventing slanted sanitary-urine-storing-gutter bed 110 from sliding out of bottom panel 102b, and for
   Snap-locking on top, left, right, front, and/or rear panels 102a, 102c, 102d, 102e, and/or 102f.
4) Side panel-locking hooks 104 respectively are for:
   Locking front and rear panels 102e, and 102f to top, left, and right panels 102a, 102c, 102d.
5) Top panel-locking hooks 105 respectively are for:
   Locking front and rear panels 102e, and 102f to top panel 102a.
6) Panel-coupling clamps 106 respectively are for:
   Coupling top, bottom, left, and right panels 102a, 102b, 102c, and 102d.
7) Handle 107 is for:
   Carrying crate-panel system 101, multi-function slanted urine-storing bed system 109, multi-function gusset systems 112, multi-function grooming platform 119, multi-function door-panel system 123, and multi-function door system 131.
8) Handle-locking hooks 108 respectively are for:
   Hooking handle 107 on crate-panel system 101.
9) Multi-function slanted urine-storing bed system 109 is for performing the combined functions of its components.
10) Slanted sanitary-urine-storing-gutter bed 110 is for:
    a) Allowing urine to run down into sanitary urine-storing gutters 111 to keep slanted sanitary-urine-storing-gutter bed 110 dry;
    b) Preventing pets from getting diseases and infections caused by their own urine; and
    c) Providing a comfort platform for a pet to sit, stand, play, rest, and sleep thereon.
11) Sanitary urine-storing gutters 111a respectively are for:
    a) Storing urine running down from slanted sanitary-urine-storing-gutter bed 110 to keep slanted sanitary-urine-storing-gutter bed 110 dry; and
    b) Preventing pets from getting diseases and infections caused by their own urine.
    Gutter ridges 111b respectively are for:
    a) Keeping pets' feet and pets away from, and not on, urine when pets step in or lay on sanitary urine-storing gutters 111a to keep pets' feet and pets dry; and
    b) Preventing pets from getting diseases and infections caused by their own urine.
12) Multi-function platform-locking shock-absorbing gusset systems 112 respectively are for performing the combined functions of its components.
13) Gusset walls 113 respectively are for:
    a) Strengthening top, bottom, left, right, front, and rear panels 102a, 102b, 102c, 102d, 102e, and 102f;
    b) Strengthening crate-panel system 101; and
    c) Locking top, bottom, left, right, front, and rear panels 102a, 102b, 102c, 102d, 102e, and 102f together.
14) Wire-locking gusset recesses 114a and 114b respectively are for:
    Locking the corners of top, bottom, left, right, front, and rear panels 102a, 102b, 102c, 102d, 102e, and 102f therein.
15) Curved gusset springs 115a, 115b, and 115c respectively are for:
    a) Resisting the wobbling forces exerted on top, bottom, left, right, front, and rear panels 102a, 102b, 102c, 102d, 102e, and 102f;
    b) Resisting the warping forces exerted on top, bottom, left, right, front, and rear panels 102a, 102b, 102c, 102d, 102e, and 102f;
    c) Resisting the twisting forces exerted on top, bottom, left, right, front, and rear panels 102a, 102b, 102c, 102d, 102e, and 102f;
    d) Resisting the bending forces exerted on top, bottom, left, right, front, and rear panels 102a, 102b, 102c, 102d, 102e, and 102f;
    e) Resisting the sliding forces exerted on top, bottom, left, right, front, and rear panels 102a, 102b, 102c, 102d, 102e, and 102f;
    f) Resisting the folding forces exerted on top, bottom, left, right, front, and rear panels 102a, 102b, 102c, 102d, 102e, and 102f;
    g) Strengthening vertical gusset spring 116;
    h) Strengthening horizontal gusset spring 117; and
    i) Returning multi-function gusset system 112 back to its former shape and dimensions.
16) Vertical gusset spring 116 is for:
    a) Resisting the wobbling forces exerted on top, bottom, left, right, front, and rear panels 102a, 102b, 102c, 102d, 102e, and 102f;
    b) Resisting the warping forces exerted on top, bottom, left, right, front, and rear panels 102a, 102b, 102c, 102d, 102e, and 102f;
    c) Resisting the twisting forces exerted on top, bottom, left, right, front, and rear panels 102a, 102b, 102c, 102d, 102e, and 102f;
    d) Resisting the bending forces exerted on top, bottom, left, right, front, and rear panels 102a, 102b, 102c, 102d, 102e, and 102f;
    e) Resisting the sliding forces exerted on top, bottom, left, right, front, and rear panels 102a, 102b, 102c, 102d, 102e, and 102f;
    f) Resisting the folding forces exerted on top, bottom, left, right, front, and rear panels 102a, 102b, 102c, 102d, 102e, and 102f;
    g) Strengthening curved gusset springs 115a, 115b, and 115c;
    h) Strengthening horizontal gusset spring 117; and
    i) Returning multi-function gusset system 112 back to its former shape and dimensions.
17) Horizontal gusset spring 117 is for:
    a) Resisting the wobbling forces exerted on top, bottom, left, right, front, and rear panels 102a, 102b, 102c, 102d, 102e, and 102f;
    b) Resisting the warping forces exerted on top, bottom, left, right, front, and rear panels 102a, 102b, 102c, 102d, 102e, and 102f;

c) Resisting the twisting forces exerted on top, bottom, left, right, front, and rear panels 102a, 102b, 102c, 102d, 102e, and 102f;

d) Resisting the bending forces exerted on top, bottom, left, right, front, and rear panels 102a, 102b, 102c, 102d, 102e, and 102f;

e) Resisting the sliding forces exerted on top, bottom, left, right, front, and rear panels 102a, 102b, 102c, 102d, 102e, and 102f;

f) Resisting the folding forces exerted on top, bottom, left, right, front, and rear panels 102a, 102b, 102c, 102d, 102e, and 102f;

g) Strengthening curved gusset springs 115a, 115b, and 115c;

h) Strengthening vertical gusset spring 116; and i) Returning multi-function gusset system 112 back to its former shape and dimensions.

18) Platform-locking shock-absorbing gusset tab 118 is for:
a) Locking multi-function grooming platform 119 in place;
b) Resisting the wobbling forces exerted on top, bottom, left, right, front, and rear panels 102a, 102b, 102c, 102d, 102e, and 102f;
c) Resisting the warping forces exerted on top, bottom, left, right, front, and rear panels 102a, 102b, 102c, 102d, 102e, and 102f;
d) Resisting the twisting forces exerted on top, bottom, left, right, front, and rear panels 102a, 102b, 102c, 102d, 102e, and 102f;
e) Resisting the bending forces exerted on top, bottom, left, right, front, and rear panels 102a, 102b, 102c, 102d, 102e, and 102f;
f) Resisting the sliding forces exerted on top, bottom, left, right, front, and rear panels 102a, 102b, 102c, 102d, 102e, and 102f;
g) Resisting the folding forces exerted on top, bottom, left, right, front, and rear panels 102a, 102b, 102c, 102d, 102e, and 102f;
h) Strengthening curved gusset springs 115a, 115b, and 115c;
i) Strengthening vertical gusset spring 116;
j) Returning multi-function gusset system 112 back to its former shape and dimensions;
k) Preventing all eight corners of the unique pet crate from scratching walls, floors, and furniture;
l) Preventing all eight corners of the unique pet crate from causing injuries to people and pets;
m) Absorbing shocks exerted on the unique pet crate to provide pets with comfort while being stationary or transported; and
n) Absorbing vibrations exerted on the unique pet crate to provide pets with comfort while being stationary or transported.

19) Multi-function grooming platform 119 is for performing the combined functions of its components.

20) Grooming platform 120 is for:
Providing a platform for a pet to stand, sit, or lay on to be groomed.

21) Platform dikes 121 respectively are for:
a) Preventing pet urine from running off grooming platform 120;
b) Preventing pet hair from falling off grooming platform 120; and
c) Providing a comfort platform for a pet to sit, stand, rest and sleep thereon while being groomed.

22) Platform-locking corners 122 respectively are for:
Locking grooming platform 120 to platform-locking shock-absorbing gusset tabs 118 when platform-locking corners 122 are inserted under platform-locking shock-absorbing gusset tabs 118.

23) Multi-function door system 123 is for performing the combined functions of its components.

24) First door hinge 124 is for:
Hingedly attaching first door panel 126 to front panel 102e.

25) Second door hinge 125 is for:
Hingedly attaching first door panel 126 to second door panel 127.

26) First door panel 126 is for:
Closing the opening of front panel 102e.

27) Second door panel 127 is for:
Closing the opening of front panel 102e.

28) Front knob panel 128 is for:
Sandwiching palm knob 132a therein.

29) Rear knob panel 129 is for:
Sandwiching palm knob 132a therein.

30) Front knob hooks 130 respectively are for:
Hooking on rear knob hooks 131.

31) Rear knob hooks 131 respectively are for:
Hooking on front knob hooks 130.

32) Palm knob 132a is for:
Rotating circular knob gear 135.
Spring-loaded palm knob 132b is for:
Locking multi-function door system 123 to top panel 102a.

33) Palm recesses 133 respectively are for:
Allowing the palm of a user's hand to rest therein.

34) Palm hills 134 respectively are for:
Allowing the palm of a user's hand to rest therebetween.

35) Circular knob gears 135 respectively are for:
Pushing first-locking-rod linear gear 140, second-locking-rod linear gear 144, and third-locking-rod linear gear 148.

36) Knob-stopping notches 136 respectively are for:
Allowing knob-stopping spring-loaded pin 137 to be inserted therein to stop palm knob 132a.

37) Knob-stopping spring-loaded pin 137 is for:
Stopping palm knob 132a.

38) Spring-loaded-pin housing 138 is for:
Housing knob-stopping spring-loaded pin 137.

39) First locking rod 139 is for:
Locking first door panel 126 and second door panel 127 in place.

40) First-locking-rod linear gears 140 respectively are for:
Engaging with circular knob gear 135.

41) First-locking-rod attacher 141 is for:
Attaching first locking rod 139 to first-locking-rod extender 142.

42) First-locking-rod extender 142 is for:
Extending first locking rod 139.

43) Second locking rod 143 is for:
Locking first door panel 126 and second door panel 127 in place.

44) Second-locking-rod linear gears 144 respectively are for:
Engaging with circular knob gear 135.

45) Second-locking-rod attacher 145 is for:
Attaching second locking rod 143 to second-locking-rod extender 146.

46) Second-locking-rod extender 146 is for:
Extending second locking rod 143.

47) Third locking rod 147 is for:
Locking first door panel 126 and second door panel 127 in place.
48) Third-locking-rod linear gears 148 respectively are for:
Engaging with circular knob gear 135.
49) Third-locking-rod attacher 149 is for:
Attaching third locking rod 147 to third-locking-rod extender 150.
50) Third-locking-rod extender 150 is for:
Extending third locking rod 147.
51) Multi-function door-locking ring system 151 is for performing the combined functions of its components.
52) Hinge-locking rings 152 respectively are for:
Locking first door hinge 124 therein.
53) Rod-locking rings 153 respectively are for:
Locking first locking rod extender 142, second locking rod extender 146, and third locking rod extender 150 therein.
54) Door-panel-and-door magnet system 154 is for performing the combined functions of its components.
55) Panel magnet 155 is for:
a) Pulling door magnet 156 toward itself to stop multi-function door system 123 from swinging back and forth; and
b) Pulling door magnet 156 toward itself to close multi-function door system 123.
56) Door magnet 156 is for:
a) Pulling panel magnet 155 toward itself to stop multi-function door system 123 from swinging back and forth; and
b) Pulling panel magnet 155 toward itself to close multi-function door system 123.

Operation

The multi-stacked-hinge-door pet crate has:
a) Ridged slanted urine-storing bed system,
b) Platform-locking shock-absorbing gusset systems,
c) Diked grooming platform, and
d) Triple-rod-front-lock single-knob-top-lock double-magnet-front-lock door system.

The operation of the multi-stacked-hinge-door pet crate comprises:

A) how to Set Up the Unique Pet Crate
Referring to FIGS. 12A, 12B, 12C, 12D, 13A, and 13B:
1) Unfolding top, left, right, front, and rear panels 102a, 102c, 102d, 102e, and 102f;
2) Hooking side panel-locking hooks 104 on front and rear panels 102e and 102f, respectively;
3) Hooking top panel-locking hooks 105 on top panel 102a;
4) Inserting multi-function slanted urine-storing bed system 109 on bottom panel 102b:
a) To provide a planar surface for pets to play, seat, rest, and sleep thereon,
b) To allow urine to run down
slanted sanitary-urine-storing-gutter bed 110 into sanitary urine-storing gutters 111a
to keep slanted sanitary-urine-storing-gutter bed 110 dry
to prevent pets from getting diseases and infections caused by their own urine,
c) To allow pets to step on gutter ridges 111b
(keeping pets' feet and pets away from, and not on, urine when pets step in or lay on sanitary urine-storing gutters 111a) to keep pets' feet and pets dry
to prevent pets from getting diseases and infections caused by their own urine; and
5) Hooking bottom panel-locking hook 103a on front panel 102e.

B) How to Assemble Handle 107 on the Unique Pet Crate
Referring to FIGS. 12A, 12B, 12C, 12D, 13A, and 13B:
Snap-hooking handle-locking hooks 108 on one of top, bottom, left, right, front, and rear panels 102a, 102b, 102c, 102d, 102e, and 102f to hook handle 107 on the unique pet crate.

C) How to Unlock Multi-Function Door System 123
Referring to FIGS. 8F, 10G, 11A, and 11B:
1) Inserting a palm in palm recesses 133;
2) Resting a palm between palm hills 134; and
4) Rotating palm knob 132a to rotate circular knob gears 135, in the direction of arrow 157a:
a) To push first, second, and third locking rods 139, 143, and 147 out of rod-locking rings 153, respectively, in the directions of arrows 157b, 157c, and 157d,
to unlock multi-function door system 123;
b) To allow people with arthritis to easily unlock multi-function door system 123;
c) To allow people with limited physical movement to easily unlock multi-function door system 123;
d) To allow elders with limited joint movement to easily unlock multi-function door system 123; and
e) To allow people to keep their finger joints straight while operating circular knob gears 135 to prevent finger-joint pain.

D) How to Lock Multi-Function Door System 123
Referring to FIGS. 8G, 10H, 12A, 12B, 12C, 12D, 13A, and 13:
1) Inserting a palm in palm recesses 133;
2) Inserting a palm between palm hills 134; and
3) Rotating palm knob 132a to rotate circular knob gears 135
in the direction of arrow 158a:
a) To push first, second, and third locking rods 139, 143, and 147 into rod-locking rings 153, respectively, in the directions of arrows 158b, 158c, and 158d,
to lock multi-function door system 123 in place;
b) To allow people with arthritis to easily lock multi-function door system 123;
c) To allow people with limited physical movement to easily lock multi-function door system 123;
d) To allow elders with limited joint movement to easily lock multi-function door system 123; and
e) To allow people to keep their finger joints straight while operating circular knob gears 135 to prevent finger-joint pain.

E) How to Assemble Multi-Function Platform-Locking Shock-Absorbing Gusset Systems 112 to Strengthen the Unique Pet Crate
Referring to FIGS. 14A, 14B, 14C, 14D, 14E, 14F, 14G, 14H, 14I, 14J, and 14K:
1) Sliding wire-locking gusset recesses 114a and 114b of multi-function platform-locking shock-absorbing gusset systems 112 on all eight corners of the unique pet crate; and
2) Snap-locking multi-function platform-locking shock-absorbing gusset systems 112 on all eight corners of the unique pet crate
(on all top, bottom, left, right, front, and rear panels 102a, 102b, 102c, 102d, 102e, and 102f):
a) To strengthen all four top corners of the unique pet crate,
b) To strengthen all four bottom corners of the unique pet crate, c) To prevent all eight corners of the unique pet crate from wobbling,
in the directions of arrows 159*a*, 159*b*, 159*c*, and 159*d*,
d) To prevent all eight corners of the unique pet crate from warping,
in the directions of arrows 159*a*, 159*b*, 159*c*, and 159*d*,
e) To prevent all eight corners of the unique pet crate from twisting,
in the directions of arrows 159*a*, 159*b*, 159*c*, and 159*d*,
f) To prevent all eight corners of the unique pet crate from bending.
in the directions of arrows 159*a*, 159*b*, 159*c*, and 159*d*,
g) To prevent all eight corners of the unique pet crate from sliding,
in the directions of arrows 159*a*, 159*b*, 159*c*, and 159*d*,
h) To prevent all eight corners of the unique pet crate from folding
in the directions of arrows 159*a*, 159*b*, 159*c*, and 159*d*,
i) To prevent all eight corners of the unique pet crate from scratching
walls, floors, and furniture,
j) To prevent all eight corners of the unique pet crate from causing
injuries to people and pets,
k) To absorb shocks exerted on the unique pet crate to provide pets with
comfort while being stationary or transported, and
l) To absorb vibrations exerted on the unique pet crate to provide pets with comfort while being stationary or transported.

F) How to Assemble Multi-Function Grooming Platform 119
On the Unique Pet Crate to Groom Pets Thereon
Referring to FIGS. 15A, 15B, 15C, 15D, 15E, and 15F:
1) Bending platform-locking corners 122 of multi-function grooming platform 119; and
2) Bending and sliding platform-locking corners 122 under
platform-locking gusset tabs 118 of
multi-function platform-locking shock-absorbing gusset systems 112, respectively,
in the directions of arrows 160*a*, 160*b*, 160*c*, and 160*d*,
to lock platform-locking corners 122 to
multi-function platform-locking shock-absorbing gusset systems 112
to lock multi-function grooming platform 119 on top panel 102*a* of the unique pet crate:
a) To groom and clean pets thereon
while platform dikes 121 prevent pet hair, urine, and grooming tools from falling and running over the edge of grooming platform 120 and down the unique pet crate and to the ground,
b) To put pets thereon,
c) To display pets thereon,
d) To allow pets to sit thereon,
e) To allow pets to stand thereon,
f) To allow pets to play thereon,
g) To allow pets to rest thereon, and
h) To allow pets to sleep thereon.

G) How to Lock Multi-Function Door System 123 to Top Panel 102*a*
(To Keep Multi-Function Door System 123 Open)
Referring to FIGS. 16A, 16B, 16C, 16D, 16E, 16F, 16G, 16H, 16I, 16J, 16K, 16L, 16M, 16N, 16O, and 16P:
1) Swinging multi-function door system 123 inward all the way up toward top panel 102*a*,
in the direction of arrow 161*a*;
2) Lifting spring-loaded palm knob 132*b*,
in the direction of arrow 161*b*; and
3) Rotating spring-loaded palm knob 132*b*,
in the direction of arrow 161*c*:
a) To lock spring-loaded palm knob 132*b* on top panel 102*a*,
to lock multi-function door system 123 to
top panel 102*a*, to keep the unique pet crate open, for, for example:
Training pet,
Cleaning the unique pet crate,
Preparing the unique pet crate,
Etc.;
b) To allow people with arthritis to easily lock multi-function door system 123;
c) To allow people with limited physical movement to easily lock multi-function door system 123;
d) To allow elders with limited joint movement to easily lock multi-function door system 123; and
e) To allow people to keep their finger joints straight while operating circular knob gears 135 to prevent finger-joint pain.

H) How to Unlock Multi-Function Door System 123 from Top Panel 102*a*
(To Keep Multi-Function Door System 123 Closed)
Referring to FIGS. 16A, 16B, 16C, 16D, 16E, 16F, 16G, 16H, 16I, 16J, 16K, 16L, 16M, 16N, 16O, and 16P:
Rotating spring-loaded palm knob 132*b*,
in the direction of arrow 162:
a) To lock spring-loaded palm knob 132*b* from top panel 102*a*,
to unlock multi-function door system 123 from
top panel 102*a*, to keep the unique pet crate closed;
a) To allow people with arthritis to easily unlock multi-function door system 123;
b) To allow people with limited physical movement to easily unlock multi-function door system 123;
c) To allow elders with limited joint movement to easily unlock multi-function door system 123; and
d) To allow people to keep their finger joints straight while operating circular knob gears 135 to prevent finger-joint pain.

Figure 17A:
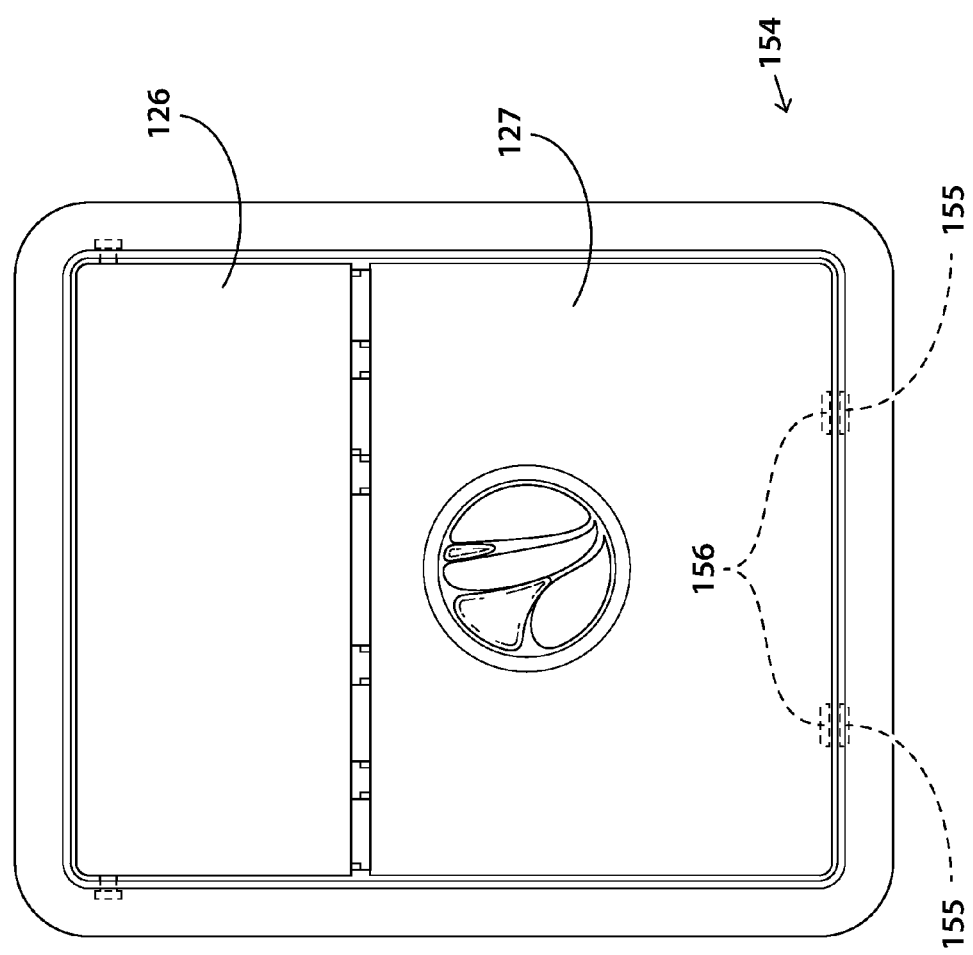
FIGS. 17A, 17B, and 17C illustrate side and front views of how to stop and lock multi-function door system from swinging
Figure 17C:
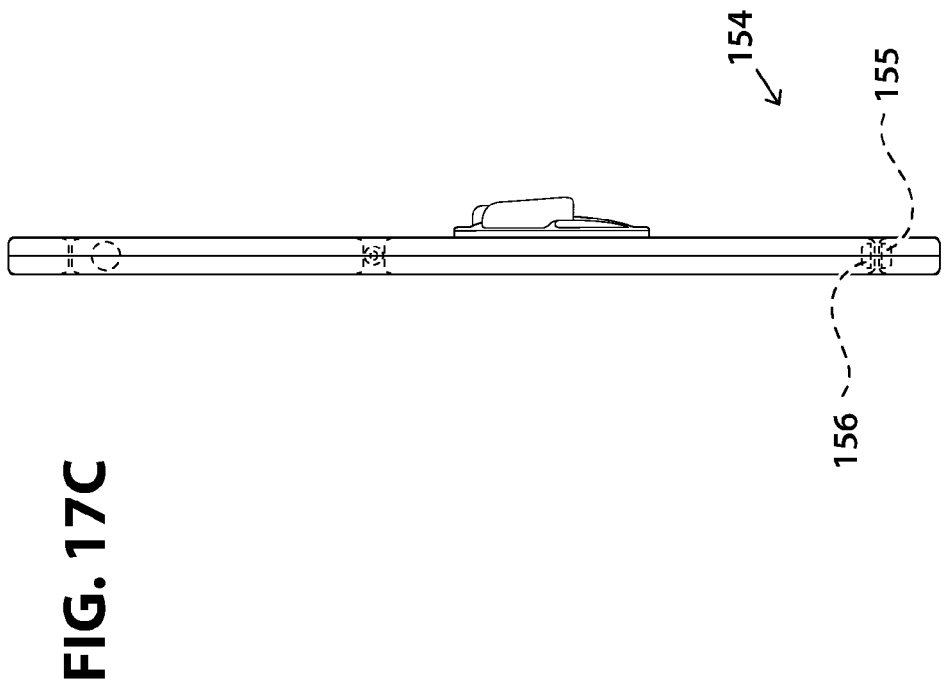
Figure 17B:
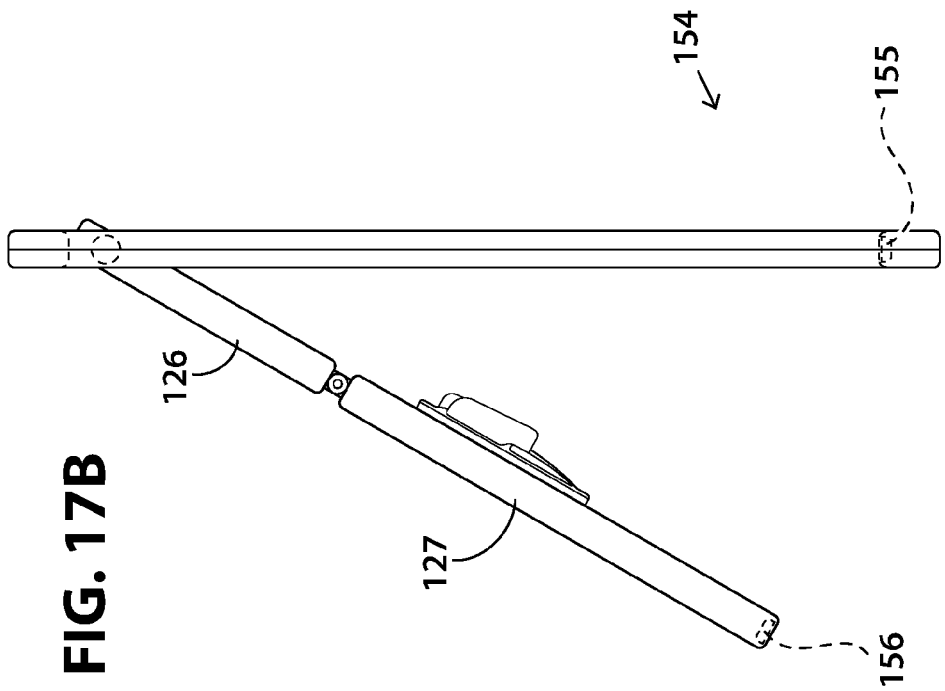

I) How to Automatically Close Multi-Function Door System 123
Referring to FIGS. 17A, 17B, and 17C:
Releasing multi-function door system 123,
to let panel magnet 155 and
door magnet 156
pull themselves toward each other
to automatically stop multi-function door system 123 from swinging and
to automatically close multi-function door system 123.

Figure 17D:
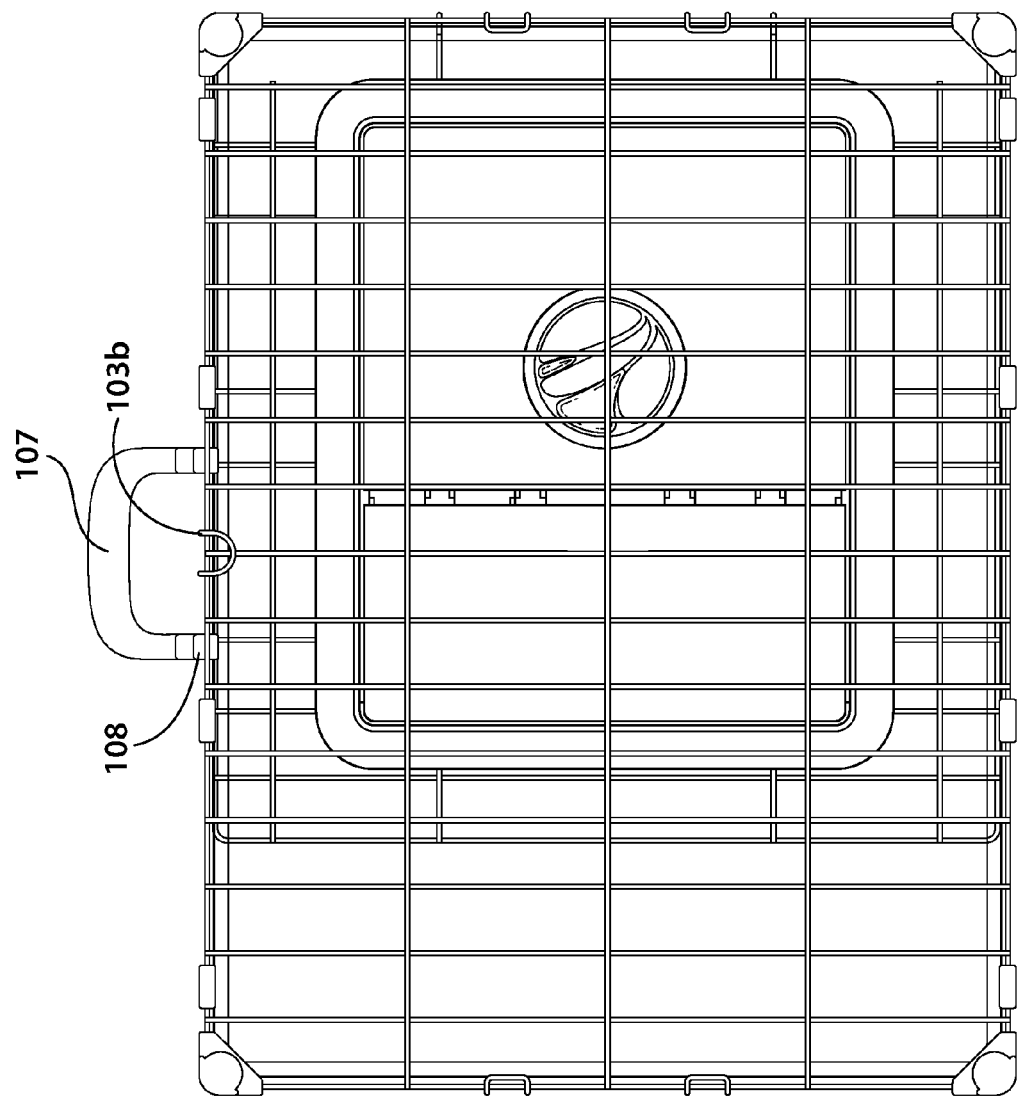
FIG. 17D illustrates a top view of how to stop and lock multi-function door system from swinging.

J) How to Fold the Unique Pet Crate
For Easy Transportation and Storage
Referring to FIG. 17D:
1) Unhooking top panel-locking hooks 105 from top panel 102*a*;

2) Unhooking side panel-locking hooks 104 from front and rear panels 102e and 102f, respectively;
3) Folding front and rear panels 102e and 102f in slanted sanitary-urine-storing-gutter bed 110;
4) Folding top, left, right panels 102a, 102c, and 102d on front and rear panels 102e and 102f;
5) Snap-locking bottom panel-locking hook 103b on top panel 102a, left panel 102c, right panel 102d, front panel 102e, and/or rear panel 102f; and
6) Snap-hooking handle-locking hooks 108 on one of top, bottom, left, right, front, and rear panels 102a, 102b, 102c, 102d, 102e, and 102f to hook handle 107 on the unique pet crate.

Variation

Figure 18A:
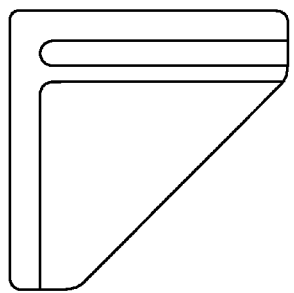
FIG. 18A illustrates a side view of an equivalent variation of multi-function platform-locking shock-absorbing gusset systems.
Figure 18B:
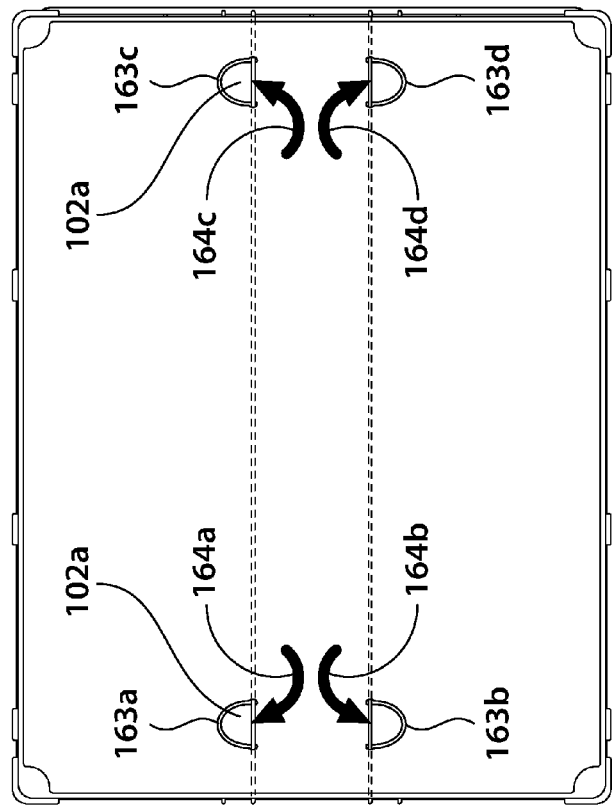
FIG. 18B illustrates a top view of four platform-locking tabs, which are equivalent to and can replace the top four of platform-locking shock-absorbing gusset tabs
Figure 19A:
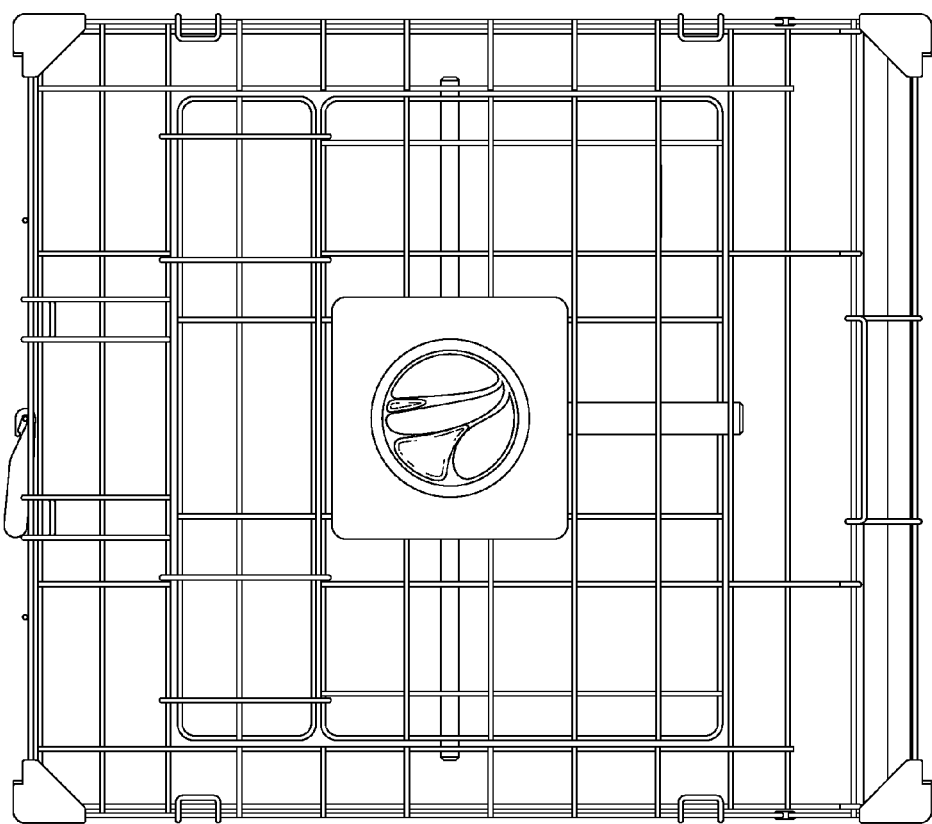
Figure 19B:
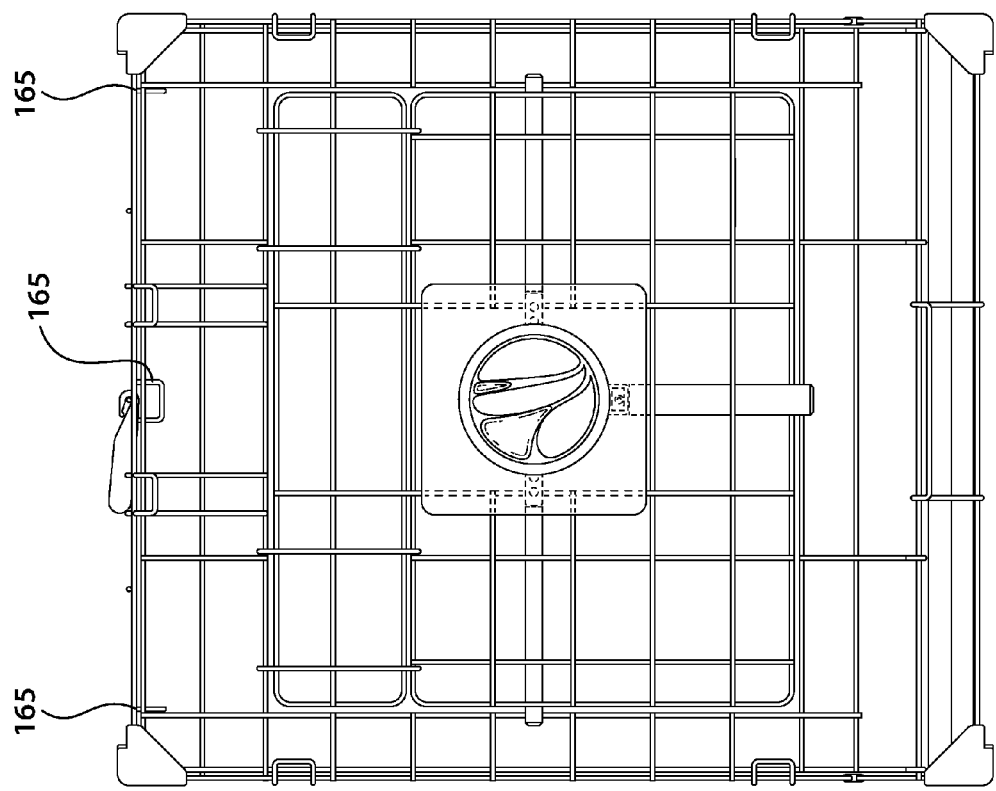
Figure 19C:
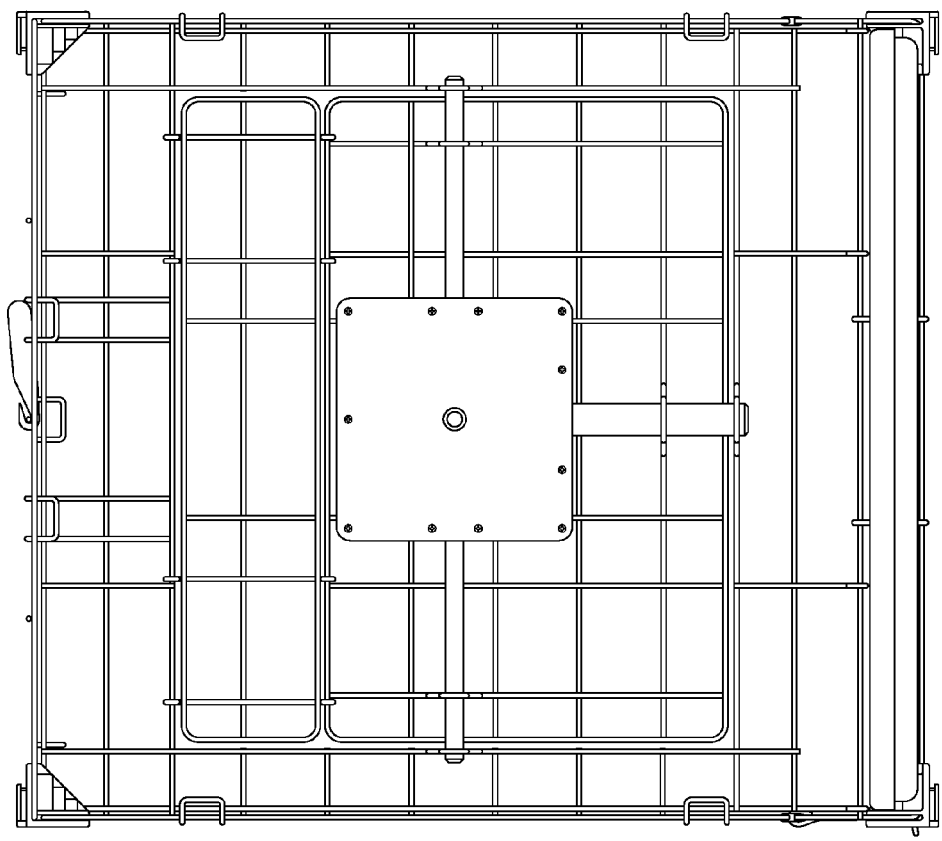
Figure 19D:
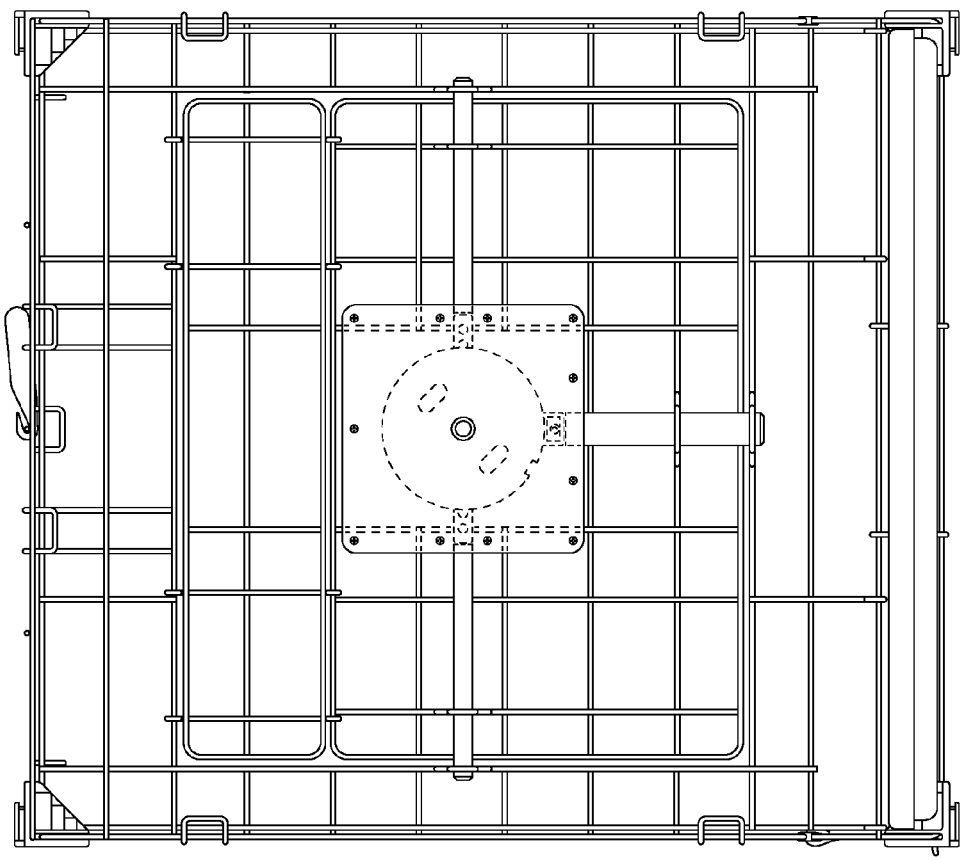
Figure 19E:
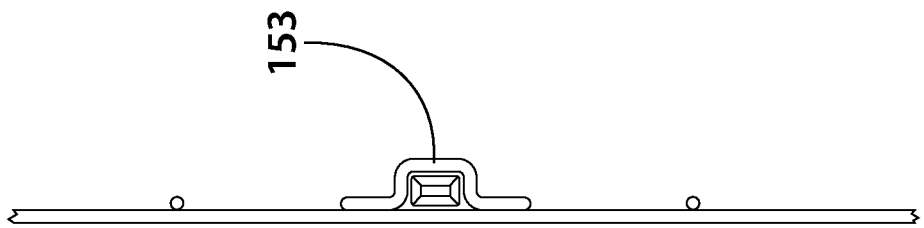
Figure 21:
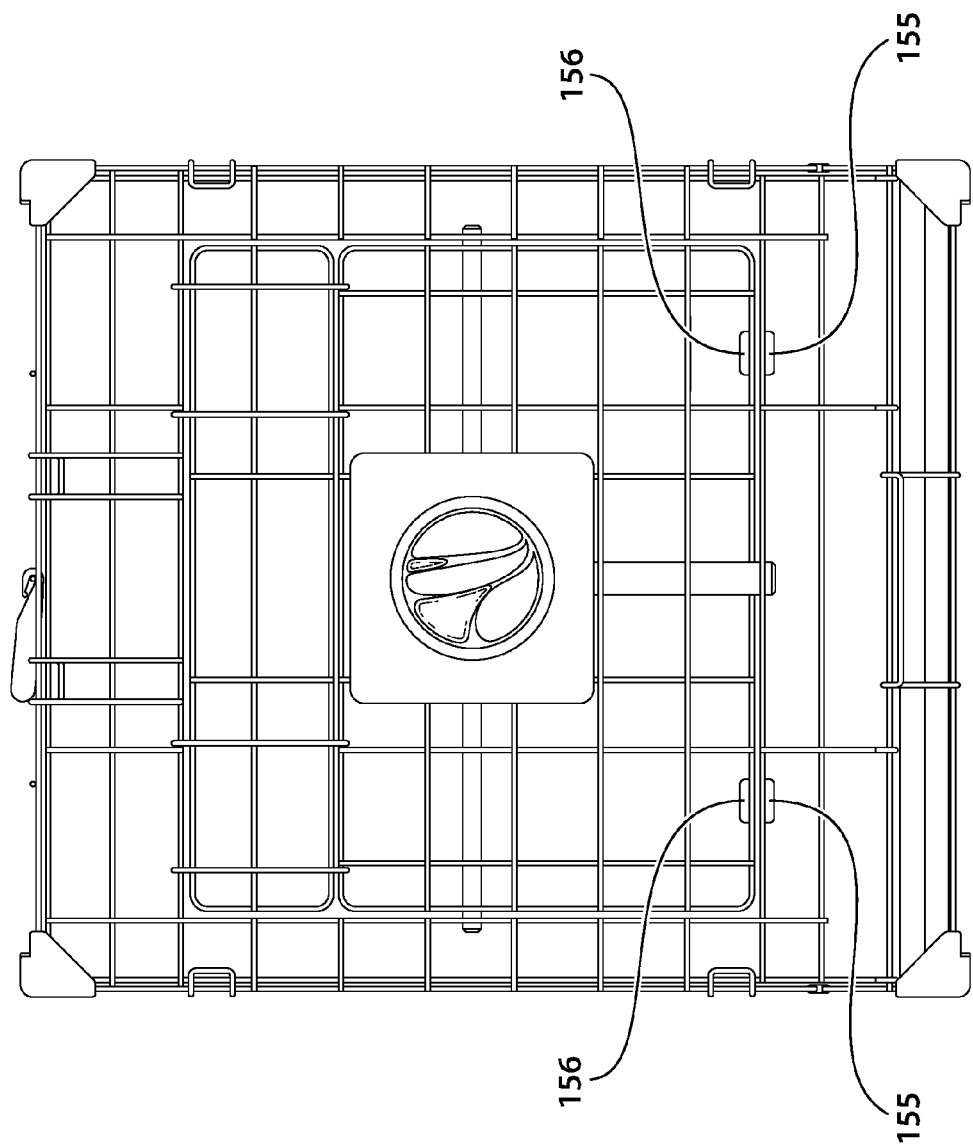
Figure 22:
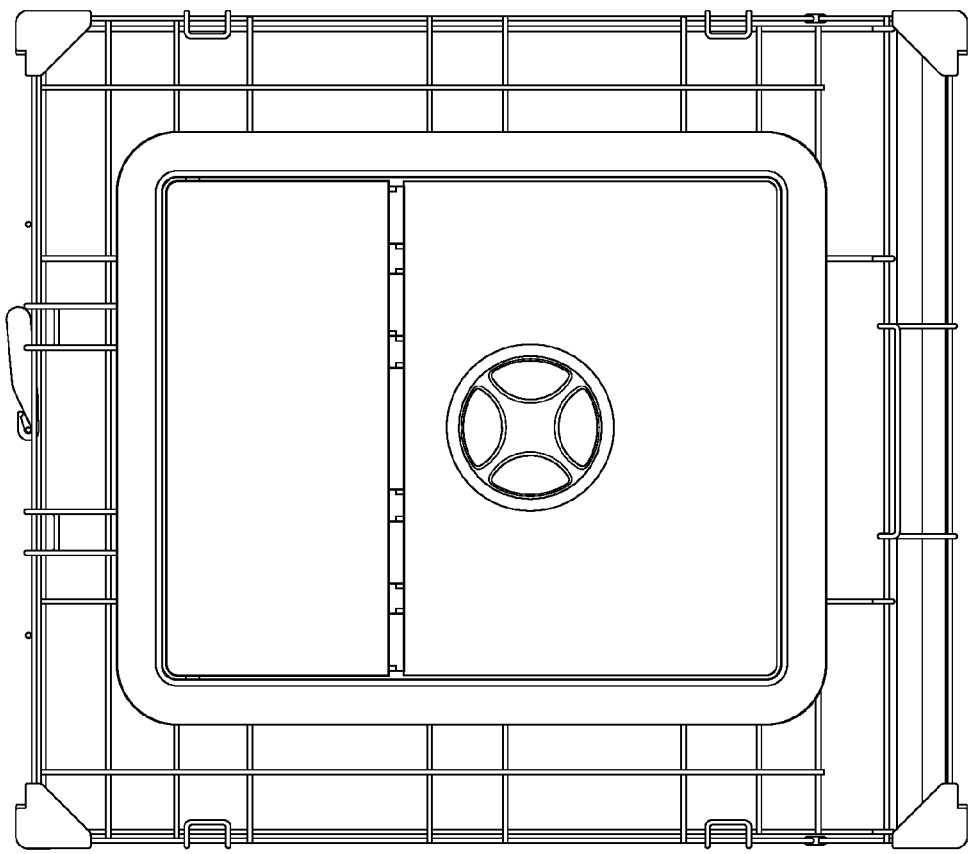
FIG. 22 illustrates a front view of an equivalent variation of multi-function door system.
Figure 23:
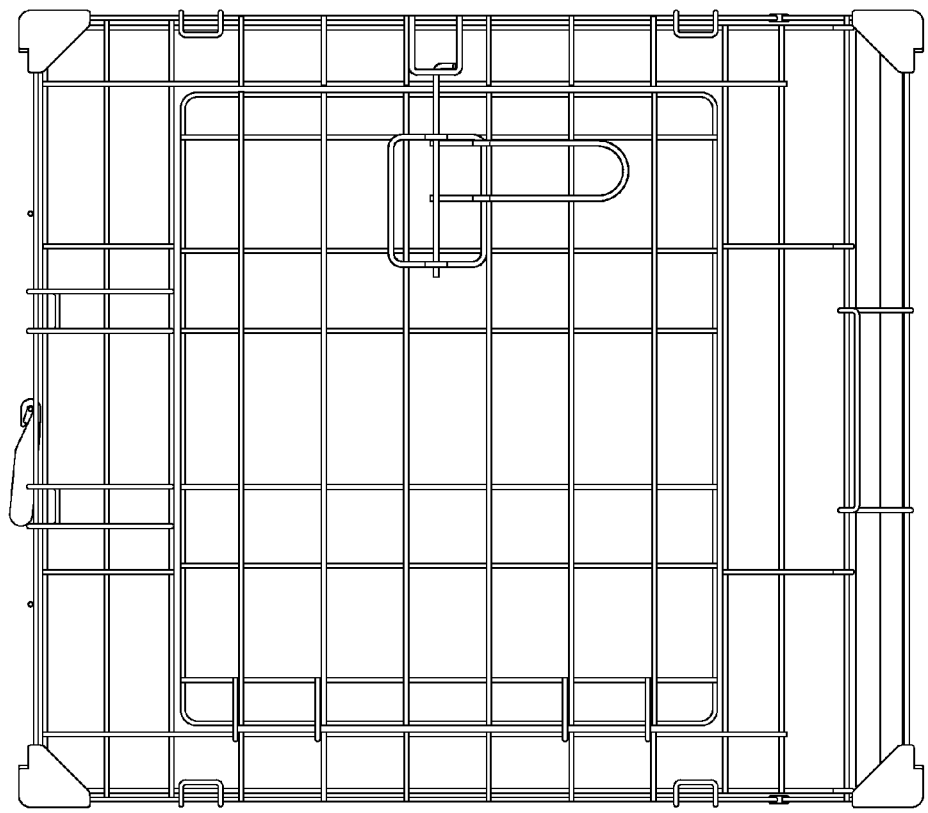
FIG. 23 illustrates a rear view of the multi-stacked-hinge-door pet crate, further comprising a wire door on rear panel.
Figure 24A:
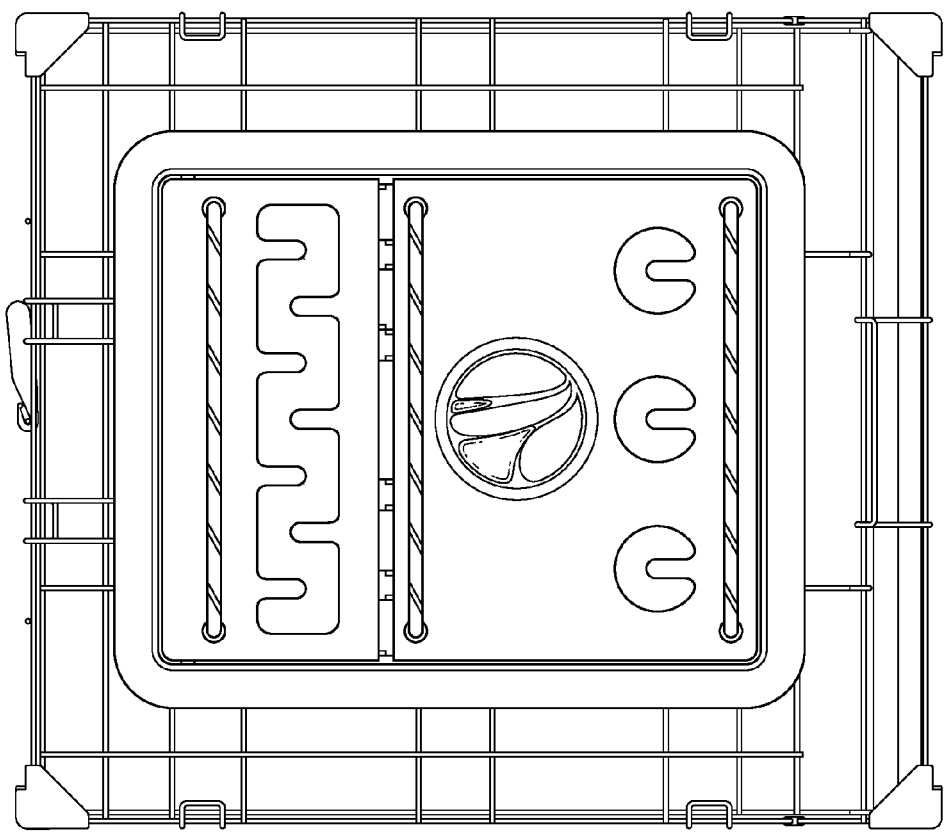
FIG. 24A illustrates a front view of an equivalent variation of multi-function door system. The equivalent variation can further comprise bungee cords and hooks.
Figure 24B:
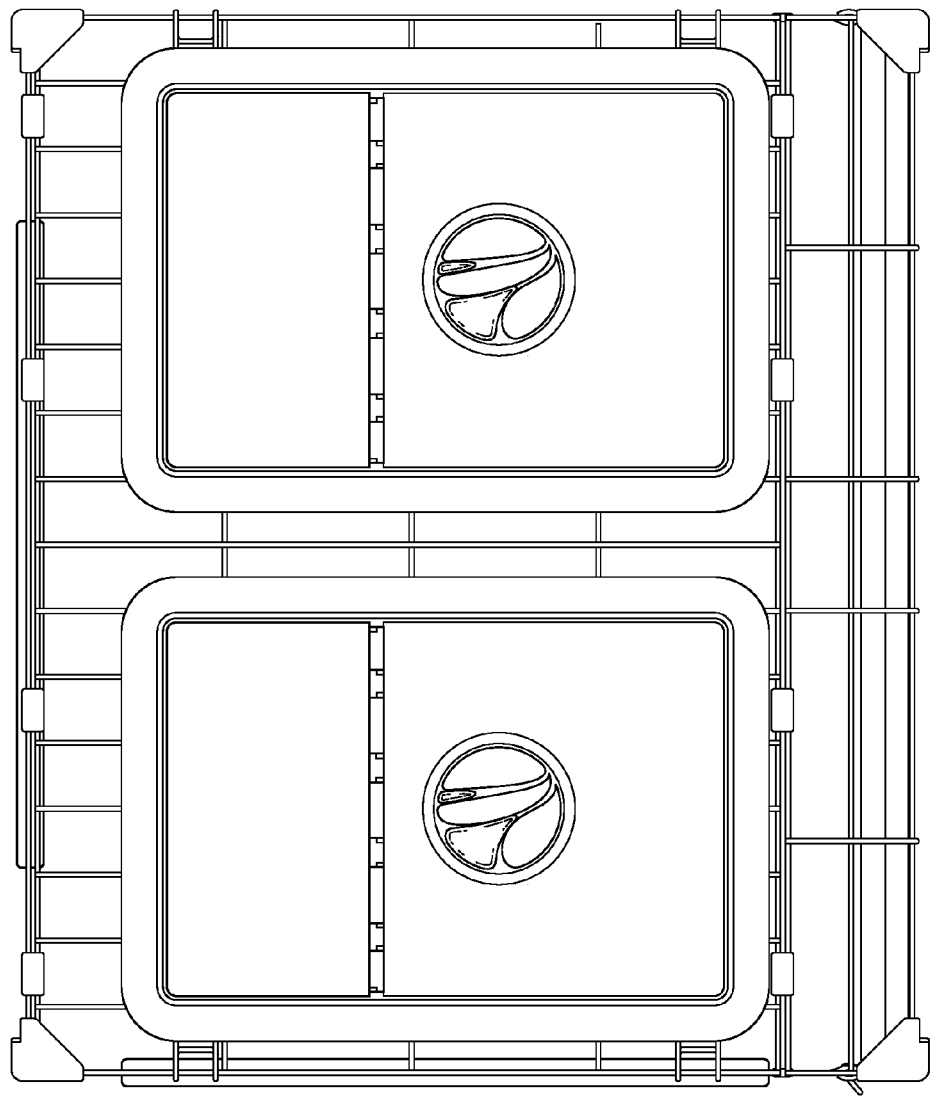
FIG. 24B illustrates a side view of the multi-stacked-hinge-door pet crate, further, comprising at least one additional multi-function door system attached to top, side, and/or rear panels thereof, respectively.

Any component of the multi-stacked-hinge-door pet crate can have any shape and size. Any component of the multi-stacked-hinge-door pet crate can be made of wood, wood composite, plastic, plastic composite, metal, metal composite, wire, chain link, mesh, the like, the equivalent, or a combination of at least two of the above-mentioned materials. The multi-stacked-hinge-door pet crate can have only four gussets on top panel 102a or no gussets. The multi-stacked-hinge-door pet crate can have at least one multi-function door system 123 disposed at any location(s) thereon. For example, the multi-stacked-hinge-door pet crate can have at least one multi-function door system 123 attached to top panel 102a, bottom panel 102b, left panel 102c, right panel 102d, front panel 102e, and/or rear panel 102f, respectively. For example, the multi-stacked-hinge-door pet crate, further, can comprise at least one wire door with at least one wire-door lock attached to top panel 102a, bottom panel 102b, left panel 102c, right panel 102d, front panel 102e, and/or rear panel 102f, respectively. For example, the multi-stacked-hinge-door pet crate can comprise an additional magnet, which is equivalent to and replaces spring-loaded palm knob 132b. The additional magnet is attached to top panel 102a to pull door magnet 156 toward itself to lock multi-function door system 123 to top panel 102a. The multi-stacked-hinge-door pet crate can have at least one wire door with at least one wire-door lock attached to top panel 102a, bottom panel 102b, left panel 102c, right panel 102d, front panel 102e, and/or rear panel 102f, respectively. The at least one wire door with at least one wire-door lock can replace the at least one multi-function door system 123 of the multi-stacked-hinge-door pet crate. FIG. 18A illustrates an equivalent variation of multi-function platform-locking shock-absorbing gusset systems 112. The equivalent variation can be molded with or without curved gusset springs 115a, 115b, and 115c, vertical gusset spring 116, and/or horizontal gusset springs 117. FIG. 18B illustrates four platform-locking tabs 163a, 163b, 163c, and 163d, which are equivalent to and can replace the top four of platform-locking shock-absorbing gusset tab 118 of multi-function platform-locking shock-absorbing gusset systems 112, respectively. Platform-locking tabs 163a, 163b, 163c, and 163d can be cut into and are part of multi-function grooming platform 119, and can be snap-locked on top panel 102a of the multi-stacked-hinge-door pet crate, in the directions of arrows 164a, 164b, 164c, and 164d, respectively, to lock multi-function grooming platform 119 on top of top panel 102a. FIGS. 19A, 19B, 19C, 19D, 19E, 20A, 20B, 20C, and 21 illustrate an equivalent variation of multi-function door system 123. The equivalent variation has rings 165 attached to top panel 102a. Rings 165 replace spring-loaded palm knob 132b and is for locking multi-function door system 123 to top panel 102a. FIG. 22 illustrates an equivalent variation of multi-function door system 123. FIG. 23 illustrates the multi-stacked-hinge-door pet crate, further comprising a wire door on rear panel 102f. FIG. 24A illustrates an equivalent variation of multi-function door system 123. The equivalent variation can further comprise bungee cords attached thereon and hooks molded thereon for holding cleaning accessories and grooming accessories. FIG. 24B illustrates the multi-stacked-hinge-door pet crate, further, comprising at least one additional multi-function door system attached to top, side, and/or rear panels 102a, 102d, and 102f thereof, respectively.

MAJOR ADVANTAGES OF THE INVENTION

The present invention substantially departs from the conventional concepts and designs of the prior art. In doing so, the present invention provides a multi-stacked-hinge-door pet crate (having: a) Ridged slanted urine-storing bed system, b) Platform-locking shock-absorbing gusset systems, c) Diked grooming platform, and d) Triple-rod-front-lock single-knob-top-lock double-magnet-front-lock door system), having many unique and significant features, functions, and advantages, which overcome all the disadvantages of the prior art, as follows:

1) It is an object of the new invention to provide a multi-stacked-hinge-door pet crate, having a multi-function door system. Therefore, the multi-stacked-hinge-door pet crate:
   a) Can lock and adapt interchangeably
      to a plastic crate panel or wire crate panel;
   b) Can lock in horizontal position against the top panel of the multi-stacked-hinge-door pet crate,
      to allow large dogs to enter and exit easily;
   c) Can lock in horizontal position against the top panel of the multi-stacked-hinge-door pet crate,
      to allow interior space for better utilization for all-size pets; and
   d) Can allow a quick single movement
      to lock the door in a horizontal or vertical position.
2) It is another object of the new invention to provide a multi-stacked-hinge-door pet crate, having a palm knob. Therefore, the multi-stacked-hinge-door pet crate:
   a) Can conform to person's arthritic hand without bending fingers or hand,
      to lock and unlock the multi-function door system with minimal effort;
   b) Can allow other conventional grips on the palm knob,
      to lock and unlock the multi-function door system with a person's hand;
   c) Can allow minimal effort and contortion for a person's arthritic hand,
      to rotate the palm knob; and
   d) Can fit typical small and large sized hands.
3) It is another object of the new invention to provide a multi-stacked-hinge-door pet crate, having a spring-loaded palm knob. Therefore, the multi-stacked-hinge-door pet crate:
   a) Can conform to person's arthritic hand without bending fingers or hand,
      to lock and unlock the multi-function door system with minimal effort;
   b) Can allow other conventional grips on the spring-loaded palm knob,
      to lock and unlock the multi-function door system with a person's hand;

c) Can allow minimal effort and contortion for a person's arthritic hand,
  to rotate the spring-loaded palm knob; and
d) Can fit typical small and large sized hands.
4) It is a further object of the new invention to provide a multi-stacked-hinge-door pet crate, having a multi-function grooming platform. Therefore, the multi-stacked-hinge-door pet crate:
a) Can quickly and easily be attached,
  to multi-function platform-locking shock-absorbing gusset systems;
b) Can conveniently provide secondary location for a pet,
  to stand, sit, lay, or be groomed on;
c) Can conveniently allow pet grooming,
  to take place in the same location as the multi-stacked-hinge-door pet crate;
d) Can conveniently provide standing, sitting, laying, or grooming area atop the multi-stacked-hinge-door pet crate,
  to take no additional square footage;
e) Can conveniently provide alternate location for a pet,
  to provide them relief from confinement;
f) Can quickly and easily be assembled and disassembled without tools; and
g) Can quickly and easily be cleaned.
5) It is an even further object of the new invention to provide a multi-stacked-hinge-door pet crate, having platform dikes. Therefore, the multi-stacked-hinge-door pet crate:
a) Can prevent pet urine from running off the multi-function grooming platform,
  to keep the multi-stacked-hinge-door pet crate and surrounding areas clean;
b) Can prevent pet hair from falling off the multi-function grooming platform,
  to keep the multi-stacked-hinge-door pet crate and surrounding areas clean;
c) Can prevent pet hair and urine from falling off the multi-function grooming platform,
  to protect the multi-stacked-hinge-door pet crate's crate area from contamination; and
d) Can provide a comfort platform for a pet,
  to sit, stand, rest, and sleep thereon while being groomed.
6) It is another object of the new invention to provide a multi-stacked-hinge-door pet crate, having a multi-function slanted urine-storing bed system. Therefore, the multi-stacked-hinge-door pet crate:
a) Can allow urine to run down the sanitary urine-storing gutters,
  to keep the slanted sanitary-urine-storing-gutter bed dry;
b) Can provide gutter ridges to elevate pet paws from the sanitary urine-storing gutters,
  to prevent pets from stepping in urine;
c) Can provide a comfort platform for pets,
  to allow the pets to sit, stand, play, rest, and sleep thereon;
d) Can keep pets away and not on urine,
  to keep the pets dry; and
e) Can keep pets away and not on urine,
  to prevent the pets from getting diseases and infections caused by their own urine.
7) It is yet another object of the new invention to provide a multi-stacked-hinge-door pet crate, having sanitary urine-storing gutters. Therefore, the multi-stacked-hinge-door pet crate:
a) Can store urine running down from a slanted sanitary-urine-storing-gutter bed,
  to keep the slanted sanitary-urine-storing-gutter bed dry;
b) Can store urine running down from a slanted sanitary-urine-storing-gutter bed,
  to prevent pets from being on their own urine;
c) Can prevent pets from getting diseases and infections caused by their own urine;
d) Can quickly and easily be assembled and disassembled without tools; and
e) Can quickly and easily be cleaned.
8) It is still yet another object of the new invention to provide a multi-stacked-hinge-door pet crate, having platform-locking shock-absorbing gusset tabs. Therefore, the multi-stacked-hinge-door pet crate:
a) Can lock the multi-function grooming platform,
  to the platform-locking shock-absorbing gusset tabs when the platform-locking corners are inserted under the platform-locking shock-absorbing gusset tabs;
b) Can apply the downward pressure of the weight of the pet,
  to additionally lock and secure the multi-function grooming platform;
c) Can secure the multi-function grooming platform atop the multi-stacked-hinge-door pet crate,
  to conveniently groom a pet thereon;
d) Can interchange from top to bottom, right to left, and front to back,
  to be economically manufactured; and
e) Can save materials, labor, and time.
9) It is still yet an even further object of the new invention to provide a multi-stacked-hinge-door pet crate, having multi-function platform-locking shock-absorbing gusset systems. Therefore, the multi-stacked-hinge-door pet crate:
a) Can absorb shocks and impacts exerted on the multi-stacked-hinge-door pet crate,
  to provide pets with comfort while being stationary or transported;
b) Can prevent all eight corners of the multi-stacked-hinge-door pet crate from causing injuries to people and pets,
  to make the multi-stacked-hinge-door pet crate safer to use;
c) Can absorb vibrations exerted on the multi-stacked-hinge-door pet crate,
  to provide pets with comfort while being stationary or transported; and
d) Can resist the twisting, bending, and wobbling forces exerted on the multi-stacked-hinge-door pet crate
  to strengthen the multi-stacked-hinge-door pet crate.
10) It is still yet an even further object of the new invention to provide a multi-stacked-hinge-door pet crate, having curved gusset springs, vertical gusset spring, and horizontal gusset springs. Therefore, the multi-stacked-hinge-door pet crate:
a) Can absorb shocks and impacts exerted on the multi-stacked-hinge-door pet crate,
  to provide pets with comfort while being stationary or transported;
b) Can prevent all eight corners of the multi-stacked-hinge-door pet crate from causing injuries to people and pets,
  to make the multi-stacked-hinge-door pet crate safer to use;

c) Can absorb vibrations exerted on the multi-stacked-hinge-door pet crate,
to provide pets with comfort while being stationary or transported; and
d) Can resist the twisting, bending, and wobbling forces exerted on the multi-stacked-hinge-door pet crate
to strengthen the multi-stacked-hinge-door pet crate.

What is claimed is:

1. A double-hinge-and-triple-lock-door pet crate comprising:
a top panel;
a bottom panel;
a left panel;
a right panel;
a front panel having a front-panel opening;
a rear panel;
a bottom hook foldably connected to said bottom panel;
a plurality of side hooks respectively welded to said left and said right panels;
a plurality of top hooks respectively welded to said front and said rear panels;
a plurality of clamps clamping said top, said bottom, said left, and said right panels together;
a handle foldably clamped to said top panel;
a slanted bed, said slanted bed seated on said bottom panel;
a plurality of urine-storing gutters respectively molded around said slanted bed;
a plurality of shock-absorbing gussets, said shock-absorbing gussets each comprising:
a plurality of gusset walls and a plurality of gusset recesses respectively molded between said gusset walls, said shock-absorbing gussets clamping said top, said bottom, said left, and said right panels together;
a grooming platform, said grooming platform seated on said top panel and having four grooming-platform corners;
a double-hinge triple-lock door, said double-hinge triple-lock door comprising:
a first door hinge attached to said front panel,
a second door hinge,
a first door panel rotatably attached to said first door hinge and said second door hinge,
a second door panel rotatably attached to said second door hinge,
a front knob panel,
a rear knob panel,
a plurality of front knob hooks respectively molded to said front knob panel,
a plurality of rear knob hooks respectively molded to said rear knob panel,
each of said rear knob hooks having a hook-receiving opening, wherein said front knob hooks are respectively snap-locked to said rear knob hooks to sandwich a portion of said second door panel between said front knob panel and said rear knob panel,
a palm knob rotatably sandwiched between said front knob panel and said rear knob panel said front knob panel having a hole from which said palm knob protrudes outwardly from to enable access to said palm knob,
a plurality of palm recesses respectively molded to said palm knob,
a plurality of palm hills respectively molded to said palm knob,
a circular knob gears molded to said palm knob,
two knob notches respectively molded to said palm knob,
a spring-loaded pin inserted into one of said two knob notches for releasably locking said palm knob,
a spring-loaded-pin housing molded to said front knob panel and said rear knob panel for housing said spring-loaded pin,
a first locking rod sandwiched between said front knob panel and said rear knob panel,
a plurality of first linear gears molded to said first locking rod and engaged to said circular knob gear,
a second locking rod sandwiched between said front knob panel and said rear knob panel,
a plurality of second linear gears molded to said second locking rod and engaged to said circular knob gear,
a third locking rod sandwiched between said front knob panel and said rear knob panel,
a plurality of third linear gears molded to said third locking rod and engaged to said circular knob gear;
a plurality of double-door-locking rings, said double-door-locking rings comprising:
two hinge-locking rings respectively attached to said front panel for locking said first door hinge therein,
three rod-locking rings respectively attached to said front panel for respectively locking said first locking rod, said second locking rod, said third locking rod therein; and
a plurality of double-door-locking magnets, said double-door-locking magnets comprising:
a panel magnet attached to said front panel,
a door magnet attached to said second door panel for pulling said panel magnet thereto to close said double-hinge triple-lock door.

2. The double-hinge-and-triple-lock-door pet crate of claim 1, further comprising:
a plurality of curved gusset springs respectively molded to said gusset walls,
a plurality of vertical gusset springs respectively molded to said gusset walls and to said curved gusset springs, and
a plurality of horizontal gusset springs respectively molded to said gusset walls, to said curved gusset springs, and to said vertical gusset springs,
wherein said curved gusset springs, said vertical gusset springs, and said horizontal gusset springs are for absorbing impact and vibration and for strengthening said pet crate.

3. The double-hinge-and-triple-lock-door pet crate of claim 2, further comprising four platform-locking shock-absorbing gusset tabs respectively molded to said gusset walls wherein said four platform-locking shock-absorbing gusset tabs are for cushioning said pet crate, for absorbing impact and vibration, for strengthening said pet crate, and for locking said four grooming-platform corners thereunder to lock said grooming platform on said top panel.

4. The double-hinge-and-triple-lock-door pet crate of claim 1, further comprising a plurality of gutter ridges respectively molded to said urine-storing gutters, provided a pet, wherein said gutter ridges are for preventing said pet from stepping in said urine-storing gutters and are for strengthening said urine-storing gutters.

5. The double-hinge-and-triple-lock-door pet crate of claim 1, further comprising:
a first attacher molded to a first extender,
the first extender attached to said first locking rod for extending said first locking rod, a second attacher molded to a second locking-rod extender, the second extender attached to said second locking rod for extending said second locking rod, a third attacher molded to a third extender, and the third extender attached to said third locking rod for extending said third locking rod.

6. The double-hinge-and-triple-lock-door pet crate of claim 1, wherein, said double-hinge-and-triple-lock-door pet crate is partially or entirely made of a material selected from the group consisting of: plastic, wood, metal, and a combination of at least two of said above-mentioned materials.

7. The double-hinge-and-triple-lock-door pet crate of claim 1, wherein, said double-hinge-and-triple-lock-door pet crate is partially made of wires welded to one another.

8. The double-hinge-and-triple-lock-door pet crate of claim 1, further comprising a plurality of platform dikes respectively molded around said grooming platform, provided urine, wherein said platform dikes are for preventing said urine from running off said grooming platform and are for strengthening said grooming platform.

9. A pet crate comprising:
a top panel;
a bottom panel;
a left panel;
a right panel;
a front panel having an opening for ingress and egress of a pet into and out of the pet crate;
a rear panel;
a bottom hook foldably connected to said bottom panel;
a plurality of side hooks respectively welded to said left and said right panels;
a plurality of top hooks respectively welded to said front and said rear panels;
a plurality of clamps clamping said top, said bottom, said left, and said right panels together;
a handle foldably clamped to said top panel;
a slanted bed, said slanted bed seated on said bottom panel;
a plurality of gutters respectively molded around said slanted bed;
a plurality of shock-absorbing gussets, said shock-absorbing gussets each comprising:
    a plurality of gusset walls and a plurality of gusset recesses respectively molded between said gusset walls, each of said shock-absorbing gussets clamping three of said top, said bottom, said left, and said right panels together;
a grooming platform, said grooming platform seated on said top panel and having four grooming-platform corners;
a double-hinge triple-lock door, said double-hinge triple-lock door comprising:
    a first door hinge attached to said front panel,
    a second door hinge,
    a first door panel rotatably attached to said first door hinge and said second door hinge,
    a second door panel rotatably attached to said second door hinge,
    a front knob panel,
    a rear knob panel,
    a plurality of front knob hooks respectively molded to said front knob panel,
    a plurality of rear knob hooks respectively molded to said rear knob panel, each of said rear knob hooks having a hook-receiving opening, wherein said front knob hooks are respectively snap-locked into said hook-receiving openings to connect said front knob panel and said rear knob panel to said second door panel,
    a knob rotatably sandwiched between said front knob panel and said rear knob panel, said front knob panel having a hole from which said knob protrudes outwardly from to enable access to said knob,
    a circular knob gear molded to said knob,
    two knob notches respectively molded to said knob,
    a spring-loaded pin inserted into one of said two knob notches for releasably locking said knob,
    a spring-loaded-pin housing molded to said front knob panel and said rear knob panel for housing said spring-loaded pin,
    a first locking rod sandwiched between said front knob panel and said rear knob panel,
    a plurality of first linear gears molded to said first locking rod and engaged to said circular knob gear,
    a second locking rod sandwiched between said front knob panel and said rear knob panel,
    a plurality of second linear gears molded to said second locking rod and engaged to said circular knob gear,
    a third locking rod sandwiched between said front knob panel and said rear knob panel,
    a plurality of third linear gears molded to said third locking rod and engaged to said circular knob gear;
    two hinge rings respectively attached to said first door hinge and said front panel;
    three rod rings respectively attached to said front panel, wherein as said spring-loaded pin is inserted into one of said two knob notches said first locking rod, said second locking rod, and said third locking rod are respectively received and locked within said three rod rings;
    a panel magnet attached to said front panel; and
    a door magnet attached to said second door panel for pulling said panel magnet thereto to close said double-hinge triple-lock door.

10. The pet crate of claim 9, further comprising:
at least one of a curved spring, vertical spring, and horizontal spring molded to said gusset walls of each of said shock-absorbing gussets,
wherein said curved spring, said vertical spring, or said horizontal spring is for absorbing impact and vibration and for strengthening each of said shock-absorbing gussets.

11. The pet crate of claim 10, further comprising four tabs respectively molded to said gusset walls of each of said shock-absorbing gussets, wherein said four tabs are for locking said four grooming-platform corners thereunder to lock said grooming platform on said top panel.

12. The pet crate of claim 9, wherein said gutters are respectively molded around said slanted bed, said gutters further comprising a plurality of ridges respectively molded to said gutters, provided a pet, wherein said ridges are for preventing said pet from stepping in said gutters and are for strengthening said gutters.

13. The pet crate of claim 9, further comprising:
a first attacher molded to a first extender,
the first extender attached to said first locking rod for extending said first locking rod,
a second attacher molded to a second extender,
the second extender attached to said second locking rod for extending said second locking rod,
a third attacher molded to a third extender, and
the third extender attached to said third locking rod for extending said third locking rod.

14. The pet crate of claim 9, wherein, said pet crate is partially or entirely made of a material selected from the group consisting of: plastic, wood, metal, and a combination of at least two of said above-mentioned materials.

15. The pet crate of claim 9, wherein, said pet crate is partially made of wires welded to one another, wherein each of said shock-absorbing gussets clamps three of said top, said bottom, said left, and said right panels together.

* * * * *